US006496218B2

United States Patent
Takigawa et al.

(10) Patent No.: US 6,496,218 B2
(45) Date of Patent: *Dec. 17, 2002

(54) STEREOSCOPIC IMAGE DISPLAY APPARATUS FOR DETECTING VIEWPOINT AND FORMING STEREOSCOPIC IMAGE WHILE FOLLOWING UP VIEWPOINT POSITION

(75) Inventors: Tomoshi Takigawa, Yokohama (JP); Tsutomu Osaka, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,204

(22) Filed: Feb. 18, 1998

(65) Prior Publication Data

US 2002/0113867 A1 Aug. 22, 2002

(30) Foreign Application Priority Data

Feb. 20, 1997 (JP) .............................. 9-052323

(51) Int. Cl.$^7$ .......................... H04N 13/00; H04N 13/04
(52) U.S. Cl. .......................................... 348/42; 348/51
(58) Field of Search .............................. 348/42, 43, 49, 348/50, 51, 52, 56, 57, 58, 59; 359/630, 40; 345/7; 250/201.1; 351/237; 382/293

(56) References Cited

U.S. PATENT DOCUMENTS 5,349,379 A * 9/1994 Eichenlaub .................. 348/59
5,493,427 A * 2/1996 Normura et al. ............... 359/40
5,712,732 A * 1/1998 Street .......................... 359/630
5,777,720 A * 7/1998 Shapiro et al. .............. 351/237
5,872,590 A * 2/1999 Aritake et al. ................. 348/57
5,937,105 A * 8/1999 Katayama et al. ........... 382/293
5,966,167 A * 10/1999 Nose ............................ 348/59
6,008,484 A * 12/1999 Woodgate et al. ........ 250/201.1
6,045,229 A * 4/2000 Tachi et al. .................... 348/28
6,094,216 A * 7/2000 Taniguchi et al. ............. 348/51
6,160,527 A * 12/2000 Moishima et al. .............. 345/7

FOREIGN PATENT DOCUMENTS

| JP | 2-44995   | 2/1990 |
| JP | 2-50145   | 2/1990 |
| JP | 3-119889  | 5/1991 |
| JP | 4-122922  | 4/1992 |
| JP | 5-122733  | 5/1993 |

OTHER PUBLICATIONS

"Theory or Parallax Barriers"; Sam H. Kaplan; *Journal of he SMPTE*; vol. 59, No. 7, pp. 11–12; Jul. 1952.

* cited by examiner

Primary Examiner—Howard Britton
Assistant Examiner—Tung Vo T
(74) Attorney, Agent, or Firm—Morgan & Finnegan, L.L.P.

(57) ABSTRACT

A system and method is disclosed for forming stereoscopic images. The images are formed through the arrangement of a viewpoint position detection sensor for emitting visible or infrared light to an observer. Reflected light is then detected from the observer, where controls perform follow-up control on a portion of the apparatus by using the signal obtained by the viewpoint position detection sensor. The signal, along with other desired signals, are then properly set to accurately detect the viewpoint position of the observer with a simplified arrangement that easily allows a stereoscopic view region to follow-up at high speeds.

20 Claims, 40 Drawing Sheets

| MEMORY ADDRESS | 1 | 2 | 3 | . . . . | i | . . . . | n |
|---|---|---|---|---|---|---|---|
| QUANTIZED DATA R | R(1) | R(2) | R(3) | . . . . | R(i) | . . . . | R(n) |

| MEMORY ADDRESS | 1 | 2 | 3 | . . . . | i | . . . . | n |
|---|---|---|---|---|---|---|---|
| QUANTIZED DATA L | L(1) | L(2) | L(3) | . . . . | L(i) | . . . . | L(n) |

FIG.49
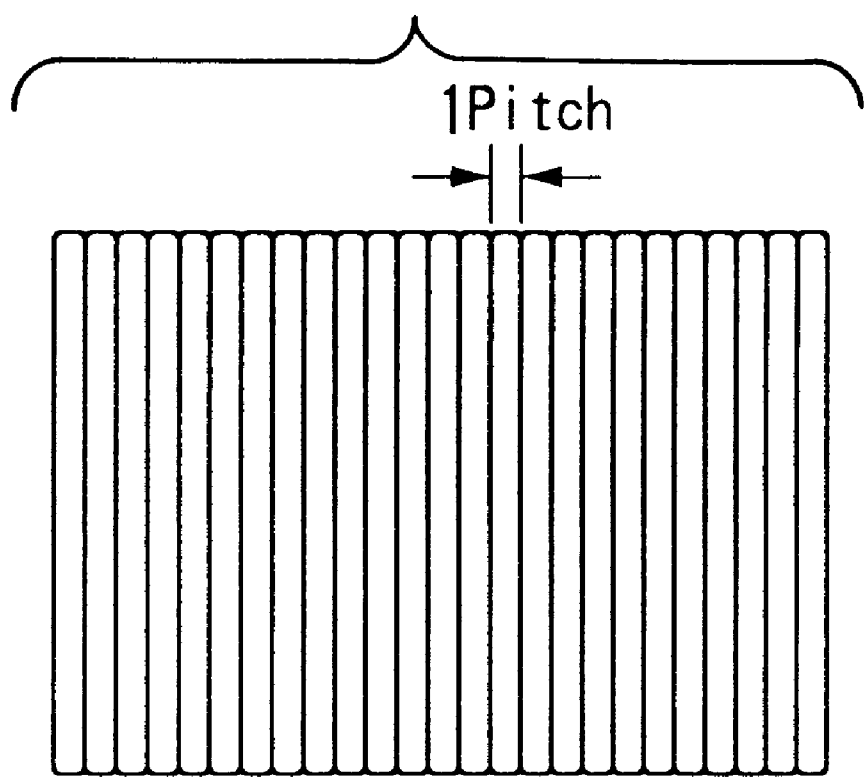
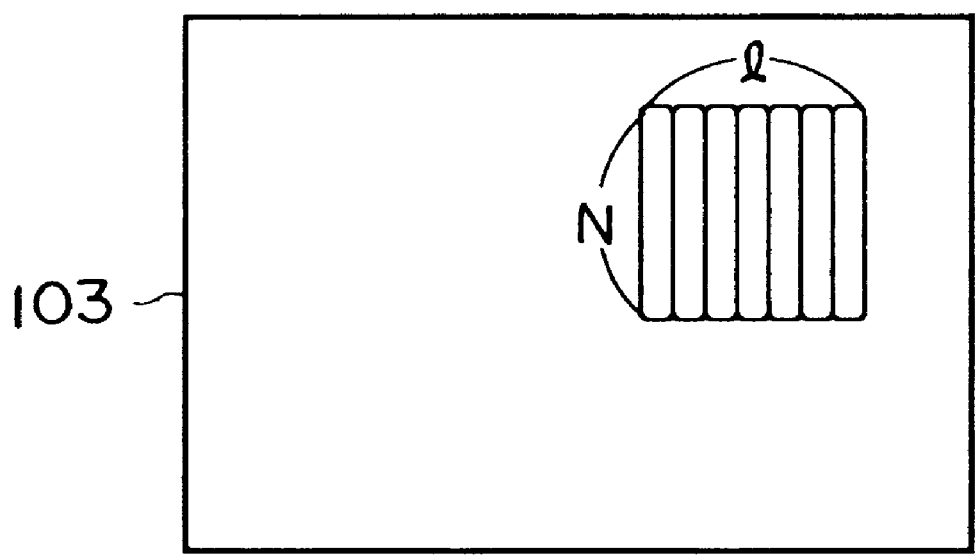

STEREOSCOPIC IMAGE DISPLAY APPARATUS FOR DETECTING VIEWPOINT AND FORMING STEREOSCOPIC IMAGE WHILE FOLLOWING UP VIEWPOINT POSITION

BACKGROUND OF THE INVENTION

The present invention relates to a stereoscopic image display apparatus (stereoscopic display apparatus) and, more particularly, to an apparatus which can be suitably used to stereoscopically display image information on the display device (display) of a TV set, a video recorder, a computer monitor, a game machine, or the like and allows an observer to stereoscopically observe the image information from a predetermined observation region.

The conventional stereoscopic image observation methods which have been proposed include a method of observing parallax images in different polarization states by using polarization glasses, a method of guiding predetermined parallax images, of a plurality of parallax images (viewpoint images), to the eyes of an observer by using a lenticular lens, and the like.

In a stereoscopic display scheme using polarization glasses, a right-eye parallax image and a left-eye parallax image are displayed in different polarization states, and the observer uses the polarization glasses to separate the right and left parallax images so as to visually recognize them as a stereoscopic image. For example, a liquid crystal shutter is placed on the display side to set right and left parallax images in different parallax states, and the parallax states are switched in synchronism with each field signal of the image displayed on the display. With this operation, an observer with polarization glasses can separately and alternately observe right and left images with a corresponding eye time-divisionally so as to realize a stereoscopic view.

A method by placing a liquid crystal shutter on the polarization glasses side has also been proposed. In this method, the shutter is operated in synchronism with the image displayed on a monitor to allow an observer to visually recognize right and left parallax images properly so as to recognize a stereoscopic image.

In a stereoscopic display scheme using a lenticular lens, the lenticular lens is placed on the front side of an image display surface to spatially separate an image into images for the right and left eyes of an observer so as to realize a stereoscopic vision.

FIG. 46 is a view for explaining a stereoscopic display apparatus of the conventional lenticular lens scheme. Referring to FIG. 46, reference numeral 151 denotes a liquid crystal display, in which a display pixel portion 153 of the liquid crystal is formed between glass substrates 152 and 154. A lenticular lens 155 constituted by many cylindrical lenses, each having a semicircular cross-section and extending in a direction perpendicular to the drawing surface as shown in FIG. 46, is formed on the observer side of the liquid crystal display 151. The display pixel portion 153 of the liquid crystal is positioned on the focal plane of the lenticular lens 155.

A striped image is displayed in the display pixel portion 153. A striped image is synthesized from a plurality of parallax images (images with parallaxes) from a plurality of viewpoints. To synthesize a striped image, at least two parallax images are required. Let Rs be a parallax image corresponding to the right eye, and Ls be a parallax image corresponding to the left eye. Each parallax image is divided into elongated stripe pixels (to be referred to as stripe pixels hereinafter) $R_i$ and $L_i$ (i=1, 2, 3, . . . ). The stripe pixels obtained from the respective parallax images are alternately arranged, i.e., arranged in the following sequence: the stripe pixels $R_1$, $L_2$, $R_3$, $L_4$, . . . (or $L_1$, $R_2$, $L_3$, $R_4$, . . . ), into one image, thus forming a striped image. A "three-dimensional image" in this specification indicates this striped image. The formation of a striped image will be referred to as stripe synthesis hereinafter.

If three parallax images A, B, and C are prepared, a striped image is obtained by alternately arranging stripe pixels in the following sequence: stripe pixels $A_1$, $B_2$, $C_3$, $A_4$, $B_5$, $C_6$, . . . , $B_1$, $C_2$, $A_3$, $B_4$, $C_5$, $A_6$, . . . , or $C_1$, $A_2$, $B_3$, $C_4$, $A_5$, $B_6$, . . .

As shown in FIG. 46, the display pixel portion 153 is obtained by alternately arranging right-eye stripe pixels (black portions) and left-eye stripe pixels (white portions), each having the form of a stripe and extending in the direction perpendicular to the drawing surface, in correspondence with the pitch of the lenticular lens. The lenticular lens 155 optically separates light beams from these stripe pixels into regions in which right and left eyes $E_R$ and $E_L$ of the observer are present. With this operation, a stereoscopic vision is realized.

FIG. 46 shows a spatial region where right-eye and left-eye images on the two end portions and central portion of the liquid crystal display 151 can be observed. Referring to FIG. 46, a stereoscopic vision region 156 indicated by the thick solid lines is a common region where right and left images are separately observed with the eyes (the distance between the centers of the eyes is represented by e) of the observer throughout the entire screen. Note that another stereoscopic vision region (not shown) where a stereoscopic vision can be obtained is also present near the stereoscopic vision region 156.

In addition to the above lenticular lens scheme, the parallax barrier scheme is available as a stereoscopic display scheme. This parallax barrier scheme is described below.

A stereoscopic image display scheme using the parallax barrier scheme is disclosed by. S. H. Kaplan ("Theory of Parallax Barriers.", J. SMPTE, Vol. 59, No. 7, pp. 11–21, 1952). In this scheme as well, a striped image synthesized from right and left parallax images like those described above is displayed, and an observer separately observes the parallax images corresponding to the right and left eyes with the corresponding eyes through a slit pattern (called a parallax barrier) having predetermined opening portions placed at a predetermined distance from this striped image, thereby realizing a stereoscopic vision.

Japanese Patent Laid-Open Nos. 3-119889 and 5-122733 disclose stereoscopic display apparatuses in which a parallax barrier is electronically formed by a transmission type liquid crystal display device and the like, and the shape, position, and the like of the parallax barrier are electronically controlled and changed.

FIG. 47 shows the schematic arrangement of the main part of the stereoscopic image display apparatus disclosed in Japanese Patent Laid-Open No. 3-119889. In this apparatus, an electronic parallax barrier 103 constituted by a transmission liquid crystal display device is placed on an image display surface 101 through a spacer 102 having a thickness d. A vertically striped image constituted by parallax images obtained from two or more directions is displayed on the image display surface 101. A parallax barrier is formed at an arbitrary position on the barrier surface of the electronic parallax barrier 103 upon designation of X and Y addresses by a control means such as a microcomputer 104, thereby allowing a stereoscopic view based on the principle of the above parallax barrier scheme.

FIG. 48 is a schematic view showing the arrangement of the main part of the stereoscopic image display apparatus disclosed in Japanese Patent Laid-Open No. 3-119889, which is constituted by a liquid crystal display and an electronic barrier. In this stereoscopic image display apparatus, two liquid crystal layers 115 and 125 are respectively sandwiched between two polarizing plates 111 and 118 and between two polarizing plates 121 and 128. The liquid crystal layer 115 and the liquid crystal layer 125 respectively serve as an image display means and an electronic barrier formation means.

An apparatus capable of performing mixed display of three- and two-dimensional images within a single display surface is disclosed in Japanese Patent Laid-Open No. 5-122733. In this apparatus, as shown in FIG. 49, a striped barrier pattern can be generated only in any partial area of an electronic parallax barrier 103 constituted by a transmission type liquid crystal display device.

In a stereoscopic display apparatus capable of realizing a stereoscopic vision by forming and displaying a striped image as in the above lenticular lens scheme and the parallax barrier scheme, the width of the region which allows a stereoscopic vision is small, and the maximum area in which an observer can obtain a stereoscopic vision is as small as ½ the distance between the centers of the eyes, which is about 65 mm. For this reason, the observer must fix the position of the head portion, and has difficulty in stably obtaining a stereoscopic vision.

To solve this problem, a scheme for widening such a stereoscopic vision region is disclosed in Japanese Patent Laid-Open No. 2-44995. According to this scheme, to widen this stereoscopic vision region, the positions of the eyes of an observer are detected, and the relative positions of the lenticular lens and the display device in the right-and-left direction are moved/controlled.

In another scheme disclosed in Japanese Patent Laid-Open No. 2-50145, the positions of the eyes of an observer are detected, and the lateral positions of stripe pixels constituting right-eye and left-eye parallax images corresponding to the lenticular lens are interchanged in accordance with the resultant signal, thereby obtaining a wide stereoscopic vision region.

A means for detecting the positions of the eyes of an observer and obtaining a wide stereoscopic vision region will be briefly described below. For example, an image processing method for capturing the observer with a camera and extracting a contour from the captured image or detecting the observer by pattern matching has been proposed as a means for detecting the positions of the eyes of an observer.

FIG. 50 is a view for explaining the principle of a technique of making a lenticular lens follow up the movement of an observer in the right-and-left direction in the lenticular lens scheme. Referring to FIG. 50, reference numeral 160 denotes an observer before the movement; 160a, the position of the observer after he/she has moved from a predetermined position by a distance a in the right-and-left direction; 161, one of the cylindrical lenses constituting the lenticular lens; and 161a, the cylindrical lens after it has moved following up the movement of the observer. Reference symbol b denotes the movement amount of the cylindrical lens (=lenticular lens) in this case. Reference numeral 162 denotes a display pixel portion for displaying right stripe pixels (black portions) and left stripe pixels (white portions). Reference symbol f denotes the focal length of the cylindrical lens; and S, an observation distance.

Assume that a relation of S>>f is satisfied. In this case, in general, when the lenticular lens is moved by the amount b upon movement of the observer by the distance a in the right-and-left direction, $$b = f \cdot a/s \quad (1)$$

the stereoscopic vision region also moves by the distance a in the right-and-left direction.

In this case, the lens is moved. However, the same effect as that described above can be obtained even if the display pixel portion 162 is moved with respect to the lenticular lens.

The above description explains the principle of the technique of making the stereoscopic vision region follow the movement of the observer in the right-and-left direction with respect to the stereoscopic display. In some case, however, the observer moves in the direction of depth as well as the right-and-left direction with respect to the stereoscopic display, and may move out of the stereoscopic vision region in the direction of depth.

As a technique of solving this problem, a scheme of projecting/displaying a three-dimensional image on a lenticular lens is disclosed in Japanese Patent Laid-Open No. 4-122922. According to this scheme, the position of an observer in the direction of depth is also detected to realize stereoscopic vision follow-up in the direction of depth.

As means for detecting the position of an observer in the right-and-left direction, the following methods are disclosed in Japanese Patent Laid-Open No. 2-50145:

(a1) a method of mainly irradiating infrared light and detecting reflected light;

(a2) a method of irradiating infrared light onto an observer, and receiving the light reflected by an observer with a linear CCD image sensor, thereby detecting the position of the observer;

(a3) a method of irradiating infrared light from the rear side of the observer, and detecting his/her position from the light amount distribution of a light-receiving device placed on the front surface side; and (a4) a method of performing contour extraction processing for an image of an observer using a TV camera, and detecting the positions of the eyes by an image recognition technique.

As means for detecting the position of an observer in the direction of depth, the following means are disclosed in Japanese Patent Laid-Open No. 4-122922:

(a5) a method of using two distance detectors using infrared light; and (a6) a method of performing image processing by using two cameras.

The following problems, however, are posed in the above conventional stereoscopic display apparatuses.

(b1) According to the scheme of capturing an observer with a camera or the like and detecting the position of the observer by image processing, high-speed detection cannot be performed, and the follow-up speed is low. That is, satisfactory follow-up characteristics cannot be ensured. In addition, since a high-performance arithmetic function is required for the apparatus based on this scheme, the overall apparatus tends to be complicated.

(b2) In the scheme for obtaining the contour of the head portion of an observer in one direction, and detecting the viewpoint position by image processing, since the central position of the contour of the head portion is regarded as the middle point between the eyes, the central position (viewpoint position) of the eyes cannot be correctly detected depending on the hair style of the observer, the build of the observer, or the direction of the face of the observer.

(b3) To detect the contour of the head portion of an observer or the positions of the eyes, a camera or a light-receiving means must capture the head portion or eyes of the observer. If, therefore, a viewpoint position follow-up mechanism designed to perform a follow-up operation only in the right-and-left direction is to be used, the position of the observer must be checked or adjusted such that the observer is positioned in the up-and-down direction within the visual field of the camera or the light-receiving means in the initial state. There is, however, no conventional means for easily performing correct adjustment. In addition, there is no means for checking whether the observer has moved out of the visual field while is observing an image on the display.

(b4) In the scheme of capturing an observer with a camera or the like and detecting the observation position by image processing, a recognition error may be caused by an object in the background of the observer. It is therefore difficult to detect the correct position of the observer.

(b5) To capture the movement of the contour of the head portion of an observer, the visual field of the camera must be larger than the contour of the head portion. To cope with the large movement of the head portion, the visual field must be widened accordingly. For this reason, an image sensing device with a large number of pixels is required to increase the precision of position detection. It therefore takes much time to perform image processing.

(b6) In the method of extracting the contour of the head portion of an observer, even slight rotation of the head portion of the observer may cause a detection error, resulting in failure to follow the stereoscopic vision region.

SUMMARY OF THE INVENTION

It is, therefore, an object of the present invention to provide a stereoscopic image display apparatus, in which the arrangement of a viewpoint position detection sensor for emitting visible light or infrared light to an observer and detecting reflected light from the observer, the arrangement of a follow-up control means for performing follow-up control on a portion of the apparatus by using the signal obtained by the viewpoint position detection sensor, and the like are properly set to accurately detect the viewpoint position of the observer with a simple arrangement and easily cause a stereoscopic view region to follow up at a high speed.

In order to achieve the above object, the present invention has the following arrangements. There is provided a stereoscopic image display apparatus which allows an observer to observe a stereoscopic image by guiding light beams based on a plurality of parallax images displayed on an image display unit to the observer through an optical system, comprising:

a viewpoint position detection sensor for detecting a viewpoint position of the observer; and follow-up control means for performing follow-up control on a stereoscopic view observation region for image information displayed on the image display unit, on the basis of viewpoint position information obtained by the viewpoint position detection sensor, the viewpoint position detection sensor including light-emitting means for emitting a light beam to the observer, narrow-area detection means for detecting a viewpoint position in a narrow area, and wide-area detection means for detecting a viewpoint position in a wide area.

According to the stereoscopic image display apparatus, there can be provided a stereoscopic image display apparatus, in which the arrangement of a viewpoint position detection sensor for emitting visible light or infrared light to an observer and detecting reflected light from the observer, the arrangement of a follow-up control means for performing controls to adjust the projection of the stereoscopic view observation region of an image displayed on the image display unit, on the basis of the viewpoint position information obtained by the viewpoint position detection sensor, and the like are properly set to accurately detect the viewpoint position of the observer with a simple arrangement and easily cause a stereoscopic view region to follow up at a high speed.

There is also provided a stereoscopic image display apparatus which allows an observer to observe a stereoscopic image by guiding light beams based on a plurality of parallax images displayed on an image display unit to the observer through an optical system, comprises:

a viewpoint position detection sensor for detecting the viewpoint position of the observer; and follow-up control means for performing follow-up control on a stereoscopic view observation region for image information displayed on the image display unit, on the basis of viewpoint position information obtained by the viewpoint position detection sensor, the viewpoint position detection sensor including light-emitting means for emitting a light beam to the observer, light-receiving means for receiving a light beam from the observer; and position adjustment means for adjusting at least one of a light-emitting area of the light-emitting means and a light-receiving area of the light-receiving means to predetermined positions.

There is also provided a stereoscopic image display apparatus which allows an observer to observe a stereoscopic image by guiding light beams based on a plurality of parallax images displayed on an image display unit to the observer through an optical system, comprises:

a viewpoint position detection sensor for detecting the viewpoint position of the observer; and follow-up control means for performing follow-up control on a stereoscopic view observation region for image information displayed on the image display unit, on the basis of viewpoint position information obtained by the viewpoint position detection sensor, the viewpoint position detection sensor including light-emitting means for emitting a light beam to the observer, narrow-area detection means for detecting a viewpoint position in a narrow area on an observer side, and wide-area detection means for detecting a viewpoint position in a wide area, wherein the viewpoint position is finally determined in accordance with a signal from the narrow-area detection means.

There is also provided a stereoscopic image display apparatus which allows an observer to observe a stereoscopic image by guiding light beams based on a plurality of parallax images displayed on an image display unit to the observer through an optical system, comprises:

a viewpoint position detection sensor for detecting the viewpoint position of the observer; and follow-up control means for performing follow-up control on a stereoscopic view observation region for image information displayed on the image display unit, on the basis of viewpoint position information obtained by the viewpoint position detection sensor, wherein the viewpoint position detection sensor forms images from a plurality of directions of the observer on a line sensor having a plurality of light-receiving elements arranged in one direction, and position information of the observer in one direction and information of a distance from the viewpoint position detection sensor to the observer are obtained.

There is also provided a stereoscopic image display apparatus which allows an observer to observe a stereoscope image by guiding light beams based on a plurality of parallax images displayed on an image display unit to observer through an optical system, comprising:

viewpoint position detecting means for detecting a viewpoint position of the observer; and a controller for performing follow-up control on a stereoscopic view observation region for image information displayed on the image display unit, on the basis of viewpoint position information obtained by the viewpoint position detecting means, wherein the viewpoint position detecting means having a function of detecting the viewpoint in a narrow area and a function of detecting the viewpoint position in a wide area.

According to a preferred aspect of the present invention, the follow-up control means controls the viewpoint position detection sensor to follow up a viewpoint position of the observer.

According to another preferred aspect of the present invention, the light-emitting means further comprises means for limiting a light-emitting area with respect to the observation side.

According to still another preferred aspect of the present invention, the light-emitting means emits a light beam modulated with a predetermined light-emitting frequency, and the narrow-area detection means or the wide-area detection means further comprises synchronization means for detecting signals on the basis of the frequency modulation.

According to still another preferred aspect of the present invention, a parallax image is displayed on the image display unit at a predetermined display frequency, the display frequency being set so as not to be an integer multiple of the light-emitting frequency.

According to still another preferred aspect of the present invention, the light-emitting means controls the intensity of a light beam to be emitted such that a signal obtained by the narrow-area detection means or the wide-area detection means on the basis of a reflected light beam from the observer is not less than a predetermined value.

According to still another preferred aspect of the present invention, each of the narrow-area detection means and the wide-area detection means comprises a pair of light-receiving elements, and adjusts a distance between the pair of light-receiving elements to detect a viewpoint position in a narrow or wide area.

According to still another preferred aspect of the present invention, the viewpoint position detection sensor detects a viewpoint position in the narrow or wide area by using at least one of a focal length of a light-emitting lens for irradiating a light beam to the observer, a focal length of a light-receiving means for receiving a light beam from the observer, slit means for limiting a light-receiving area for the light beam from the observer side, and directivity characteristics of a light source for emitting a light beam to the observer.

According to still another preferred aspect of the present invention, a stereoscopic view of image information displayed on the image display unit is realized by using a lenticular lens or a parallax barrier, and the lenticular lens or parallax barrier is driven/controlled by using a sum total of different signals based on outputs from the pair of light-receiving elements of the narrow-area detection means and difference signals based on outputs from the pair of light-receiving elements of the wide-area detection means.

According to still another preferred aspect of the present invention, each of the light-emitting area and the light-receiving area includes a display member for adjusting a position of the viewpoint position detection sensor to a reference position which is a predetermined position of the observer, and an observation window for observing the display member.

According to still another preferred aspect of the present invention, the light-emitting means comprises a light-emitting element, the light-emitting means also serving as the display member.

According to still another preferred aspect of the present invention, an output from the wide-area detection means becomes not more than a predetermined threshold when the observer is present within a predetermined parallax angle.

According to still another preferred aspect of the present invention, the light-emitting means comprises one or two point light sources.

According to still another preferred aspect of the present invention, the narrow-area detection means comprises a two-dimensional image sensing element for converting a face image of the observer into an electrical signal.

According to still another preferred aspect of the present invention, the light-emitting means emits visible light or infrared light modulated with a predetermined light-emitting frequency, and the wide-area detection means and the narrow-area detection means further comprise synchronization means for detecting a signal on the basis of the light-emitting frequency.

According to still another preferred aspect of the present invention, the two-dimensional image sensing element outputs information of a maximum luminance position or eyeball position in a predetermined region of the observer.

According to still another preferred aspect of the present invention, the viewpoint position detection sensor follows movement of the viewpoint position of the observer.

According to still another preferred aspect of the present invention, the viewpoint position detection sensor comprises a plurality of pairs each constituted by an optical system for focusing a light beam from the observer, and a line sensor for photoelectrically converting an image of the observer which is formed by the optical system.

According to still another preferred aspect of the present invention, the viewpoint position detection sensor comprises an optical system for focusing a light beam from the observer, and a plurality of line sensors for photoelectrically converting an image of the observer which is formed by the optical system.

According to still another preferred aspect of the present invention, optical axes of the plurality of optical systems are substantially parallel to each other.

According to still another preferred aspect of the present invention, the observer is positioned near an intersection of optical axes of the plurality of optical systems which define a vergency angle.

According to still another preferred aspect of the present invention, the viewpoint position detection sensor obtains a size of an image formed on a surface of the line sensor in accordance with a signal from the line sensor, and checking by using the size information whether the image is an image of the observer.

According to still another preferred aspect of the present invention, the viewpoint position detection sensor obtains movement information of an image formed on a surface of the line sensor in accordance with a signal from the line sensor, and obtains the depth amount of the image on the observer side in an interval in which movement is detected.

According to still another preferred aspect of the present invention, the viewpoint position detection sensor obtains a correlation value from an image of the observer which is formed on the line sensor by template matching, and obtains depth information of the observer by using the correlation value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 49 is a view for explaining a conventional image display apparatus for performing mixed display of two-dimensional and three-dimensional images.

DETAILED DESCRIPTION OF THE PREFERRED EMBODIMENTS

Embodiments of the present invention will be described below with reference the accompanying drawings.

(First Embodiment)

A stereoscopic image display apparatus according to the first embodiment of the present invention is characterized as follows. The viewpoint position or head portion position (to be referred to as a viewpoint position hereinafter) of an observer is detected by a viewpoint position detection sensor. Part of the apparatus is subjected to follow-up driving control on the basis of the detection result. A narrow-region detection means and a wide-region detection means are prepared as the viewpoint position detection sensor to follow up a stereoscopic vision region so as to allow observation of a stereoscopic image even when the observer moves slightly. High-precision follow-up control is realized by using the signals obtained by the two detection means.

The stereoscopic image display apparatus according to the first embodiment of the present invention will be described next with reference to FIGS. 1 to 7.

Figure 1:
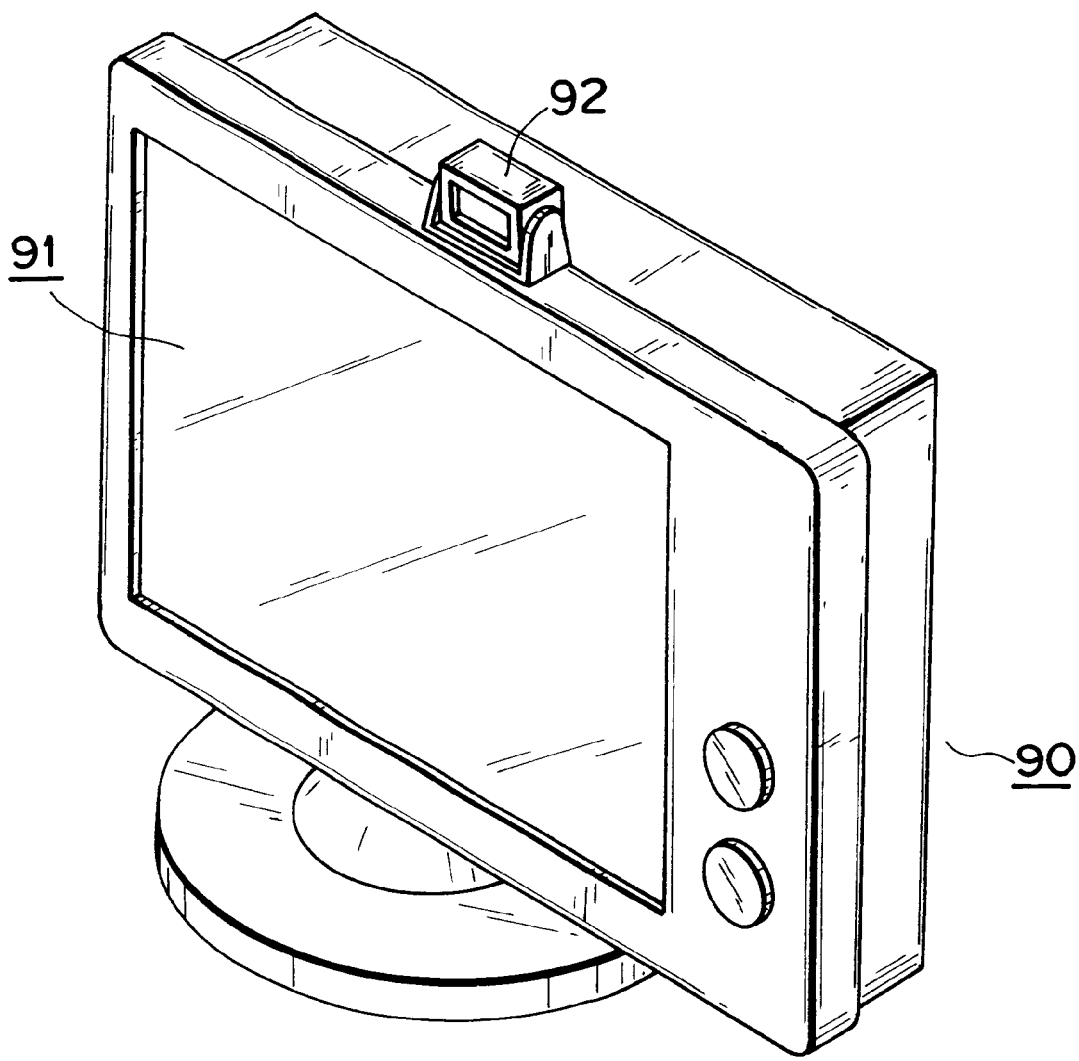
FIG. 1 is a perspective view of the first embodiment of the present invention.

FIG. 1 is a perspective view showing the external appearance of the first embodiment of the present invention. Referring to FIG. 1, reference numeral 90 denotes an overall stereoscopic image display apparatus; 91, a stereoscopic image display unit of the lenticular scheme; and 92, a viewpoint position detection sensor (head portion information detection sensor) having a light-emitting means and a light-receiving means to detect the position of the head portion of an observer. The angle of the viewpoint position detection sensor 92 can be adjusted in the up-and-down direction in accordance with the build of an observer 93. The viewpoint position detection sensor 92 rotates to follow the lateral movement of the observation position of the observer. Note that the viewpoint position detection sensor 92 will also be referred to as the sensor or the detection sensor hereinafter.

Figure 2:
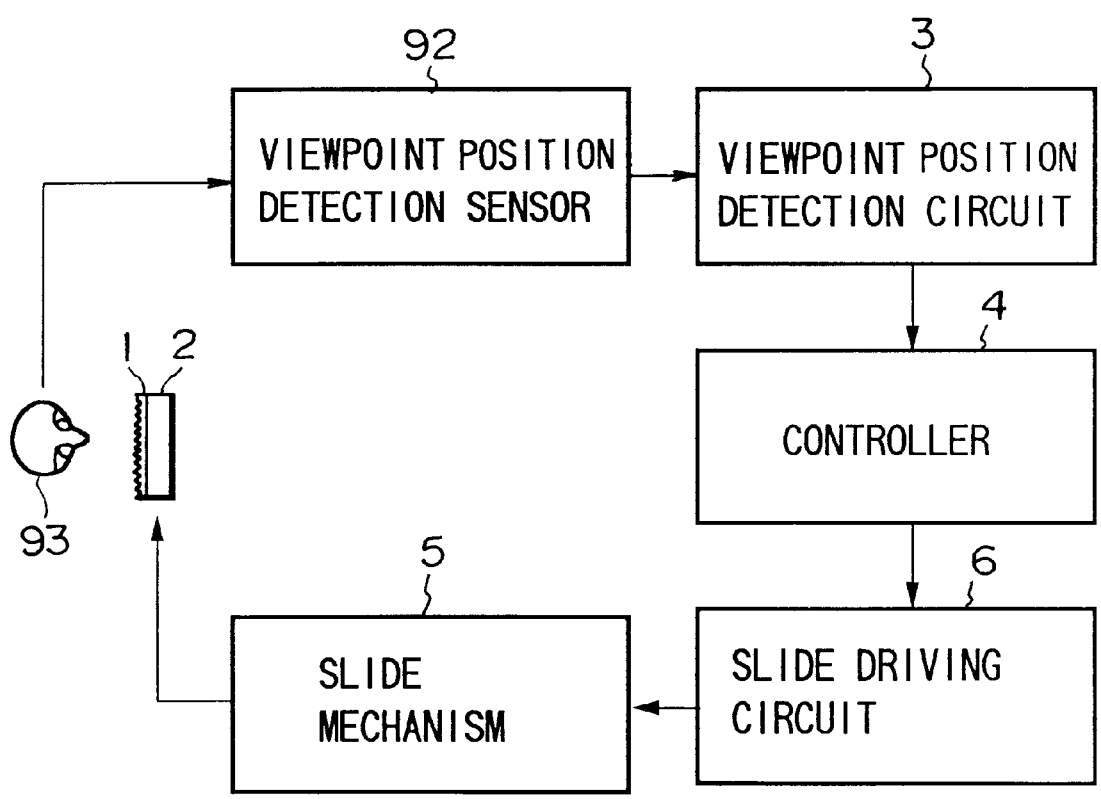
FIG. 2 is a block diagram showing the flow of signals in a system in the first embodiment of the present invention.

FIG. 2 is a block diagram for explaining the flow of signals in a system in the stereoscopic image display apparatus according to the first embodiment of the present invention.

Referring to FIG. 2, reference numeral 93 denotes the observer; 1, a lenticular lens which is movable in the right-and-left direction of a display 2; 2, the image display unit (display) using liquid crystal, plasma, or CRT scheme or the like to display a plurality of parallax images; 92, the viewpoint position detection sensor described with reference to FIG. 1, which is used to detect the viewpoint position of the observer 93; 3, a viewpoint position detection circuit for processing a signal from the viewpoint position detection sensor 92; and 4, a controller for controlling the overall operation of the stereoscopic image display apparatus. The viewpoint position information obtained by the viewpoint position detection circuit 3 is input as a signal to the controller 4. Reference numeral 5 denotes a slide mechanism for moving the lenticular lens 1 by a predetermined amount in the right-and-left direction of the display 2; and 6, a slide driving circuit for controlling the slide mechanism 5.

In this embodiment, the elements 4, 5, and 6 and the like constitute a follow-up control means.

Figure 3:
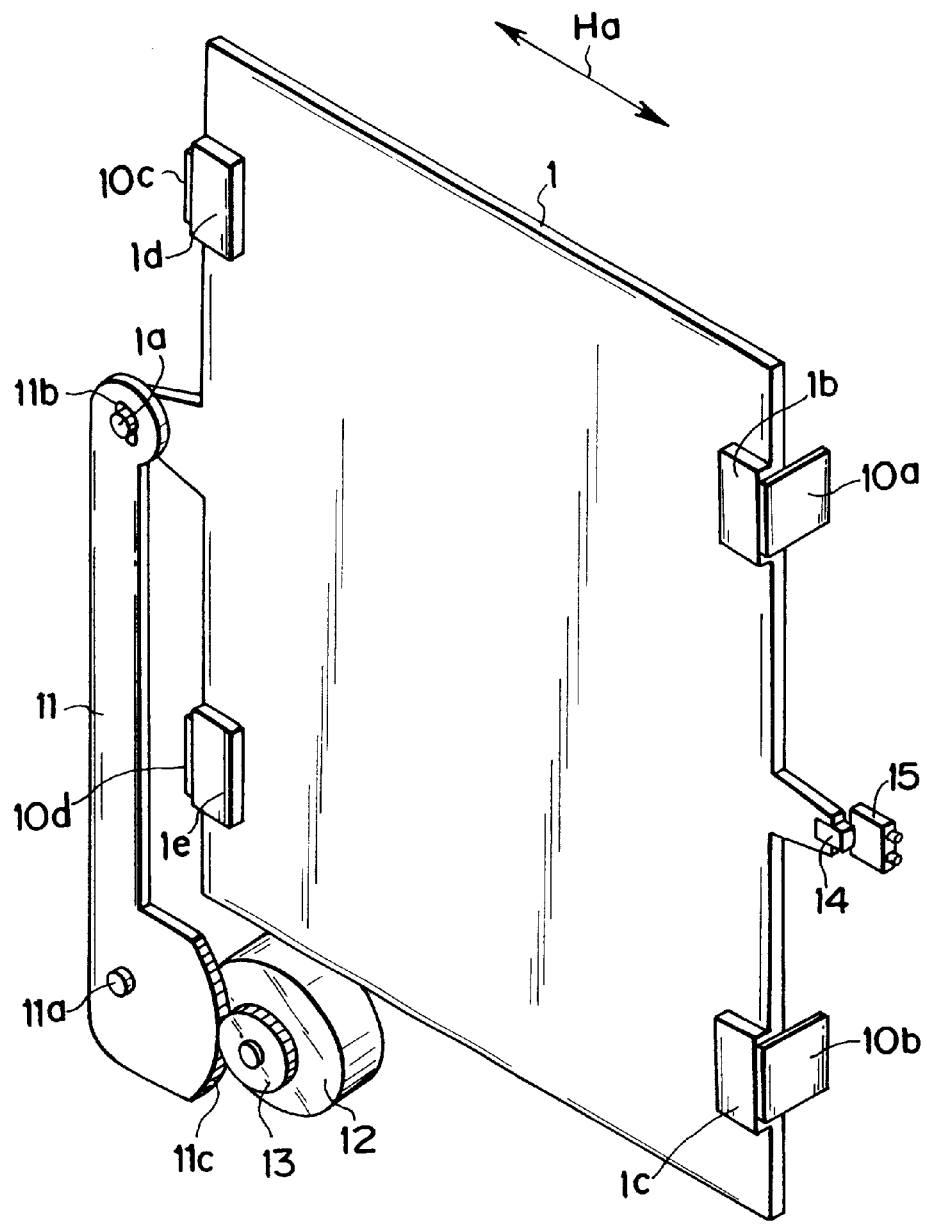
FIG. 3 is a perspective view for explaining a lenticular slide mechanism in the first embodiment of the present invention.

The slide mechanism 5 for driving the lenticular lens 1 will be described next. FIG. 3 shows the slide mechanism 5 for driving the lenticular lens 1 in FIG. 2. Referring to FIG. 3, the lenticular lens 1 can be moved in the right-and-left direction (horizontal direction) indicated by an arrow Ha. The lenticular lens 1 is constituted by a cylindrical lens array of cylindrical lenses having refracting power in a horizontal direction H and arranged at a predetermined pitch in the horizontal direction. Reference numeral 1a denotes a pin fixed on the cylindrical lens array; 1b, 1c, 1d, and 1e, mount bases for parallel leaf springs 10a to 10d (to be described later); 10a, 10b, 10c, and 10d, the parallel leaf springs for driving the lenticular lens 1 only in the right-and-left direction and supporting the lenticular lens 1 while ensuring a predetermined gap from a housing (not shown); 11, a lever for controlling the lateral movement of the lenticular lens 1 through an elongated hole 11b and the pin 1a of the lenticular lens 1; 11a, the rotation center of the lever 11; and 11c, a sector gear formed on a portion of the lever 11.

Reference numeral 12 denotes a DC motor serving as a drive source for driving the lenticular lens 1; 13, a gear for transmitting driving force from the DC motor 12 to the lever 11 through the sector gear 11c of the lever 11; 14, a permanent magnet for generating a magnetic field; and 15, a Hall element for detecting the magnetic flux density of the permanent magnet 14. A change in the magnetic flux of the permanent magnet 14 is detected as the movement amount of the lenticular lens 1, and the slide amount of the lenticular lens 1 is feedback-controlled on the basis of this value.

In this embodiment, the barrier scheme using an electronic barrier can be used as a scheme of observing a stereoscopic image in place of the lenticular scheme.

Figure 4:
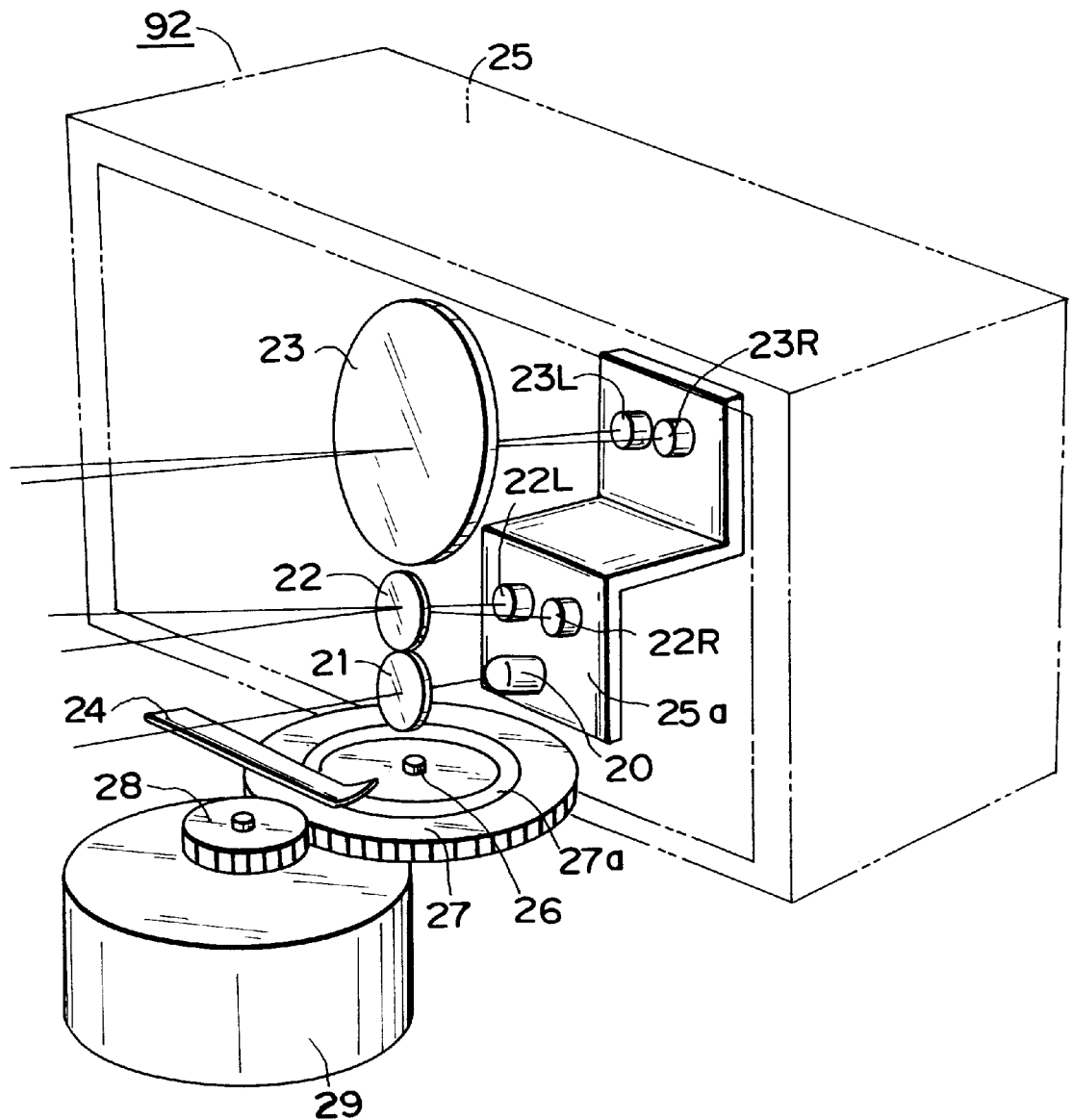
FIG. 4 is a perspective view showing the main part of a viewpoint position detection sensor in the first embodiment of the present invention.

The arrangement of the viewpoint position detection sensor 92 will be described next. FIG. 4 is a perspective view showing the main part of the viewpoint position detection sensor 92. Referring to FIG. 4, reference numeral 20 denotes a light-emitting diode (LED) for emitting a light beam to be irradiated onto the face of the observer; and 21, a focusing lens for irradiating the light beam from the light-emitting diode 20 onto the face of the observer.

The irradiation area of a light beam from the light-emitting diode 20 is limited such that the light beam is irradiated on only the face of the observer to prevent noise from background objects. The light-emitting diode 20 and the focusing lens 21 are constituent elements of the light-emitting means. Reference numerals 22 and 23 denote condenser lenses for focusing reflected light from the observer; and 22R, 22L, 23R, and 23L, light-receiving elements for converting light beams into electrical signals. The condenser lens 22 and the light-receiving elements 22R and 22L are constituent elements of the wide-region detection means. The condenser lens 23 and the light-receiving elements 23R and 23L are constituent elements of the narrow-region detection means.

In this embodiment, as the light-emitting diode 20, a diode having no directivity or a low directivity is used. The focusing lens 21 and the condense lenses 22 and 23 are fixed on a housing 25, which is a component of the viewpoint position detection sensor 92, through a member (not shown). The light-receiving elements 22R, 22L, 23R, and 23L are fixed to the housing 25 through a mount member 25a.

The condenser lens 22 is a short focal length lens. The condenser lens 23 is a long focal length lens. These lenses are constituent elements of the wide-region detection means and the narrow-region detection means, respectively. The light-receiving elements 22R, 22L, 23R, and 23L are arranged near the positions at which the face of the observer positioned at a standard observation distance (e.g., about 50 cm for a 15-inch display) is imaged by the condenser lenses 22 and 23.

The focal lengths of the condenser lenses 22 and 23 and the distances between the light-receiving elements 22R and 22L and between the light-receiving elements 23R and 23L are set such that the light-receiving areas of the respective light-receiving elements are set to the areas to be described later. The housing 25 containing the viewpoint position detection sensor 92 is fixed to a gear 27 which is rotatable about a shaft 26 mounted on the display body (not shown).

The gear 27 has a resistive element 27a serving as a position detection sensor for detecting the rotational position of the gear. A brush 24 fixed on the display body is pressed against the resistive element 27a. The resistive element 27a and the brush 24 provide rotation information of the housing 25 together. Reference numeral 29 denotes a motor for rotating the viewpoint position detection sensor 92 through a motor gear 28. The motor 29 is fixed on the display body.

Figure 5A:
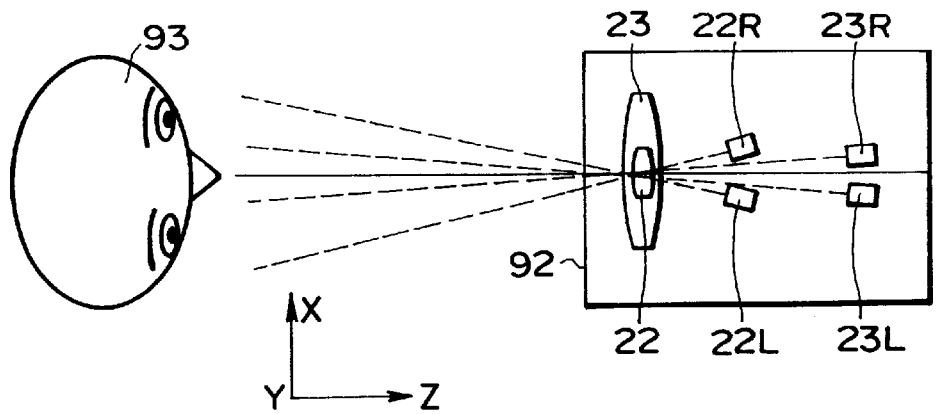
FIG. 5A is a view for explaining the principle of detection of the head portion (or viewpoint) of an observer 93 by a viewpoint position detection sensor 92 in the first embodiment of the present invention, showing a state in which the observer 93 faces straight the detection sensor (sensor) 92 and a display body 90.
Figure 5B:
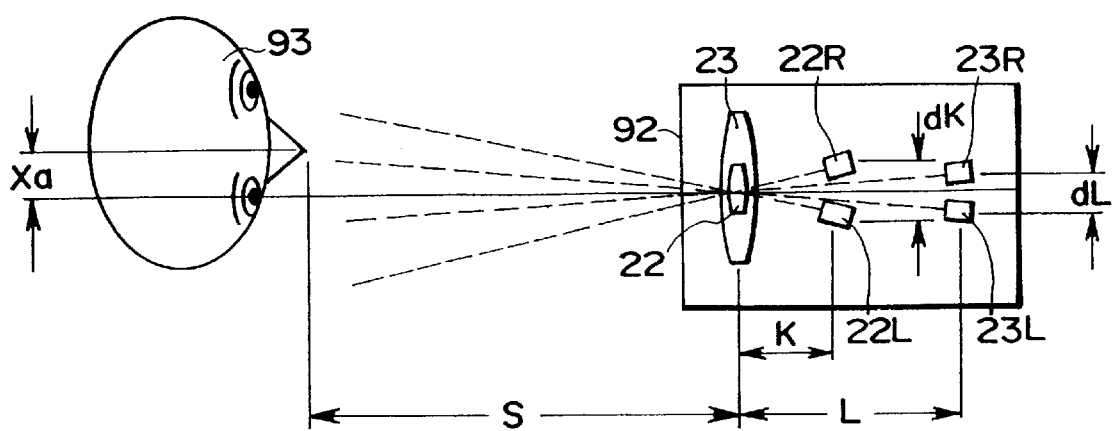
FIG. 5B is a view for explaining the principle of detection of the head portion (or viewpoint) of the observer 93 by the viewpoint position detection sensor 92 in the first embodiment of the present invention, showing a state in which the observer 93 has moved from the reference position in FIG. 5A by a distance Xa in the X direction.
Figure 5C:
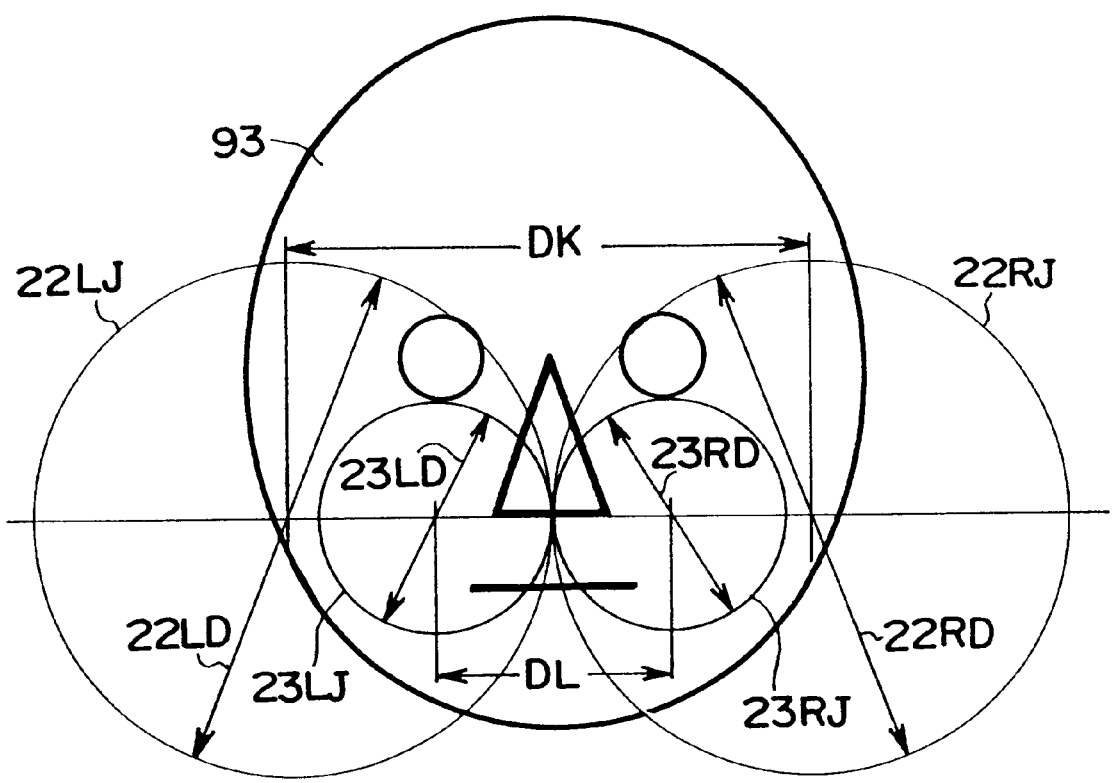
FIG. 5C is a view for explaining the light-receiving areas of light-receiving elements 22R, 22L, 23R, and 23L in the state (FIG. 5A) in which the angle of the detection sensor 92 is adjusted in the up-and-down direction to cause the observer to face straight the detection sensor.

FIGS. 5A, 5B, and 5C are views for explaining the principle of a technique of detecting the head portion (or viewpoint) of the observer 93 by using the viewpoint position detection sensor 92 in this embodiment.

FIG. 5A shows a state in which the observer 93 faces straight the viewpoint position detection sensor (sensor) 92 and the display body 90. This state is regarded as the reference state of the viewpoint position detection sensor 92.

FIG. 5B shows a state in which the observer 93 has moved from the reference position in FIG. 5A by a distance Xa in the X direction. Referring to FIG. 5B, reference symbol Xa denotes the movement amount of the observer 93 from the central position of the sensor 92; S, the distance between the observer 93 and the condenser lenses 22 and 23; L, the distance between the condenser lens 23 and the light-receiving elements 23R and 23L; K, the distance between the condenser lens 22 and the light-receiving elements 22R and 22L; dK, the distance between the wide-area light-receiving elements 22R and 22L; and dL, the distance between the narrow area light-receiving elements 23R and 23L.

FIG. 5C shows the light-receiving areas of the respective light-receiving elements 22R, 22L, 23R, and 23L at the face position in the state shown in FIG. 5A, in which the angle of the detection sensor 92 in the vertical direction is properly adjusted to make the observer face straight the detection sensor 92. Referring to FIG. 5C, reference numerals 22LJ, 22RJ, 23LJ, and 23RJ denote the light-receiving areas of the respective light-receiving elements 22L, 22R, 23L, and 23R.

Let 22LD, 22RD, 23LD and 23RD be the diameters of the respective light-receiving areas, DK and DL be the distances between the centers of the respective light-receiving areas, and dJ be the diameter of the light-receiving surface of each light-receiving element, the following equations are approximately formulated:

$$dL/L=DL/S \quad (2)$$

$$dK/K=DS/S \quad (3)$$

$$dJ/L=23LD/S=23RD/S \quad (4)$$

$$dJ/K=22LD/S=22RD/S \quad (5)$$

In this embodiment, the light-receiving areas and the distances between the centers of the light-receiving areas are set to desired values by properly setting the positions of the respective light-receiving elements 22R, 22L, 23R, and 23L and the focal lengths of the condenser lenses 22 and 23.

Figure 6:
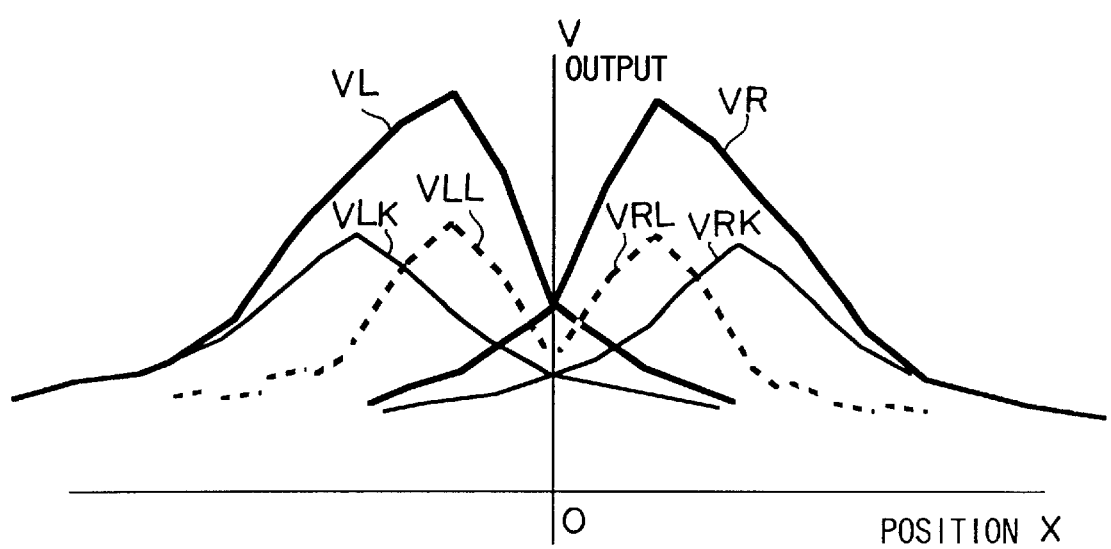
FIG. 6 is a graph for explaining outputs from the light-receiving elements 22R, 22L, 23R, and 23L in the first embodiment of the present invention.

FIG. 6 is a graph showing outputs from the respective light-receiving elements 22R, 22L, 23R, and 23L in this embodiment. In the embodiment, the detection sensor 92 rotates to follow the lateral movement of the observer. To explain the principle of this operation, FIG. 6 shows the values obtained when the follow-up mechanism is stopped. The V-axis indicates the outputs from the light-receiving elements after they are amplified; and the X-axis, the lateral position of the observer. "X=0" indicates the reference position at which the observer faces straight at the detection sensor 92.

Reference symbol VR denotes the sum of the outputs from the light-receiving elements 22R and 23R; VL, the sum of the outputs from the light-receiving elements 22L and 23L; VLL and VLK, the outputs from the light-receiving elements 23L and 22L which are obtained by decomposing the output VL into elements and shown to explain the principle. Similarly, reference symbols VRL and VRK denote the outputs from the light-receiving elements 23R and 22R.

When the follow-up function is activated, the viewpoint position detection sensor 92 rotates to follow the movement of the observer 93, and stops at the intersection between the curves VL and VR upon execution of the processing to be described later. Letting Q be the angle of the sensor 92 with respect to the reference position, b be the displacement amount of the lenticular lens 1 with respect to the reference position, which is based on the angle Q, and f be the focal length of the lenticular lens, control is performed to satisfy $$b=f\times\tan Q \quad (6)$$

Figure 7:
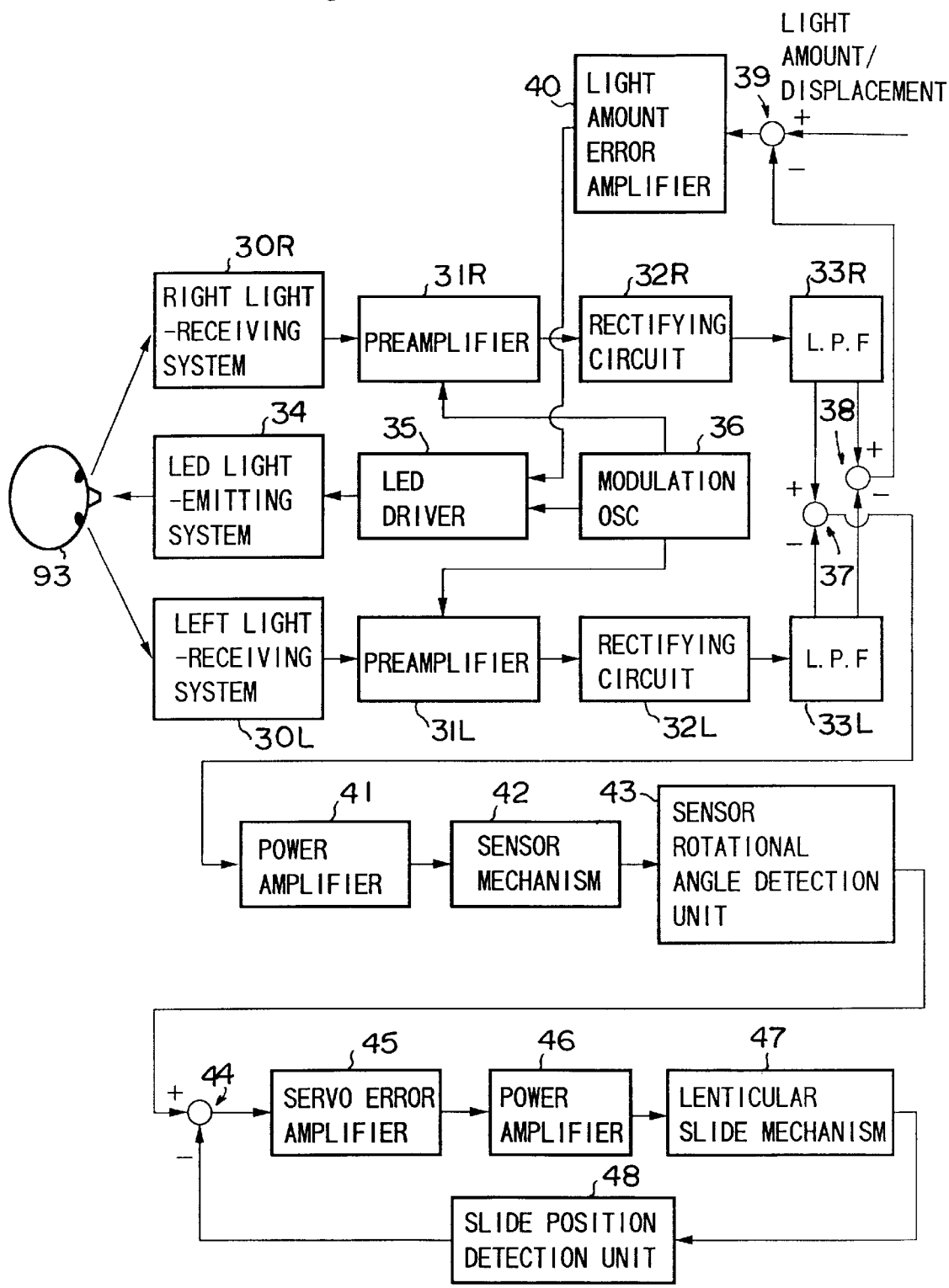
FIG. 7 is a block diagram for explaining the flow of signals in the first embodiment of the present invention.

The flow of processing for the follow-up function in this embodiment will be described next. FIG. 7 is a block diagram for explaining the flow of signals in the embodiment.

Referring to FIG. 7, reference numerals 30R and 30L denote right-side and left-side light-receiving systems respectively including the condenser lenses 22 and 23 and the light-receiving elements 22R and 22L, 23R and 23L; 31R and 31L, preamplifiers for AC-amplifying signals from the light-receiving systems 30R and 30L to proper output levels; 32R and 32L, rectifying circuits for rectifying the AC signals from the preamplifiers 31R and 31L; 33R and 33L, low-pass filters for smoothing the signals rectified by the rectifying circuits 32R and 32L; 34, a light-emitting system for emitting a light beam from the light-emitting diode 20 to the observer 93; and 35, an LED driver for controlling the emission timing and intensity of light from the light-emitting diode 20 and driving it in accordance with a predetermined control signal.

Reference numeral 36 denotes a modulation OSC for performing modulation to remove disturbance light from indoor fluorescent lamps and the like other than the light-emitting system 34. Signals for this modulation are supplied to the light-emitting system 34 and the preamplifiers 31R and 31L and synchronize with each other to remove disturbance light.

A frequency (emission frequency) for this modulation is set to a value other than an integer multiple of the display frequency of the image display unit 2 so as to reduce the influences on image display.

Reference numeral 37 denotes an arithmetic unit for calculating the difference between the signal from the low-pass filter 33R, which corresponds to the above output VR, and the signal from the low-pass filter 33L, which corresponds to the above output VL. When this value becomes 0, the detection sensor stops rotating. At this time, the position of the head portion of the observer 93 is regarded as the viewpoint position, and the lenticular lens 1 is driven/controlled. Reference numeral 38 denotes an adder for obtaining the sum of values from the low-pass filters 33R and 33L. The value obtained by the adder 38 represents the amount/intensity of light which has reached the observer 93.

Reference numeral 39 denotes a subtracter for calculating the difference between a predetermined light amount and the light amount determined by adder 38; and 40, a light amount error amplifier for amplifying the difference between the light amounts. To keep the value obtained by the adder 38 constant, the LED driver 35 is feedback-controlled through the subtracter 39 and the light amount error amplifier 40. With this operation, a stable output can always be obtained regardless of the change in distance between the observer 93 and the display 90, thus ensuring the stability of the feedback system.

Reference numeral 41 denotes a power amplifier constituted by a power transistors and the like to amplify the power of an output signal from the subtracter 37; 42, a sensor mechanism in FIG. 4; 43, a sensor rotational angle detection unit for detecting the rotational angle of the sensor 92; 44, a subtracter as a component of a feedback control system for a lenticular slide mechanism 47; 45, a servo error amplifier for amplifying, integrating, or differentiating a signal from the subtracter 44; 46, a power amplifier constituted by a power transistor and the like to amplify the power of a signal from the servo error amplifier 45; 47, the lenticular slide mechanism in FIG. 3; and 48, a slide position detection unit obtained by adding an electronic detection circuit to the permanent magnet 14 and the Hall element 15 in FIG. 3.

In this embodiment, with the above arrangement of the respective elements, the viewpoint position detection sensor follows the movement of the observer such that the outputs from the right and left light-receiving systems 30R and 30L become equal to each other. With this operation, the angle Q of the sensor 92 with respect to the reference position is obtained, and the lenticular lens 1 is moved by the distance b, thereby allowing the observer to follow up the stereoscopic vision region.

The effects obtained by using a plurality of pairs of light-receiving elements in this embodiment will be described next. In the embodiment, a total of four light-receiving elements, i.e., the narrow-area light-receiving elements 23R and 23L and the wide-area light-receiving elements 22R and 22L, are used. Since the narrow-area light-receiving elements 23R and 23L have narrow light-receiving areas, the light-receiving elements 23R and 23L can detect luminances at parts of the face of the observer, e.g., the nose and the lips, with high precision.

The wide-area light-receiving elements 22R and 22L detect the face in a wide area. That is, the detection areas of these elements include background portions as well. The light-receiving elements 22R and 22L can therefore detect the position of the face even if the face greatly shifts from the reference position. A viewpoint position can be detected by only one pair of right and left light-receiving elements. In this case, however, if the light-receiving areas and the distance between the right and left light-receiving areas are reduced to improve the detection precision, the follow-up mechanism cannot follow up the large movement of the observer within a short period of time. As a result, the observer completely moves out of the light-receiving areas, leading to an uncontrollable state.

If wide light-receiving areas are set, this uncontrollable state can be avoided. In this case, however, the detection precision decreases. Even if, the observer rotates his/her head portion, and the positions of the eyes (viewpoint position) change, no reaction occurs, because the light-receiving elements cannot detect parts of the face.

In contrast to this, according to this embodiment, when the observer moves greatly, signals from the wide-area light-receiving elements act to avoid an uncontrollable state. At positions near the stable point, signals from the narrow-area light-receiving elements act to contribute to an increase in precision.

A viewpoint position can be detected more accurately by detecting the tip of the nose near the eyes. For this purpose, the number of light-receiving elements is not limited to four and may be increased as needed.

With the use of the above detection scheme of this embodiment, high-speed detection can be realized with a simple arrangement, and a viewpoint position can be detected with high precision in a wide area, as compared with detection based on image processing.

(Second Embodiment)

Figure 8:
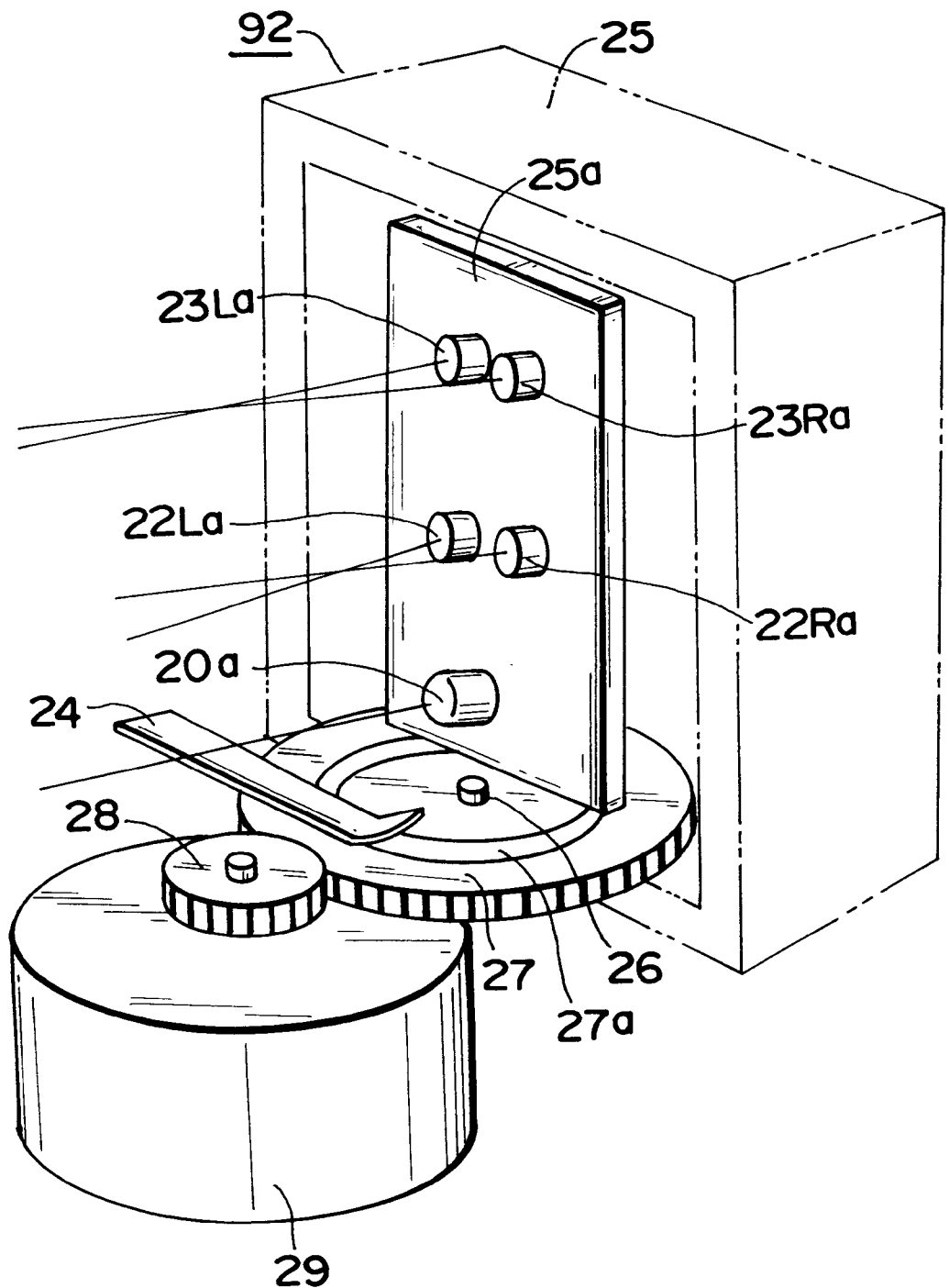
FIG. 8 is a perspective view showing the main part of a viewpoint position detection sensor in the second embodiment of the present invention.

FIG. 8 is a perspective view showing the main part of a viewpoint position detection sensor 92 in the second embodiment of the present invention. This embodiment has the same arrangement as that of the first embodiment in FIG. 4 except that a high-directivity light-emitting diode 20a and high-directivity light-receiving elements 22Ra, 22La, 23Ra, and 23La are used instead of the focusing lens and the condenser lenses.

Referring to FIG. 8, reference numeral 25 denotes a housing for a detection sensor 102. The light-emitting diode 20a has a high directivity and serves as a light source for emitting light. The light-receiving elements 22Ra, 22La, 23Ra, and 23La have high directivities and serve to convert light beams into electrical signals. These light-receiving elements are fixed to the housing 25 through a mount member 25a.

In this embodiment, each light-receiving element has directivity characteristics. The light-receiving elements 23La and 23Ra have high directivities to serve as narrow-area light-receiving elements, whereas the light-receiving elements 22La and 22Ra have low directivities to serve as wide-area light-receiving elements. The directivity directions and areas of the light-receiving elements 23La, 23Ra, 22La and 22Ra are set such that the light-receiving areas of the respective light-receiving elements become the areas to be described later.

Figure 9:
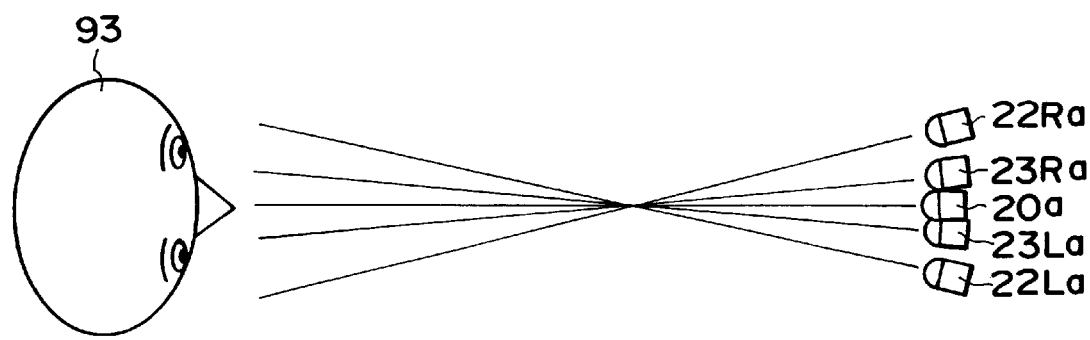
FIG. 9 is a view for explaining the principle of detection in the second embodiment of the present invention.

FIG. 9 is a view for explaining the principle of detection in the second embodiment in FIG. 8. As in the first embodiment, an observer 93 is irradiated with a light beam from the light-emitting diode 20a. FIG. 9 shows the light-emitting system and the light-receiving system in this case. The light reflected by the observer 93 irradiated with the light beam from the light-emitting diode 20a is received by the light-receiving elements 22La, 22Ra, 23La, and 23Ra. The light-receiving areas in this case are set by selecting directivity characteristics for each light-receiving element and executing the same method as that shown in FIG. 5C, as in the first embodiment.

Figure 10:
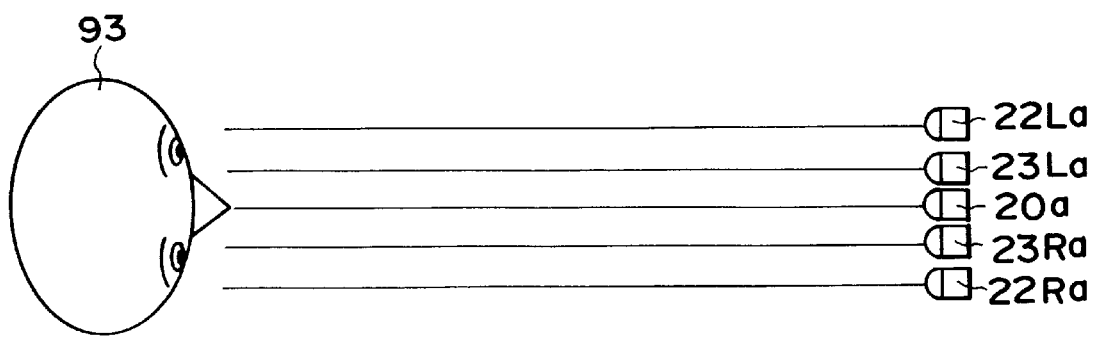
FIG. 10 is a view for explaining the principle of detection of a viewpoint position in the second embodiment of the present invention.

FIG. 10 shows a modification of the second embodiment, in which the light-receiving elements 22Ra, 22La, 23Ra, and 23La having directivities are arranged such that their optical axes become parallel to each other. In the first and second embodiments described above, as shown in FIGS. 5A and 9, the optical axes of the pairs of right and left light-receiving elements cross each other.

In this arrangement, when the distance (observation distance) between the observer and the display changes, the distances between the light-receiving areas of the right and left light-receiving elements change. As a result, the position detection precision changes depending on the observation distance. In this embodiment, although the light-receiving areas of the respective light-receiving elements change, the distances between the light-receiving areas undergo no change, thereby eliminating this drawback. The flow of processing is the same as that in the first embodiment. With the arrangement of this embodiment, the detection sensor can be simplified.

(Third Embodiment)

Figure 11:
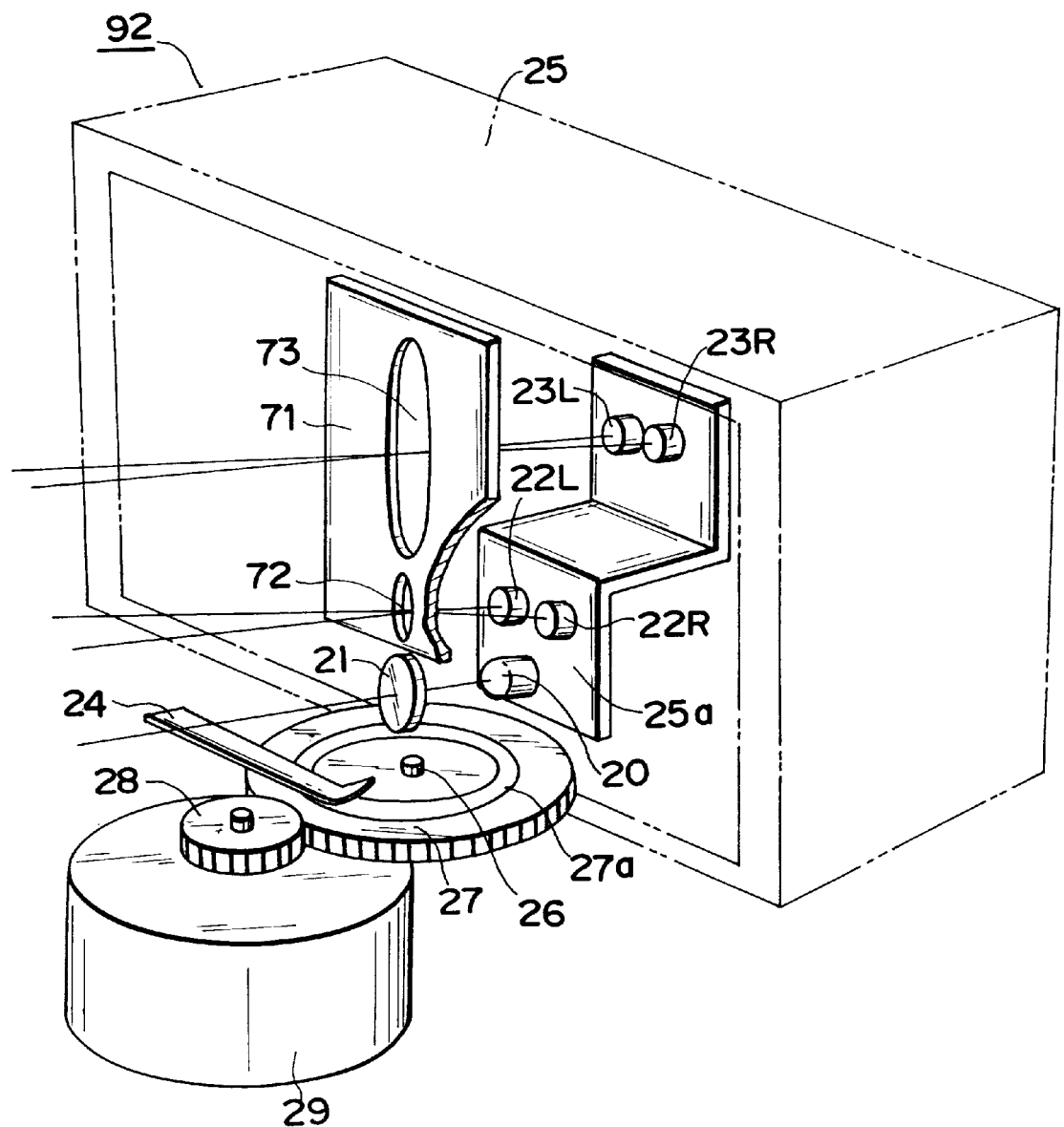
FIG. 11 is a perspective view showing the main part of a viewpoint position detection sensor in the third embodiment of the present invention.

FIG. 11 is a perspective view showing the main part of a viewpoint position detection sensor 92 in the third embodiment of the present invention. This embodiment has the same arrangement as that of the first embodiment except that a light-shielding plate 71 having a wide-area slit 72 and a narrow-area slit 73 is used instead of the focusing lens and the condenser lenses.

Referring to FIG. 11, reference numeral 25 denotes a housing for a detection sensor; and 20, a light-emitting diode (LED) serving as a light source for emitting light. The light-shielding plate 71 has the wide-area light-receiving slit 72 and the narrow-area light-receiving slit 73 and is fixed to the housing 25. Reference numerals 22R, 22L, 23R, and 23L denote light-receiving elements for converting light beams into electrical signals.

The light-receiving elements used in this embodiment have no or low directivities as in the first embodiment. The light-receiving elements 22R, 22L, 23R, and 23L are fixed to the housing 25 through a mount member 25a. The shapes of the slits 72 and 73 and the distances between the light-receiving elements 22L, 22R, 23L, and 23R are set such that the light-receiving areas of the respective light-receiving elements become the areas to be described later.

The above arrangement can widen the light-receiving areas in the up-and-down direction while maintaining the high position detection precision in the right-and-left direction. High control performance can also be ensured for the movement of the face of the observer in the up-and-down direction.

Figure 12A:
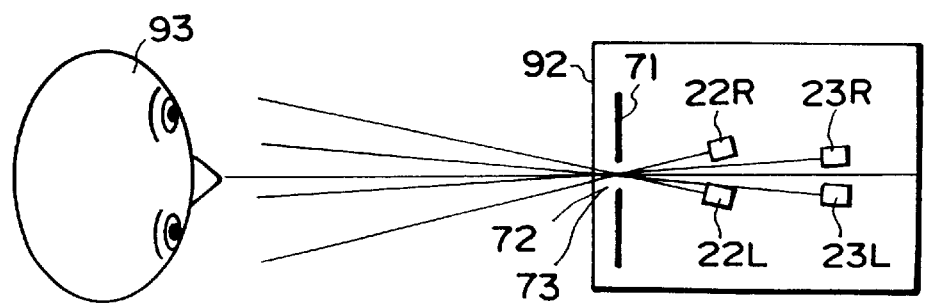
FIG. 12A is a view for explaining the principle of detection of the head portion (or viewpoint) of an observer 93 by a viewpoint position detection sensor 92 in the third embodiment of the present invention, showing a state in which the observer 93 faces straight the detection sensor (sensor) 92.
Figure 12B:
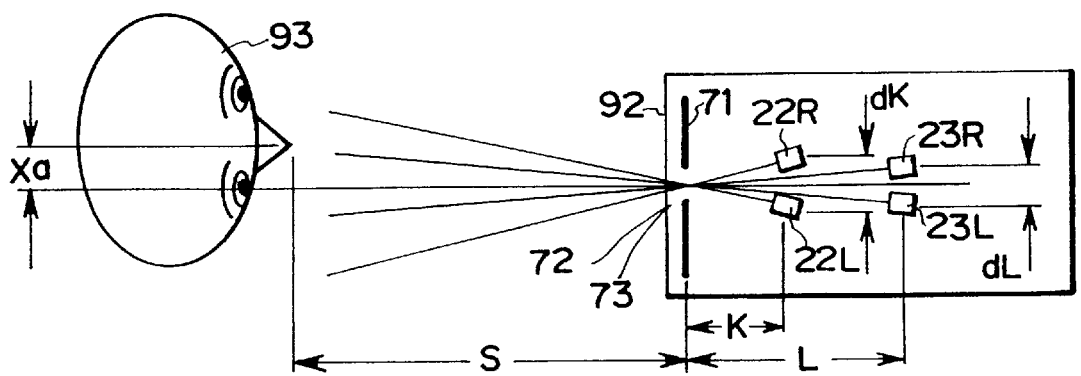
FIG. 12B is a view for explaining the principle of detection of the head portion (or viewpoint) of the observer 93 by the viewpoint position detection sensor in the third embodiment of the present invention, showing a state in which the observer 93 has moved from the reference position in FIG. 12A by a distance Xa in the X direction.
Figure 12C:
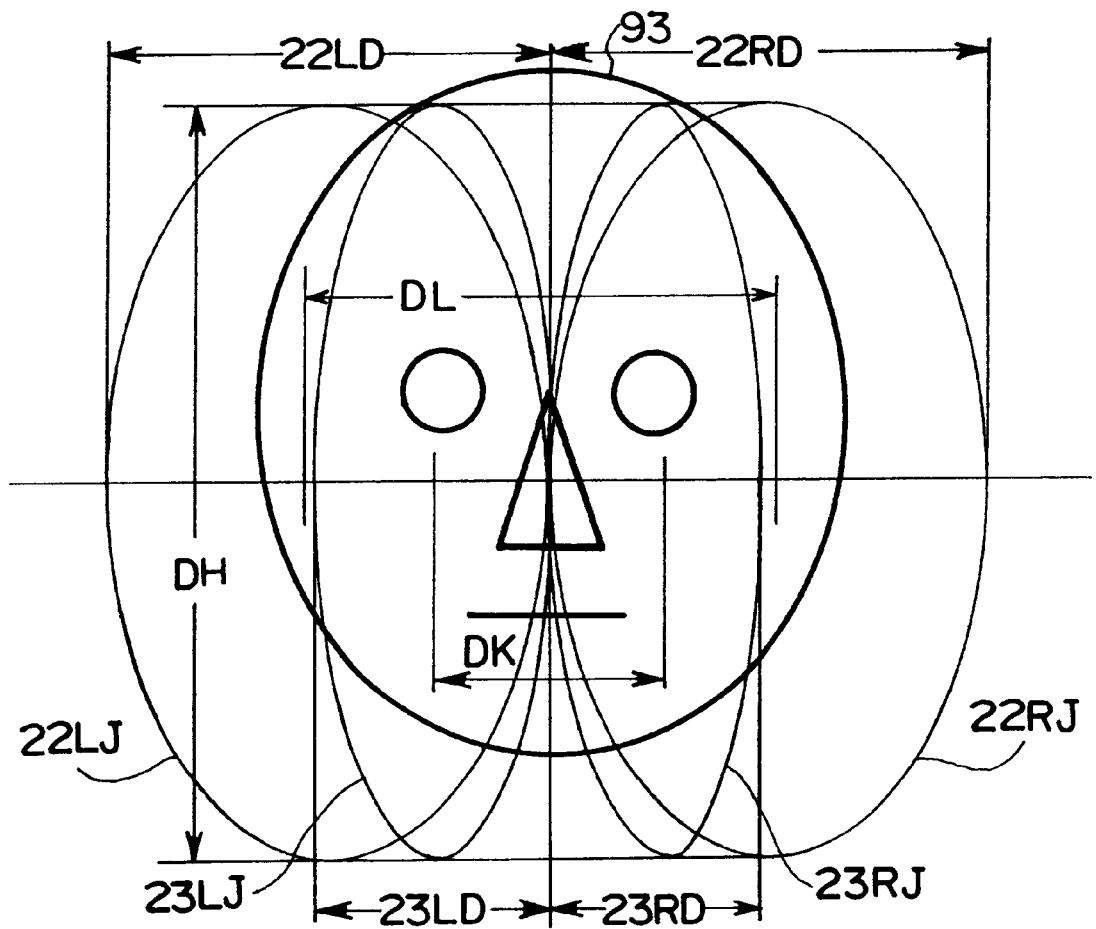
FIG. 12C is a view for explaining the light-receiving areas of light-receiving elements 22R, 22L, 23R, and 23L in the state (FIG. 12A) in which the angle of the detection sensor 92 is adjusted in the up-and-down direction to cause the observer to face straight the detection sensor.

FIGS. 12A, 12B, and 12C are views for explaining the principle of detection by the detection sensor 92 in this embodiment. FIG. 12A shows a state in which an observer 93 faces straight the detection sensor 92. FIG. 12B is a view for explaining the principle of viewpoint position detection to be performed when the observer 93 moves from the reference position by a certain distance. Referring to FIG. 12B, reference symbol Xa denotes the movement amount of the observer with respect to the central position of the sensor; S, the distance between the observer 93 and the slits 72 and 73; L, the distance between the slit 73 and the light-receiving elements 23L and 23R; K, the distance between the slit 72 and the light-receiving elements 22L and 22R; dK, the distance between the light-receiving elements 22R and 22L; and dL, the distance between the light-receiving elements 23R and 23L.

FIG. 12C shows the light-receiving areas of the light-receiving elements at the face position in the state shown in FIG. 12A, in which the angle of the detection sensor 92 in the up-and-down direction is properly adjusted to cause the observer 93 to face straight the detection sensor. Referring to FIG. 12C, reference numerals 22LJ, 22RJ, 23LJ, and 23RJ respectively denote the light-receiving areas of the light-receiving elements 22L, 22R, 23L, and 23R.

Assume that the lengths and widths of the respective light-receiving areas are set as shown in FIG. 12C, and the widths of the slits are sufficiently decreased. In this case, letting dHK and dHL be the lengths of the wide-area light-receiving slit 72 and the narrow-area light-receiving slit 73, and dJ be the diameter of the light-receiving surface of each light-receiving element, the following equations can be approximately formulated:

$$dL/L=DL/S \quad (7)$$

$$dK/K=DK/S \quad (8)$$

$$dJ/L=23LD/S=23RD/S \quad (9)$$

$$dJ/K=22LD/S=22RD/S \quad (10)$$

$$DH/S=dHK/K=dHL/L \quad (11)$$

In this embodiment, with the above arrangement of the light-receiving elements and the above settings of the slits, while the same detection precision in the right-and-left direction as that in the first embodiment is maintained, the light-receiving areas in the up-and-down direction are widened so that the control area for the movement of the observer in the up-and-down direction can be widened. The flow of processing is the same as that in the first embodiment.

(Fourth Embodiment)

Figure 13:
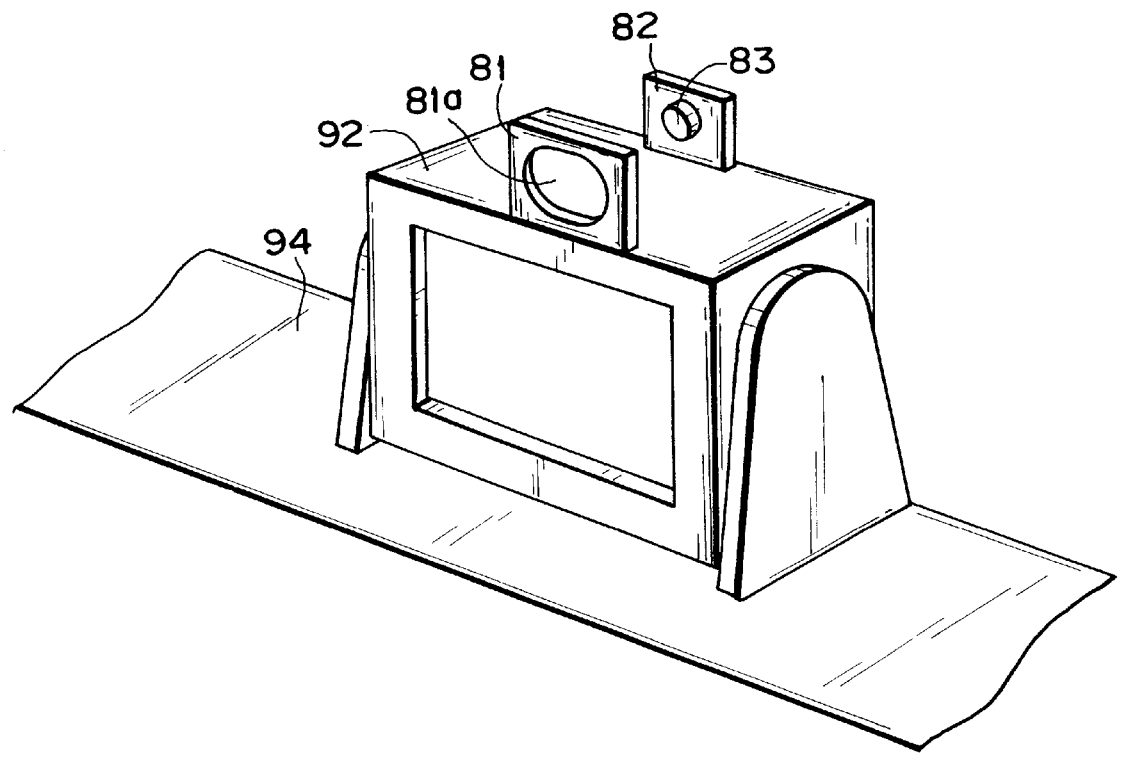
FIG. 13 is a perspective view showing the main part of a viewpoint position detection sensor in the fourth embodiment of the present invention.

FIG. 13 is a perspective view showing the main part of a portion of the fourth embodiment of the present invention. In the first, second, and third embodiments, the viewpoint detection function and the follow-up function can effectively work on condition that the face of the observer exists in the light-receiving areas of the wide-area or narrow-area light-receiving elements.

In each embodiment described above, the light-receiving areas of the light-receiving elements in the up-and-down direction in the initial state are adjusted by rotating the detection sensor in the up-and-down direction to set the face of the observer in the light-receiving areas.

In this embodiment, this initial adjustment can be easily executed with high precision by a position adjustment means. Referring to FIG. 13, reference numeral 92 denotes a viewpoint position detection sensor; 81 and 82, plate members mounted on the detection sensor 92; 83, a display member for vertical position adjustment of the detection sensor 92; and 81a, a window formed in the plate member 81 to observe the display member 83.

For example, the display member 83 is a light-emitting diode or an indicator having a color which can be easily recognized. The light-emitting diode 83 can also be used as the light-emitting diode 20 for emitting light toward the face of the observer in each embodiment described above. The position and size of the observation window 81a are set such that when an observer 93 sees the display member 83 from an observation position, and can observe the display member 83 through the window 81a, the face of the observer 93 is positioned in the light-receiving areas.

Figure 14:
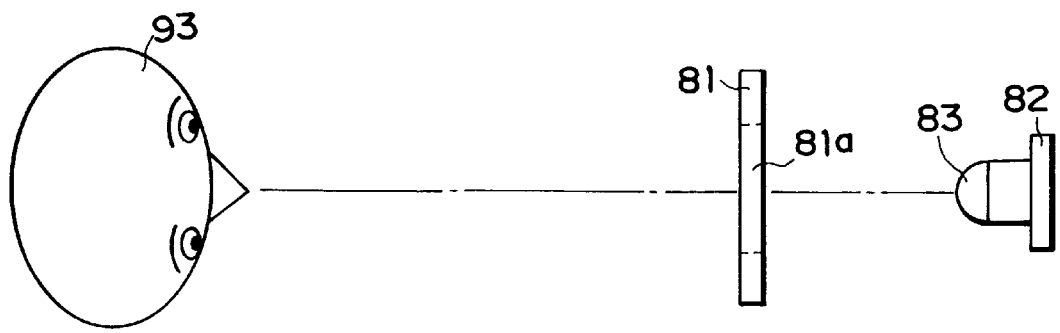
FIG. 14 is view for explaining the principle of adjustment in the fourth embodiment of the present invention, showing a state in which an observer 93 faces straight a detection sensor 92.

FIG. 14 is a view for explaining the principle of adjustment, and more specifically, a state in which the observer 93 faces straight the detection sensor 92.

Figure 15:
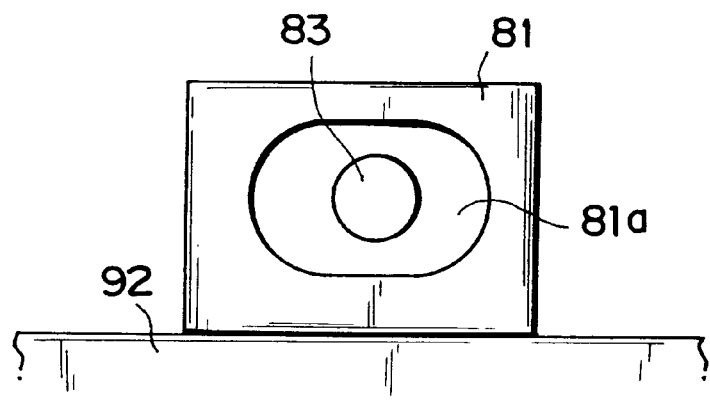
FIG. 15 is a view showing a reference state observed when the observer sees an adjustment mechanism from a reference position after he/she adjusts the mechanism.

FIG. 15 shows a reference state in which the observer sees the adjustment mechanism from the reference position after he/she adjusts the adjustment mechanism. In the initial state, the observer adjusts the detection sensor 92 in the up-and-down direction to see the display member 83 at the position in FIG. 15. With this adjustment, the observer can easily position his/her face within the light-receiving areas.

Figure 16:
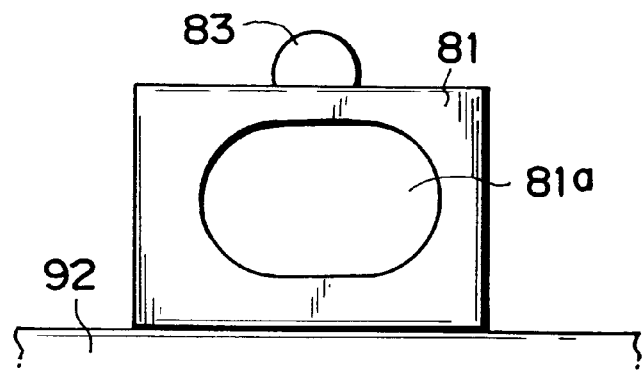
FIG. 16 is a view showing a state observed when the observer sees the adjustment mechanism after the viewpoint position has moved upward from the reference state.

FIG. 16 shows a state seen when the viewpoint position has moved upward from the reference state in FIG. 15. In this state, since the face of the observer 93 is out of the light-receiving areas of the detection sensor, the observer 93 adjusts the vertical position of the detection sensor 92 to the reference position in FIG. 15.

In this embodiment, in the above manner, initial adjustment of the position adjustment means can be easily performed to allow quick correction of the viewpoint position of the observer.

(Fifth Embodiment)

The fifth embodiment of the present invention will be described next. This embodiment has the same basic arrangement as that of the first embodiment except that two detection means, i.e., narrow-area and wide-area detection means, are used as a viewpoint position detection sensor, an image sensing element 23C serving as a light-receiving element of the narrow-area detection means is used to detect the viewpoint position (head portion position) of the observer by using signals from the two detection means, and the viewpoint position information obtained by the narrow-area detection means is used as a final decision.

The outer appearance and arrangement of this embodiment, the slide mechanism for the lenticular lens, and the like are the same as those shown in FIGS. 1 to 3. The arrangement of this embodiment will be described next. This description will be centered on the differences between the fifth and first embodiments.

Figure 17:
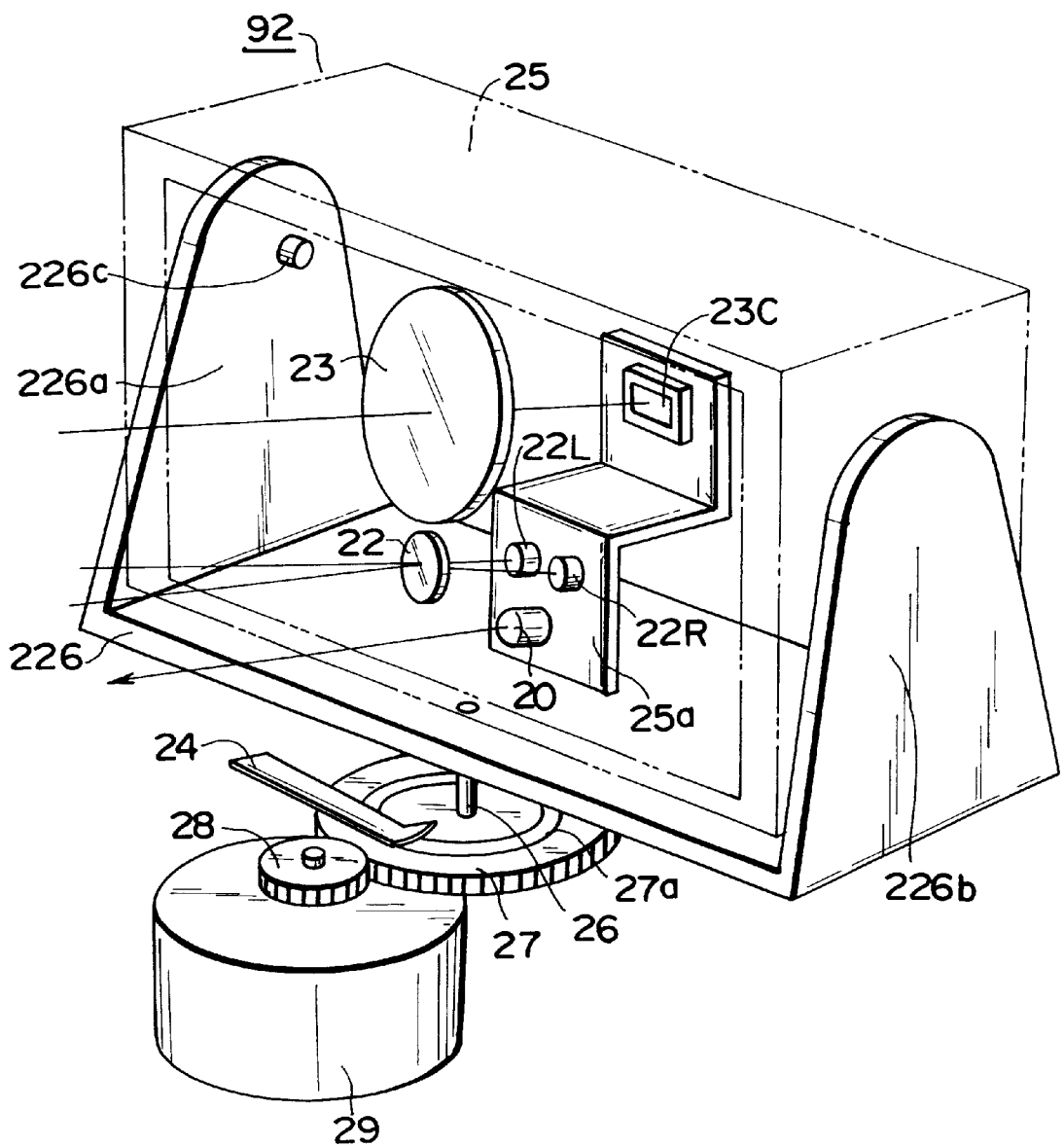
FIG. 17 is a perspective view showing the main part of a viewpoint position detection sensor in the fifth embodiment of the present invention.

FIG. 17 is a perspective view showing the main part of a viewpoint position detection sensor 92 according to the fifth embodiment of the present invention. Referring to FIG. 17, reference numeral 20 denotes an infrared-emitting diode serving as a light source for emitting light to irradiate the observer; 22 and 23, condenser lenses for focusing the light reflected by the observer; and 22R and 22L, light-receiving elements which are constituent elements of the wide-area detection means and serve to convert light beams into electrical signals. The image sensing element 23C is a two-dimensional image sensing element which is a constituent element of the narrow-area detection means.

The spectral characteristics of the light-emitting diode 20 and the spectral sensitivity characteristics of the light-receiving elements 22R and 22L are matched with each other to eliminate the influences of background light. In addition, emitted light is modulated, as described later. Furthermore, a light-emitting diode having a low directivity is used to effectively use the attenuation characteristics of light and eliminate the influences of background objects on the observer.

The spectral sensitivity characteristics of the image sensing element 23C are matched with the spectral characteristics of the light-emitting diode 20 to capture an image of the face of the observer irradiated with light from the light-emitting diode 20. The condenser lenses 22 and 23 are fixed to a housing 25 of the viewpoint position detection sensor 92 through a member (not shown). The light-receiving elements 22R and 22L are fixed to the housing 25 through a mount member 25a.

In the light-receiving system including the condenser lenses 22 and 23, the light-receiving elements 22R and 22L are arranged at the positions where the face of the observer located at a standard observation distance (about 50 cm for a 15-inch display) is imaged by the condenser lenses 22 and 23. The focal lengths of the condenser lenses 22 and 23, the distance between the light-receiving elements 22R and 22L, the sensing area of the image sensing element 23C, and the like will be described later.

The housing 25 of the detection sensor 92 can pivot about pins 226c and 226d (not shown) opposing arms 226a and 226c of a rotating frame 226. A gear 27 is fixed to a shaft 26 fixed to the rotating frame 226 to allow the display body (not shown) to rotate.

The gear 27 has a resistive element 27a for detecting the rotational position of the gear. A brush 24 fixed to the display body is pressed against the resistive element 27a. Reference numeral 29 denotes a motor which is fixed to the display body and used to rotate the detection sensor 92 through a motor gear 28.

Figure 18:
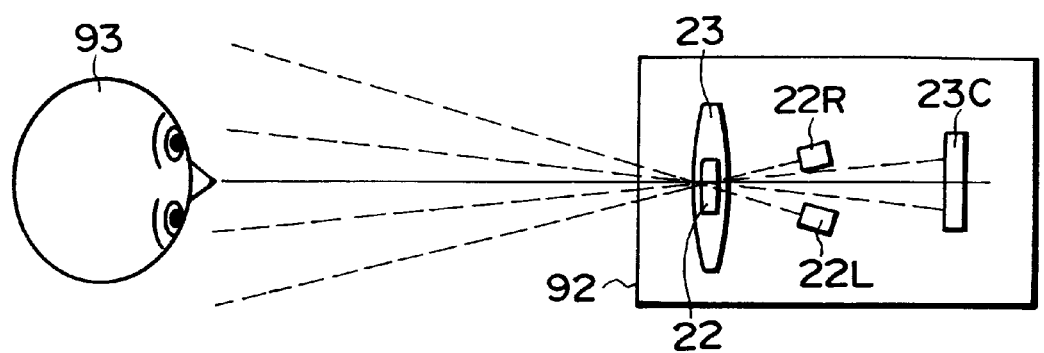
FIG. 18 is a view for explaining the principle of detection of a viewpoint in the fifth embodiment of the present invention.

FIG. 18 is a view for explaining the principle of viewpoint position detection in this embodiment. FIG. 18 shows a state in which an observer 93 faces straight the detection sensor and a display body 90 (FIG. 1). This state is regarded as the reference position of the viewpoint position detection sensor 92.

Figure 19:
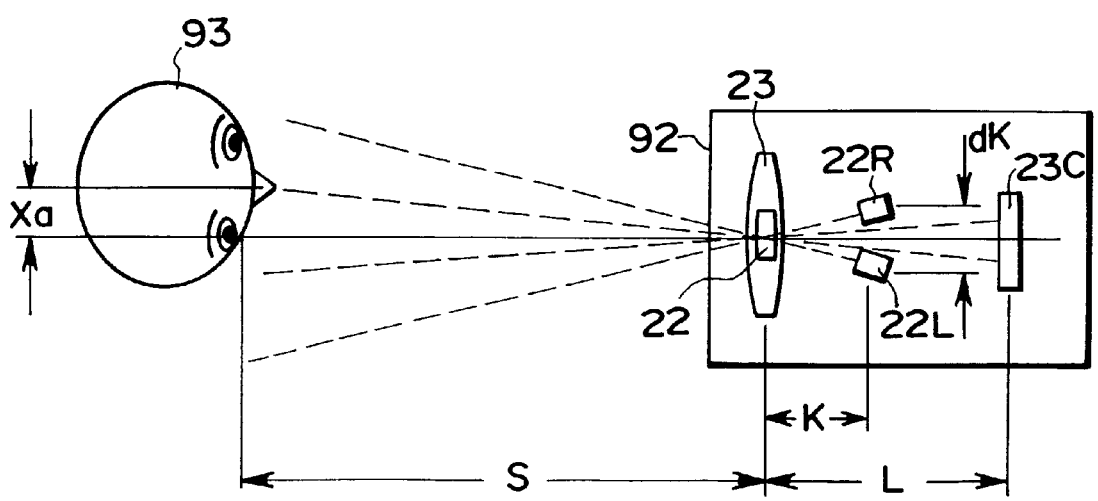
FIG. 19 is a view for explaining the principle of position detection to be performed when the position of an observer deviates from the center of the viewpoint position detection sensor.

FIG. 19 is a view for explaining the principle of position detection to be performed when the observer 93 has moved from the reference position in FIG. 18 by a distance Xa in the right-and-left direction.

Referring to FIG. 19, reference symbol Xa denotes the movement amount of the observer 93 from the central position of the sensor 92; S, the distance between the observer 93 and the condenser lenses 22 and 23; L, the distance between the condenser lens 23 and the image sensing element 23C; K, the distance between the condenser lens 22 and the light-receiving elements 22R and 22L; and dK, the distance between the light-receiving elements 22R and 22L.

Figure 20:
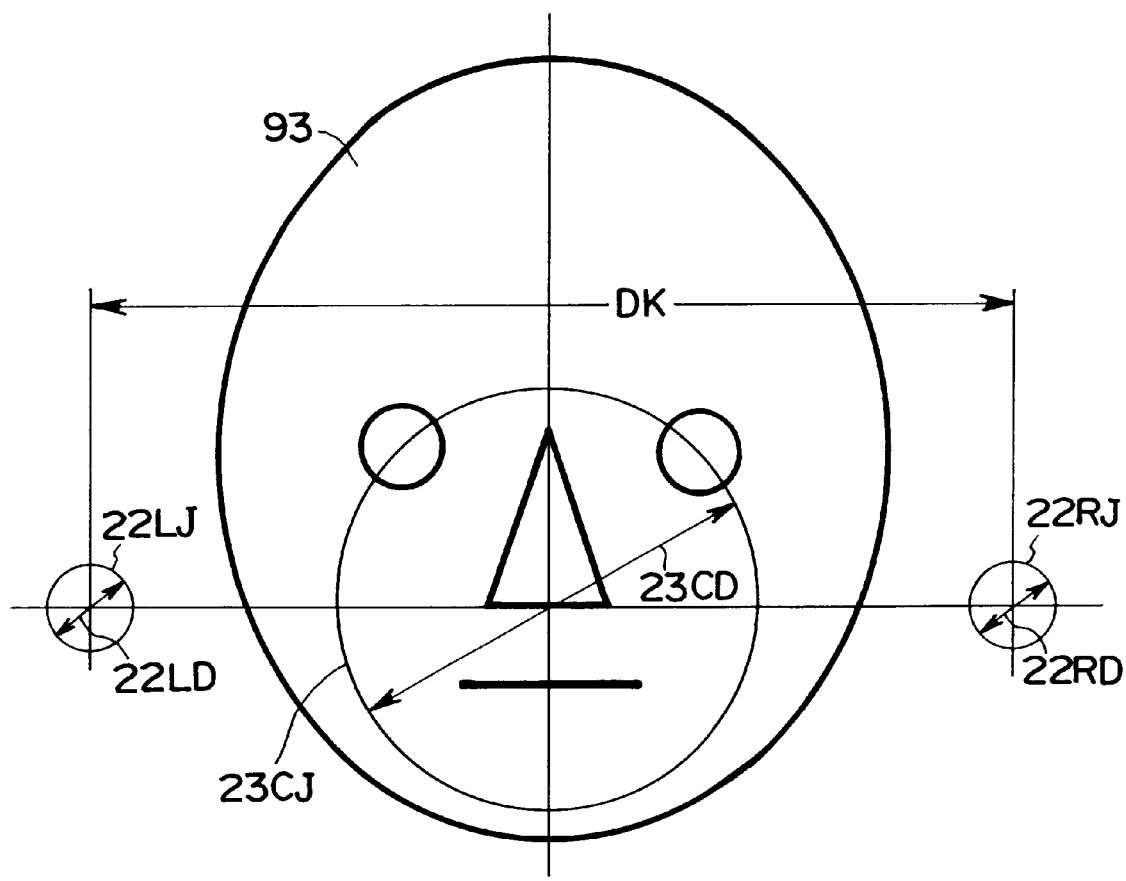
FIG. 20 is a view for explaining an image sensing area and light-receiving areas at the position of the observer in the fifth embodiment of the present invention.

FIG. 20 shows the light-receiving areas of the respective light-receiving elements and the sensing area of the image sensing element at the reference position of the observer 93, i.e., the face position in the state shown in FIG. 18, which is set by properly adjusting the angle of the detection sensor in the up-and-down direction.

Referring to FIG. 20, reference numerals 22LJ and 22RJ respectively denote the light-receiving areas of the light-receiving elements 22L and 22R; and 23CJ, the sensing area of the image sensing element 23C. Letting 22LD, 22RD, and 23CD be the diameters of th e respective areas, DK be the distance between the centers of the diameters 22LD and 22RD, dJ be the diameter of the light-receiving surface of each of the light-receiving elements 22L and 22R, and dC be the diameter of the effective image sensing area of the image sensing element 23C, the following equations are approximately formulated:

$$dK/K = DK/S \tag{12}$$

$$dC/L = 23CD/S \tag{13}$$

$$dJ/K = 22LD/S = 22RD/S \tag{14}$$

In this embodiment, the light-receiving areas, the image sensing area, the distance between the centers of the light-receiving areas are set to desired values by setting the arrangement of the light-receiving elements 22R and 22L and the image sensing element 23C, the focal lengths of the condenser lenses 22 and 23, and the like to proper values.

Figure 21:
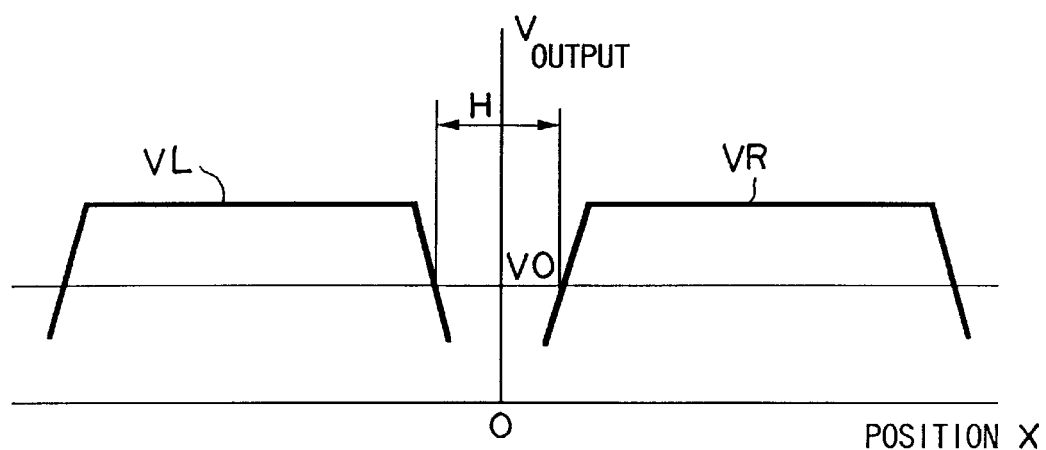
FIG. 21 is a graph for explaining outputs from light-receiving elements in the fifth embodiment of the present invention.

FIG. 21 is a graph for explaining outputs from the light-receiving elements 22R and 22L in this embodiment.

In this embodiment, the detection sensor 92 rotates to follow up the lateral movement of the observer 93. To explain the principle of this operation, FIG. 21 shows the values obtained when the follow-up mechanism is stopped. The V-axis indicates the outputs from the light-receiving elements 22R and 22L after they are amplified; and the X-axis, the lateral position of the observer 93. "X=0" indicates the reference position at which the observer 93 faces straight the detection sensor 92. Reference symbol VR denotes the output from the light-receiving element 22R; and VL, the output from the light-receiving element 22L. These outputs are output when the face 93 falls within the light-receiving areas 22LJ and 22RJ.

Assume that the follow-up mechanism for the detection sensor 92 is activated, and the viewpoint position detection sensor 92 has moved from the reference position to the right or left. In this case, with the processing to be described later, when the outputs from the light-receiving elements 22R and 22L are equal to or larger than a predetermined value V0 (threshold level), the viewpoint position detection sensor 92 rotates to follow up the movement of the observer 93, and stops when the outputs VR and VL fall within a area H in FIG. 21, i.e., a area equal to or lower than the threshold level. That is, this system has a dead zone having a width H.

Letting e be the distance between the eyes of the observer, the diameter 23CD of the image sensing area of the image sensing element 23C is almost equal to the distance e. If the dead zone H is set to e/2 or less, the image sensing area 23CD of the image sensing element 23C falls within the face.

Figure 22:
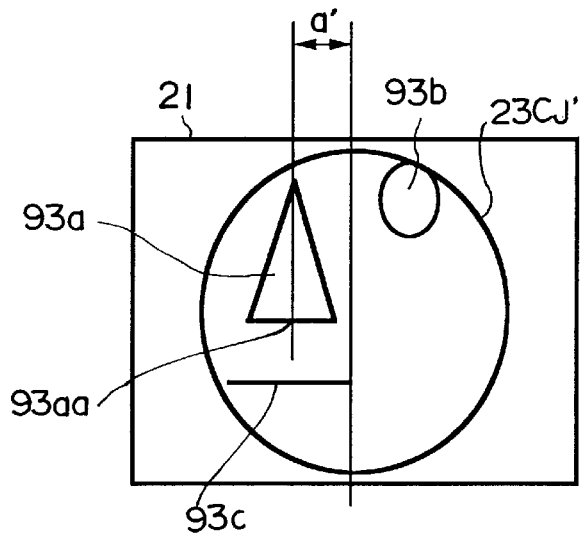
FIG. 22 is a view for explaining the face of the observer which is imaged on the light-receiving elements in the fifth embodiment of the present invention.

FIG. 22 shows a state in which the face of the observer 93 is imaged on the image sensing element 23C through the condenser lens 23. Reference numeral 23CJ' denotes the effective sensing area (the effective area can be arbitrarily shaped by electrically setting it or using a mechanical mask; a circular area is used in this embodiment); and 93a, 93b, and 93c, images of the nose, eye, and mouth of the observer schematically shown in FIG. 22. A maximum luminance is obtained at a vertex 93aa of the image 93a of the nose of the image formed by the light beam emitted from the light-emitting diode 20 and reflected by the face because the vertex 93aa is nearest to the detection sensor 92.

The detection sensor 92 is driven/controlled in the following manner in accordance with a distance a' between the vertex 93aa and the center of the image sensing element 23C as viewpoint position information. When a CCD is used as the image sensing element, this information is output as digital information in units of pixels constituting the image sensing element 23C. In this embodiment, this information is converted into analog information by a known method.

Figure 23:
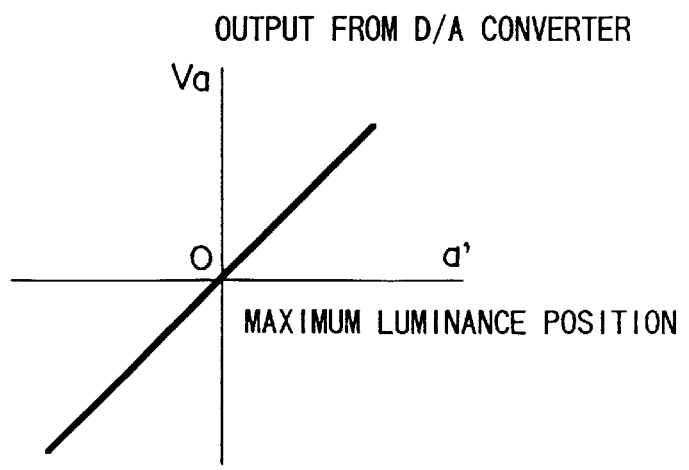
FIG. 23 is a graph for explaining the characteristics of a D/A converter in the fifth embodiment of the present invention.

FIG. 23 shows the D/A conversion characteristics of the image sensing element 23C. The abscissa represents a maximum luminance position a' on the image sensing element 23C; and the ordinate, the value of a voltage Va after D/A conversion. Letting Q be the angle of the detection sensor 92 with respect to the reference position when the output from this D/A converter becomes 0, a proper observation state can be obtained by controlling a displacement amount b of the lenticular lens 1 from the reference position, on the basis of the angle Q, as follows:

$$b = f \times \tan Q \tag{15}$$

where f is the focal length of the lenticular lens 1.

Figure 24:
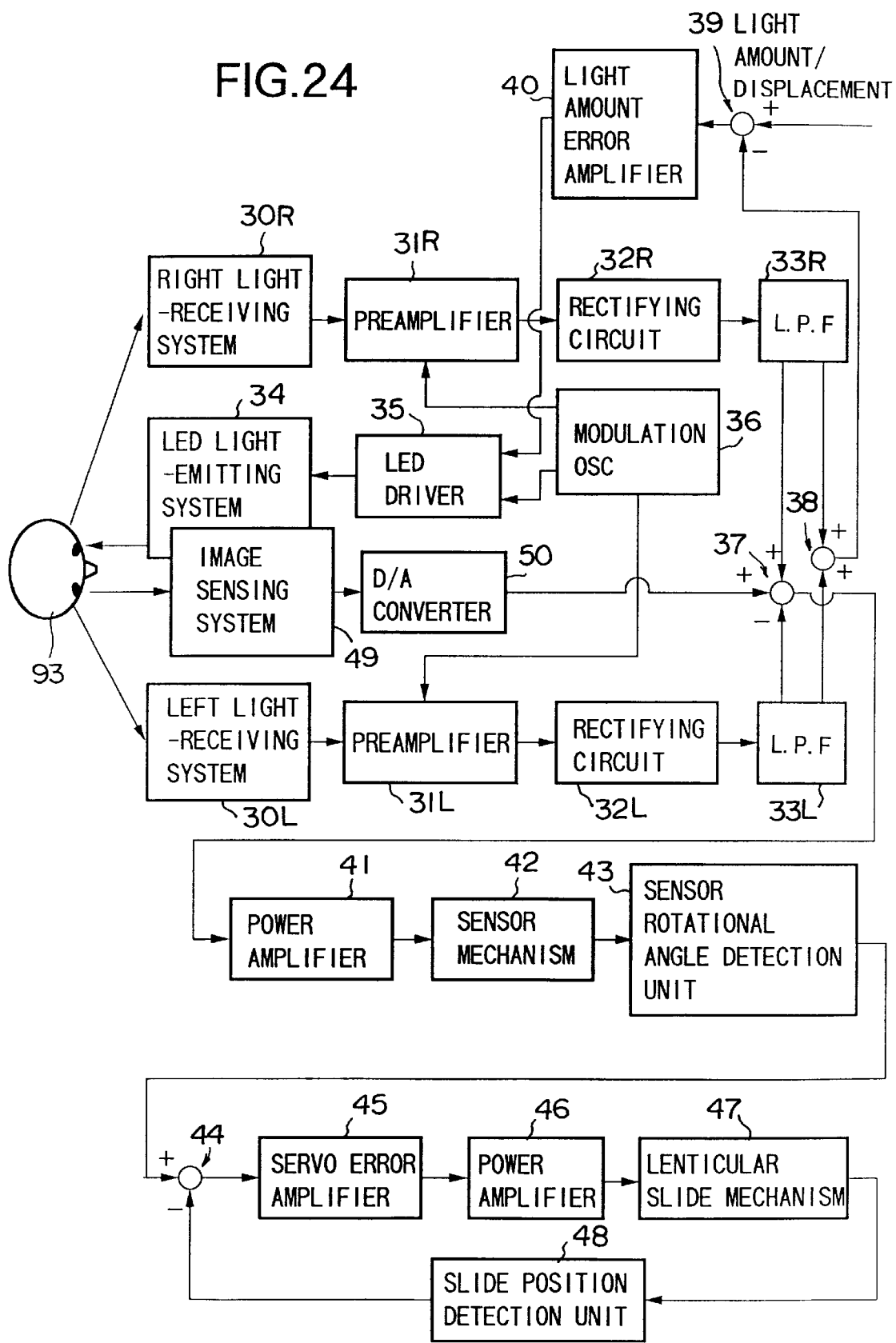
FIG. 24 is a block diagram showing the flow of signals in the fifth embodiment of the present invention.

The flow of signal processing in this embodiment will be described next. FIG. 24 is a block diagram for explaining the flow of signals in the fifth embodiment.

Referring to FIG. 24, reference numerals 30R and 30L denote right and left light-receiving systems respectively including the condenser lenses 22 and 23 and the light-receiving elements 22R and 22L; 31R and 31L, preamplifiers for AC-amplifying signals from the light-receiving systems 30R and 30L to proper output levels; 32R and 32L, rectifying circuits for rectifying the AC signals from the preamplifiers 31R and 31L; 33R and 33L, low-pass filters for smoothing the signals rectified by the rectifying circuits 32R and 32L; 34, a light-emitting system for irradiating a light beam from the light-emitting diode 20 onto the observer side; and 35, an LED driver for controlling the emission timing and intensity of light emitted from the light-emitting diode 20 in accordance with a predetermined control and driving the diode.

Reference numeral 36 denotes a modulation OSC for performing modulation to remove disturbance light from an indoor fluorescent lamp and the like other than the light-emitting system 34. Signals for this modulation are supplied to the light-emitting system 34 and the preamplifiers 31R and 31L and synchronize with each other to remove disturbance light.

An emission frequency for this modulation is set to a value other than an integer multiple of the display frequency of an image display unit 2 so as to reduce the influences on image display.

Reference numeral 49 denotes an image sensing system including the condenser lens 23 and the two-dimensional image sensing element 23C; and 50, a D/A converter for converting a digital output at a maximum luminance pixel position a' of the face image formed on the image sensing element 23C into an analog value.

Reference numeral 37 denotes an arithmetic unit for adding the output from the D/A converter 50 to the difference signal between the output signal from the low-pass filter 33R, which corresponds to the above output VR, and the output signal from the low-pass filter 33L, which corresponds to the above output VL. When this value becomes 0, the detection sensor stops rotating. At this time, the position of the head portion of the observer 93 is regarded as the viewpoint position, and the lenticular lens 1 is driven/controlled.

Reference numeral 38 denotes an adder for obtaining the sum of values from the low-pass filters 33R and 33L. The value obtained by the adder 38 represents the amount/intensity of light which has reached the observer 93. Reference numeral 39 denotes a subtracter for calculating the difference between a predetermined light amount and the above light amount; and 40, a light amount error amplifier for amplifying the difference between the light amounts. To keep the value obtained by the adder 38 constant, the LED driver 35 is feedback controlled through the subtracter 39 and the light amount error amplifier 40.

With this operation, a stable output can always be obtained regardless of the change in distance between the observer 93 and the display 90, thus ensuring the stability of the feedback system.

Reference numeral 41 denotes a power amplifier constituted by a power transistors and the like to amplify the power of an output signal from the arithmetic unit 37; 42, a sensor mechanism in FIG. 17; 43, a sensor rotational angle detection unit for detecting the rotational angle of the sensor 92; 44, a subtracter as a component of a feedback control system for a lenticular slide mechanism; 45, a servo error amplifier for amplifying, integrating, or differentiating a signal from the subtracter 44; 46, a power amplifier constituted by a power transistor and the like to amplify the power of a signal from the servo error amplifier 45; 47, the lenticular slide mechanism in FIG. 3; and 48, a slide position detection unit obtained by adding an electronic detection circuit to the permanent magnet 14 and the Hall element 15 in FIG. 3.

In this embodiment, with the above arrangement of the respective elements, the viewpoint position detection sensor 92 is caused to follow up the movement of the observer 93 such that outputs from the right and left light-receiving systems 30R and 30L become equal to or smaller than a predetermined threshold value V0 (FIG. 21), and the maximum luminance position a' (FIG. 22) becomes 0. The angle Q of the sensor 92 with respect to the reference position is then obtained, and the lenticular lens 1 is moved by the distance b, thereby ensuring a stereoscopic vision region following up the movement of the observer 93.

The effects of this embodiment will be described next. The embodiment uses the image sensing element 23C for narrow-area light reception and the two light-receiving elements 22R and 22L for the wide-area light reception. Since the narrow-area image sensing element has a narrow image sensing area, the element can detect information about a part of the face, e.g., the nose. Even with an image sensing element having a small number of pixels, a high position detection precision can be attained.

The wide-area light-receiving elements 22R and 22L detect the head portion in a wide area. That is, the detection areas of these elements include portions other than the head portion. The light-receiving elements 22R and 22L can therefore detect the position of the head portion even if it greatly shifts from the reference position.

A viewpoint position can be detected by only one sensor. In this case, however, if the light-receiving area or image sensing area is narrowed to improve the detection precision, the follow-up mechanism cannot follow up a large movement of the observer within a short period of time. As a result, the observer completely moves out of the light-receiving area, leading to an uncontrollable state. If a wide image sensing area is set, this uncontrollable state can be avoided. In this case, however, the detection precision decreases. Even if, the observer rotates his/her head portion, and the positions of the eyes (viewpoint position) change, no reaction occurs and proper control for the viewpoint position cannot be performed, because no part of the face can be detected.

A viewpoint position detection apparatus using only a two-dimensional image sensing element requires an image sensing element having a large number of pixels to perform detection with high precision in a wide area. In this case, since it takes much time to perform image processing, problems are posed in terms of follow-up speed and cost.

In contrast to this, according to this embodiment, when the observer moves greatly, the wide-area light-receiving elements 22R and 22L operate to avoid an uncontrollable state. With the dead zone set in the control system constituted by the wide-area light-receiving elements 22R and 22L, signals from the narrow area image sensing element are preferentially used at positions near the stable point to improve the position detection precision.

In addition, in this embodiment, since the light reflected by the observer is used, recognition error due to an object behind the observer can be prevented owing to the quick attenuation of light. Since the visual field of the narrow-area image sensing element is limited to the face of the observer, background information has no influence.

(Sixth Embodiment)

Figure 25:
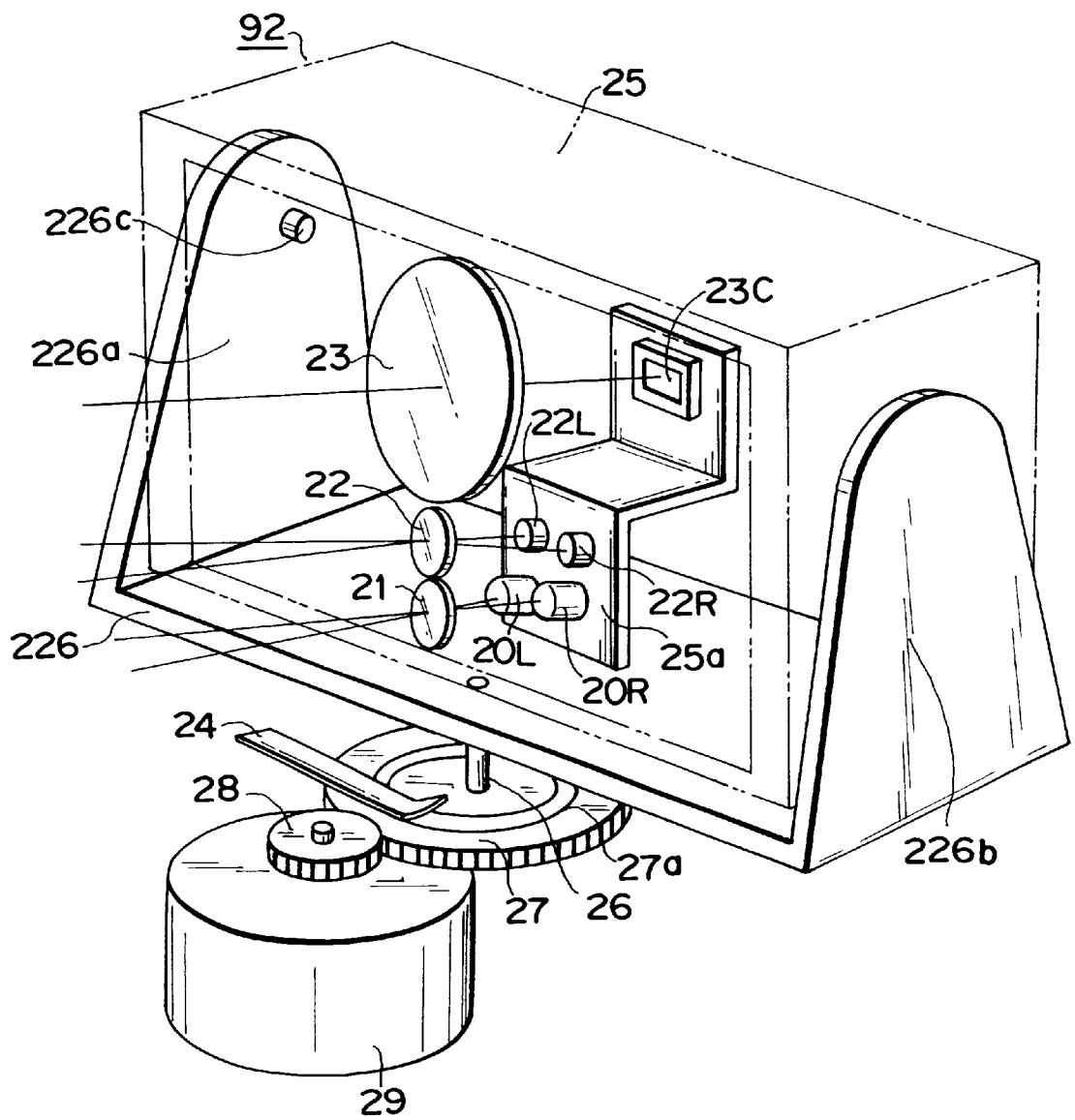
FIG. 25 is a perspective view showing the main part of a viewpoint position detection sensor in the sixth embodiment of the present invention.

FIG. 25 is a perspective view showing the main part of a position detection sensor 92 in the sixth embodiment of the present invention. The arrangement of this embodiment will be described next. This description will be centered on the differences between the sixth and fifth embodiments. In the fifth embodiment, in performing narrow-area detection, the light emitted from the infrared-emitting diode and reflected by the face is detected by the image sensing element, and the maximum luminance position is detected as a viewpoint position. With this operation, a detection error with respect to the proper position may occur, or a maximum luminance may be erroneously detected with respect to an observer with glasses because of abnormal reflections by the glasses.

In this embodiment, therefore, the positions of images of the eyes of the observer in general indoor light are obtained by a known pattern matching method, and the position of the face is detected in a wide area before pattern matching.

The same reference numerals in FIG. 25 denote the same parts as in FIG. 17. Referring to FIG. 25, reference numerals 20R and 20L denote light-emitting diodes serving as light sources for emitting light. Although the spectral characteristics of the light-emitting diodes and light-receiving elements are the same as those in the fifth embodiment, the sixth embodiment uses the two light-emitting diodes 20R and 20L, which have low directivities.

Reference numeral 21 denotes a focusing lens for focusing light emitted from the light-emitting diodes 20R and 20L; and 23C, an image sensing element for sensing the face of the observer irradiated with indoor light. This image sensing element is placed at the imaging position of a condenser lens 23 as in the fifth embodiment, and the spectral sensitivity characteristics of the image sensing element are matched with indoor light.

Figure 26:
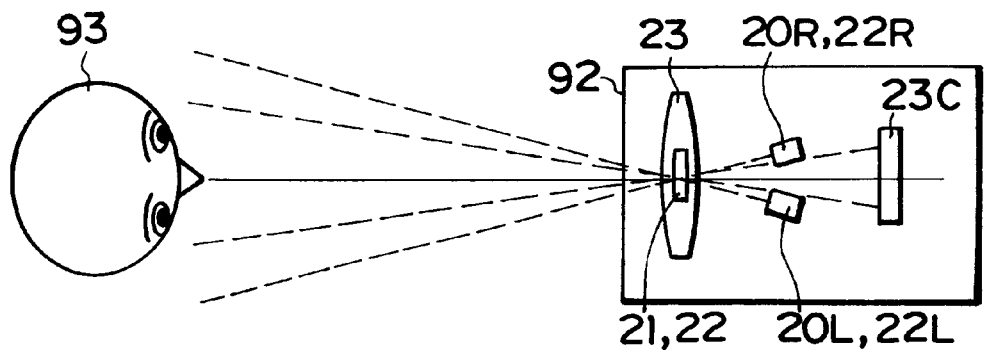
FIG. 26 is a view for explaining the principle of detection of a viewpoint position in the sixth embodiment of the present invention.

FIG. 26 is a view for explaining the principle of viewpoint position detection in this embodiment. FIG. 26 shows a state (reference position) in which an observer 93 faces straight the detection sensor 92. In this state, the light-emitting diodes 20R and 20L and light-receiving elements 22R and 22L are arranged at the focal positions of the focusing lens 21 and a condenser lens 22 to be stacked in a direction perpendicular to the drawing surface. Similarly, the focusing lens 21 and the condenser lenses 22 and 23 are stacked in the direction perpendicular to the drawing surface.

Figure 27:
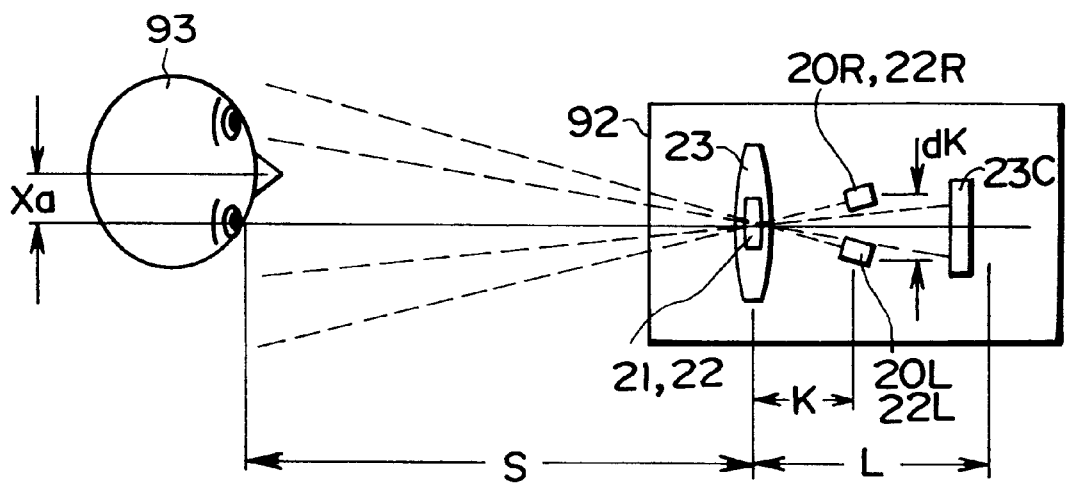
FIG. 27 is a view for explaining the principle of viewpoint detection to be performed when an observer has moved from the reference position by a distance Xa.
Figure 28:
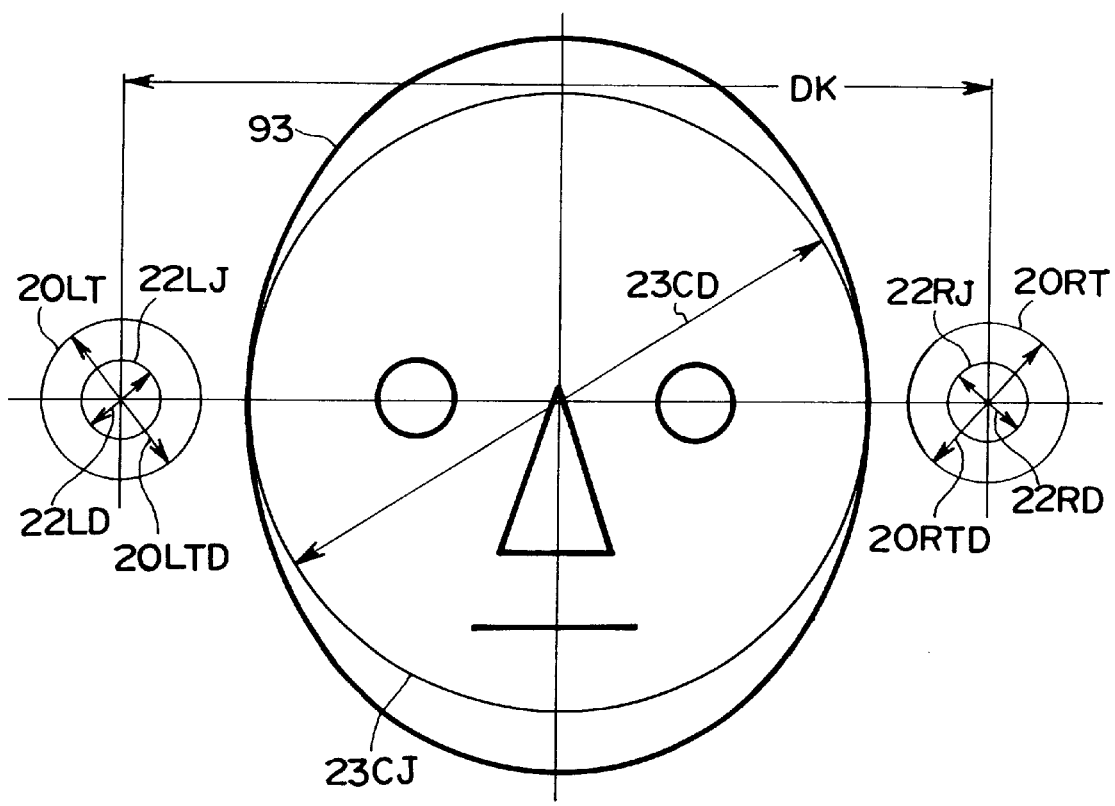
FIG. 28 is a view for explaining an image sensing area and light-receiving areas at a position where an observer 93 faces straight a detection sensor 92 upon adjustment of the angle of the detection sensor 92 in the up-and-down direction in the sixth embodiment of the present invention.

FIG. 27 is a view for explaining the principle of viewpoint detection to be performed when the observer has moved from the reference position in FIG. 26 by a distance Xa. FIG. 28 shows irradiation areas 20RT and 20LT of light beams from the light-emitting diodes 20R and 20L and the light-receiving areas 22RJ and 22LJ of the light-receiving elements 22R and 22L at the face position in the state shown in FIG. 26, in which the angle of the detection sensor in the up-and-down direction is properly adjusted to cause the observer 93 to face straight the detection sensor 92. FIG. 27 also shows an image sensing area 23CJ of the image sensing element 23C as in the fifth embodiment.

Reference numerals 20RTD, 20LTD, 20RD, and 20LD denote the diameters of the respective areas. Letting dH be the diameter of the emission surface of each of the light-emitting diodes 20R and 20L, equation (16) is approximately formulated as in the fifth embodiment:

$$dH/K = 20LD/S = 20RD/S \tag{16}$$

By properly setting the arrangement of the light-emitting diodes 20R and 20L and the focal length of the focusing lens 21, therefore, the irradiation areas and the distance between the centers of the irradiation areas can be set to desired areas and distance. In addition, the light-receiving areas of the light-receiving elements 22R and 22L are set to fall within the irradiation areas.

Figure 29A:
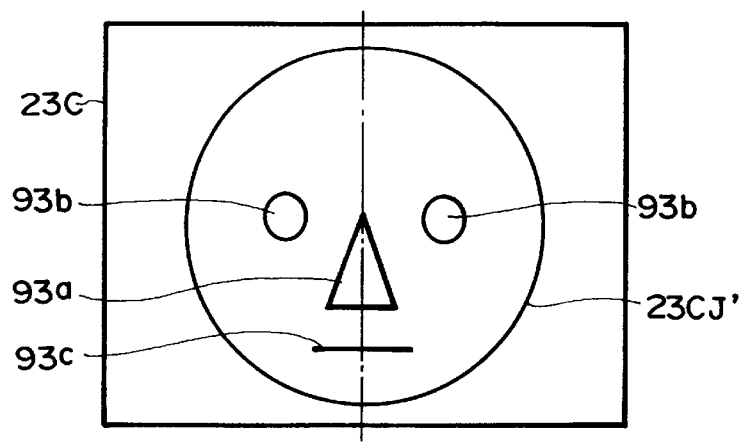
FIG. 29A is a view showing a state in which the face of the observer 93 is imaged on an image sensing element 23C through a condenser lens 23 in the sixth embodiment of the present invention.

FIG. 29A shows a state in which the face of the observer 93 is imaged on the image sensing element 23C through the condenser lens 23. Reference numeral 23CJ' denotes the effective image sensing area of the image sensing element 23C; and 93a, 93b, and 93c, images of the nose, eye, and mouth of the observer, which are schematically illustrated.

Figure 29B:
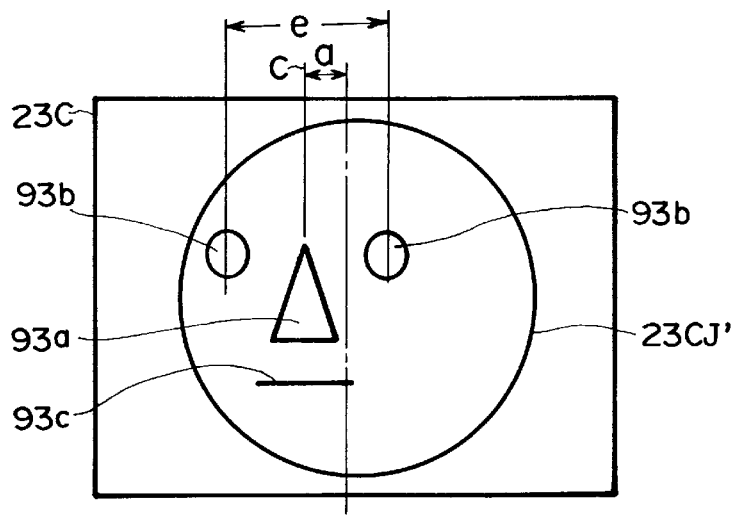
FIG. 29B is a view showing how the face of the observer is imaged upon displacement from the reference position in the sixth embodiment of the present invention.

FIG. 29B shows a state in which the observer has undergone displacement from the reference position. In this state, a middle position C between the eyeballs is detected by a known pattern matching technique or motion image processing, and the sensor 92 and a lenticular lens 1 are driven/controlled on the basis of a distance a from the center of the image sensing element 23C as viewpoint position information.

When a CCD is used as the image sensing element 23C, this information is output as digital information in units of pixels constituting the image sensing element. Subsequently, the digital information is then processed in the same manner as in the fifth embodiment.

Figure 30:
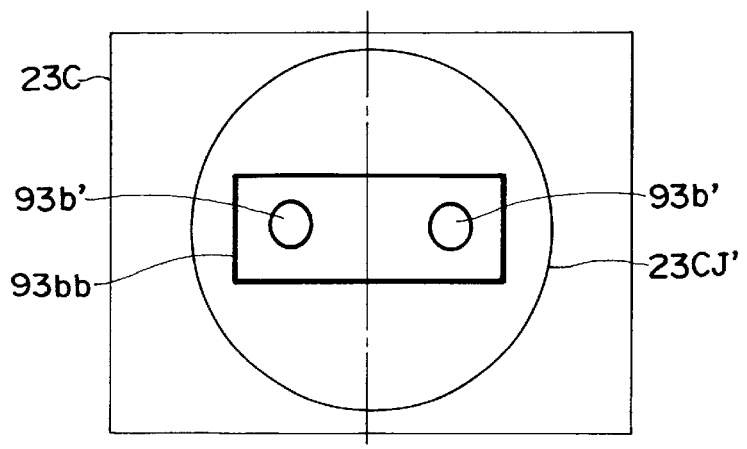
FIG. 30 is a view for explaining a template for pattern matching in the sixth embodiment of the present invention.

FIG. 30 is a view for explaining a template 93bb used to obtain the positions of the eyes in FIG. 29B in the sixth embodiment.

The image shown in FIG. 29B is subjected to pattern matching using the template 93bb which is prepared in advance and has data of images 93b' of the eyes of the observer. The middle position C between the eyes is then obtained from a matching point between the images.

The method based on the pattern matching method has been described in this embodiment. However, any method can be used as a narrow-area detection means in this embodiment as long as eye information can be extracted by image processing.

The effects of this embodiment will be described next. The embodiment uses the image sensing element for narrow-area detection and the two light-emitting diodes and the two light-receiving elements for wide-area detection. Since the image sensing element has a narrow image sensing area, the element can detect information about parts of the face, e.g., the eyes. Even with an image sensing element having a small number of pixels, a high position detection precision can be attained.

The wide-area light-receiving elements detect the face in a wide area. That is, the detection areas of these elements include portions other than the face. The light-receiving elements can therefore detect the face even if it greatly shifts from the reference position, as in the fifth embodiment.

The differences between the effects of the fifth and sixth embodiments will be described below. In the fifth embodiment, a maximum luminance position is detected as a viewpoint position from the image formed by the light emitted from the light-emitting diode and reflected by the face. Since the maximum luminance is obtained at the vertex of the nose which is closest to the light source, a detection error is caused in the right-and-left direction with respect to the middle position (viewpoint position) between the eyes when, for example, the face inclines.

In this embodiment, however, since the positions of the eyes themselves are detected, no error occurs. In addition, the two light-emitting diodes and the two light-receiving elements are used, and the detection area is limited to a small area including the irradiation areas of the light-emitting diodes and the light-receiving areas of the light-receiving elements. For this reason, light can be efficiently used, and a long observation distance can be ensured even with little energy radiation of infrared light.

(Seventh Embodiment)

Figure 31:
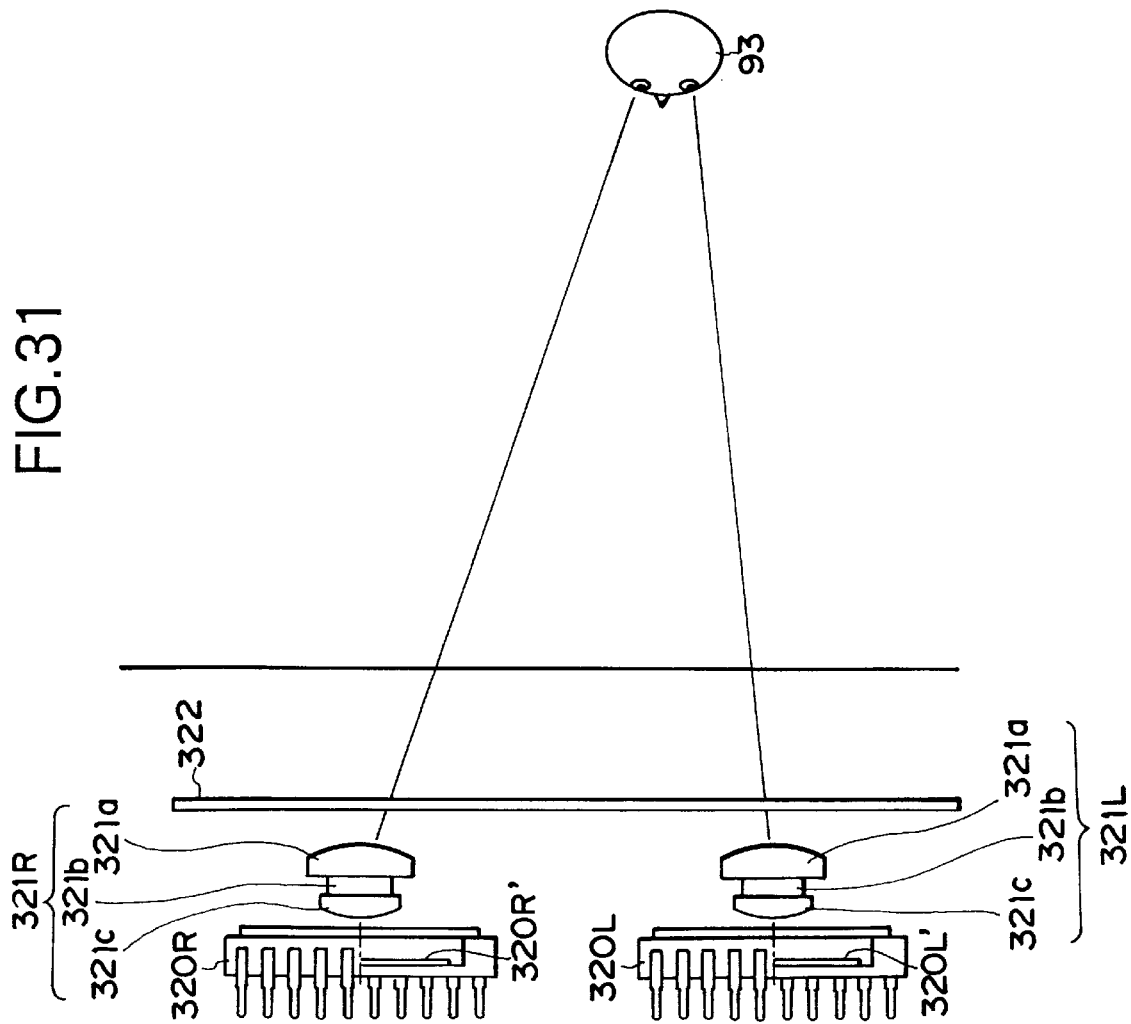
FIG. 31 is a schematic view showing the main part of a head portion position detection sensor in the seventh embodiment of the present invention.

FIG. 31 is a schematic view showing the main part of the seventh embodiment of the present invention. This embodiment has the same arrangement as that of the first embodiment except for the following point. In the seventh embodiment, line sensors each having a plurality of pixels arranged in the horizontal direction are used as a detection sensor (head portion position sensor) for detecting the viewpoint position of an observer to obtain pieces of head portion information of the observer from a plurality of directions. The movement amount of the head portion position in the right-and-left direction and the depth amount are simultaneously detected by using the signals from the line sensors. It is then checked by using the depth amount whether the signals obtained by the detection sensor are pieces of head portion information of the observer.

The outer appearance and arrangement of this embodiment, the slide mechanism for the lenticular lens, and the like are the same as those shown in FIGS. 1 to 3.

The arrangement of this embodiment will be described next. This description will be centered on the differences between the seventh and first embodiments.

The arrangement of the detection sensor (head portion position sensor) for detecting a head portion position in this embodiment will be described. FIG. 31 is a view for explaining an optical system in a head portion position sensor 92 according to the seventh embodiment of the present invention. FIG. 31 partly shows the cross-sections of line sensors 320R and 320L.

Referring to FIG. 31, reference numerals 320R and 320L denote the line sensors for converting the images (head portion) formed by optical means 321R and 321L such as lenses into electrical signals; and 320R' and 320L', imaging units, i.e., photoelectric conversion units, of the line sensors 320R and 320L. The optical means 321R and 321L are imaging lens systems, each constituted by lenses 321a, 321b, and 321c, which are used to perform predetermined imaging operations on the surfaces of the line sensors 320R and 320L. Reference numeral 322 denotes a cover glass for protecting the optical system.

Figure 32:
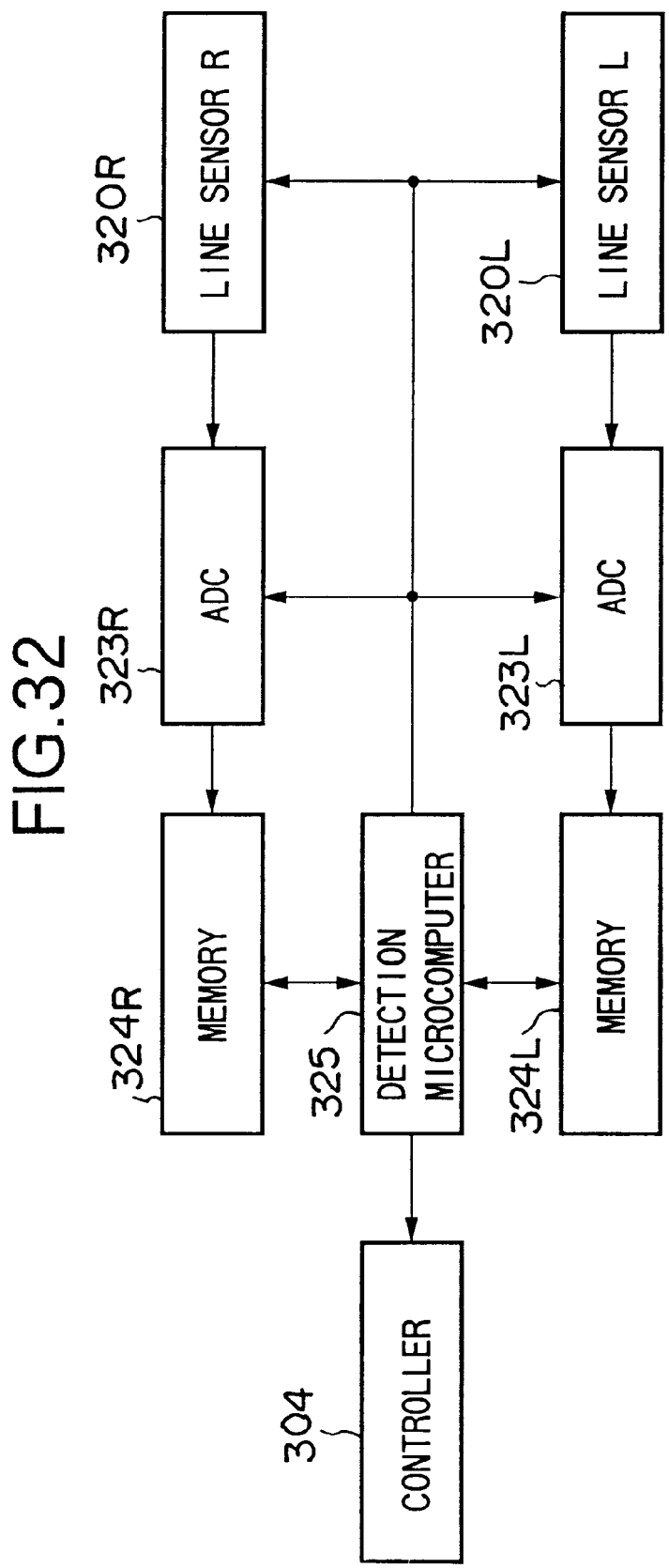
FIG. 32 is a block diagram showing a head portion position detection circuit 3 in the seventh embodiment of the present invention.

The arrangement of hardware for signal processing for the head portion position sensor in this embodiment will be described next. FIG. 32 is a block diagram for explaining the hardware arrangement of a head portion position detection circuit 3 in this embodiment.

Referring to FIG. 32, reference numerals 323R and 323L denote A/D converters for converting analog outputs from the line sensors 320R and 320L into digital signals; 324R and 324L, memories for storing the digital signals; and 325, a detection microcomputer for controlling the line sensors 320R and 320L, the A/D converters 323R and 323L, and the memories 324R and 324L and performing signal processing for head position detection to send the resultant signals to a controller 304.

According to this arrangement in FIG. 32, the memories and the A/D converters are arranged outside the detection microcomputer 325. However, these components may be incorporated into one chip or an arbitrary arrangement may be used as long as the above function can be realized. The principle of head portion position detection in this embodiment will be described next.

Figure 33:
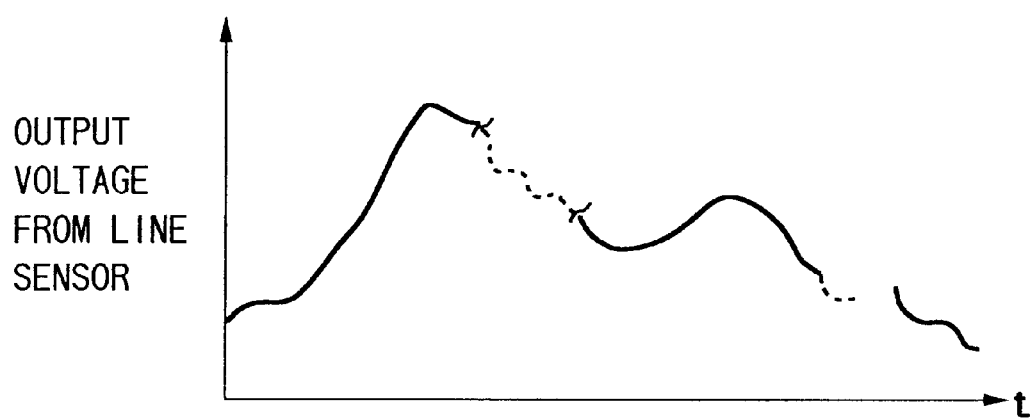
FIG. 33 is a graph showing the output state of a line sensor in the seventh embodiment of the present invention.

FIG. 33 is a graph for explaining the output state of the line sensor 320R. The ordinate represents the output voltage from the line sensor; and the abscissa, the time axis corresponding to one scanning cycle of the line sensor.

The detection optical system in this embodiment includes the two line sensors and hence can acquire depth information. This system regards an object near the line sensors as an observer, and can detect the head portion position.

Figure 34:
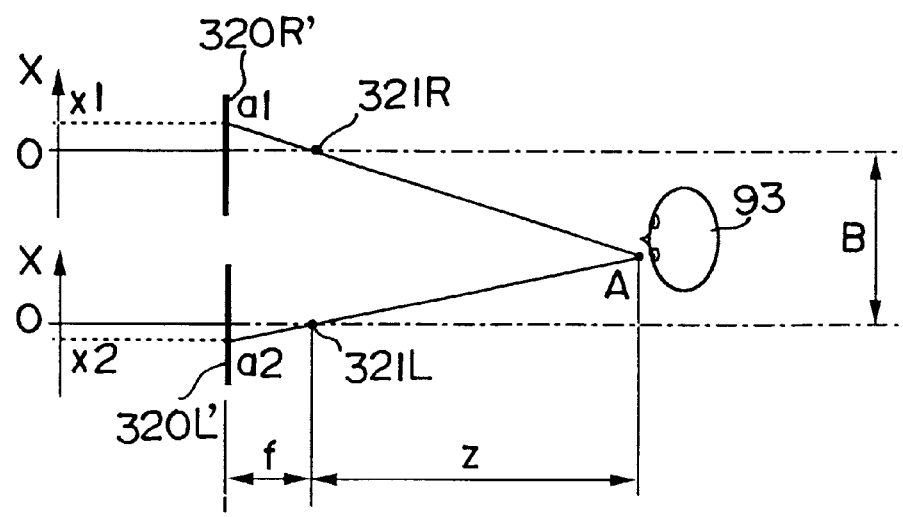
FIG. 34 is a view for explaining the principle of a technique of obtaining the position of an observer in the direction of depth in the seventh embodiment of the present invention.

FIG. 34 is a view for explaining the principle of a technique of obtaining the position of the observer in the direction of depth. Referring to FIG. 34, reference symbol B denotes the base line length, i.e., the distance, between the two line sensors 320R and 320L; Z, the distance to an object A to be detected; f, the focal length of each of the lens systems 321R and 321L; A, an arbitrary point of an observer 93; a1 and a2, the imaging points of the line sensors 320R and 320L; X, a coordinate axis normalized with the optical axis of each lens system being set to 0; and x1 and x2, normalized coordinates. Letting p be the parallax at a point A in FIG. 34, the parallax p can be easily obtained by $$p = x1 - (-x2) \tag{17}$$

In addition, a depth Z in this case can be obtained by $$Z = f \cdot B / p \tag{18}$$

By selecting an object to be imaged which is near the line sensors 320R and 320L, the head portion of the observer is detected. In obtaining the parallax p, a corresponding point of an arbitrary object to be imaged between the respective line sensors is searched out.

Figures 35, 36, 37:
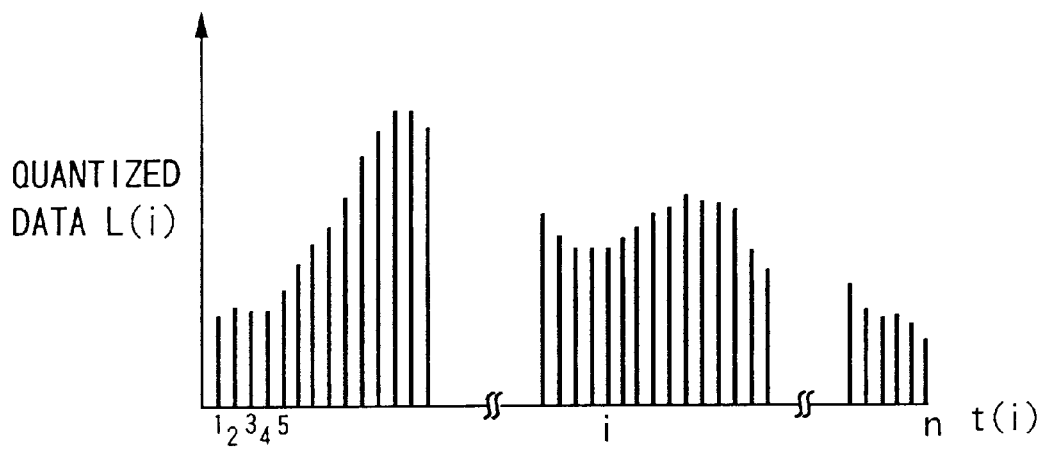
FIG. 35 is a graph for explaining how a line sensor output is sampled and quantized in the seventh embodiment of the present invention.
FIG. 36 is a view for explaining how quantized data are stored in a memory in the seventh embodiment of the present invention.
FIG. 37 is a view for explaining how quantized data are stored in the memory in the seventh embodiment of the present invention.

A search for a corresponding point will be described next. FIG. 35 is a graph for explaining how an output from the line sensor 320R is sampled/quantized by the A/D converter 323R. In this case, if, for example, the line sensor has a CCD arrangement, a sampling frequency is often selected by the frequency of a read clock, and the quantization resolution depends on the resolution of the A/D converter to be used. The quantized data is stored as quantized data R in the memory 324R, as shown in FIG. 36.

$$\text{quantized data } R = \{R(1), R(2), \ldots, R(i), \ldots, R(n)\} \tag{19}$$

Similarly, the data obtained by the line sensor 320L is stored as quantized data L in the memory 234L, as shown in FIG. 37.

$$\text{quantized data } L = \{L(1), L(2), \ldots, L(i), \ldots, L(n)\} \tag{20}$$

The correlation values between these two quantized data are obtained by template matching to search for a corresponding point. A search for a corresponding point is performed according to the following procedure.

A template having a predetermined width is formed by using the quantized data from the left line sensor 320L. This template is represented by T(i). For example, the width of the template is set to be slightly larger than the head portion of the observer. If the template has a width of 2w+1, the template data is given by $$T(i) = \{L(i-w), L(i-w+1), \ldots, L(i), L(i+1), \ldots, L(i+w)\} \tag{21}$$

A square sum E(j) of the differences between the template data T(i) and the right quantized data (or the sum of the absolute values of the differences) is obtained.

For example, at a position j of the right quantized data, the square sum E(j) is given by $$E(j) = \{(L(i-w) - R(j-w))^2 + (L(i-w+1) - R(j-w+1))^2 +, \ldots, +(L(i) - R(j))^2 + (L(i+1) - R(j+1))^2, \ldots, +(L(i+w) - (R(j+w))^2\} \tag{22}$$

Square sums E(1) to E(n) are obtained by using the template T(i) in the same manner as described above. A position corresponding to the minimum value of the obtained values is determined as a portion exhibiting the highest correlation, i.e., a corresponding point. In this case, if this minimum value is equal to or larger than a predetermined value, processing is performed, assuming that no template matching has been performed. Letting E(k) be the minimum value at this time, the difference between k and i corresponds to the parallax (equation (17)).

In addition, maximum and minimum parallax amounts are determined by limiting the minimum and maximum values of detection in the direction of depth. The computation time can be shortened by moving the template only within this parallax area.

Furthermore, this embodiment may include a means for storing the quantized data obtained by each line sensor immediately before the current scanning operation. In this case, the stored data is compared with the latest data to detect the movement of the object, and the template is moved only within a area near the movement, thereby shortening the computation time.

Figure 38:
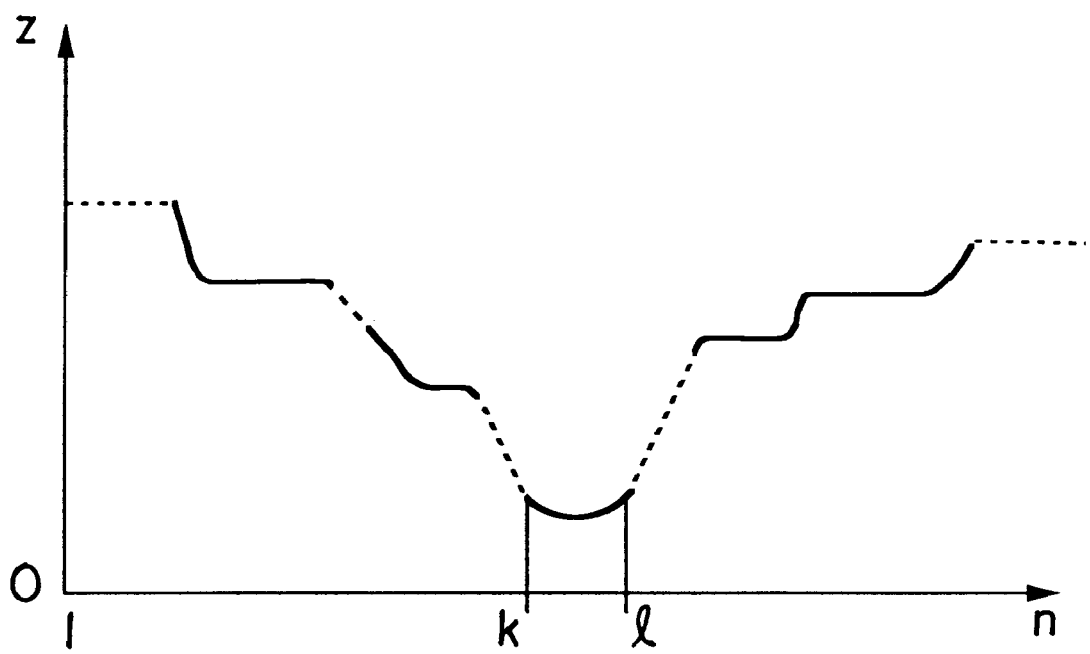
FIG. 38 is a graph for explaining the relationship between the quantized data addresses and the line sensor outputs in the seventh embodiment of the present invention.

The acquisition of the head portion contour of the observer 93 will be described next. FIG. 38 is a graph for explaining the data obtained by the seventh embodiment. The ordinate represents the depth amount; and the abscissa, the address of the quantized data obtained by the line sensor 320R, which corresponds to the coordinates of the object in the right-and-left direction. The dashed lines in FIG. 38 indicate portions at which no data in the direction of depth are obtained. In many cases, depth data cannot be obtained when data is obtained only from the start position or end position of the line sensor, or the template T(i) cannot be formed.

As is obvious from FIG. 38, the interval between k and l on the abscissa corresponds to the portion nearest to the detection sensor 92, and this portion can be expected to be the contour of the head portion of the observer 93. The central position of this contour is obtained as an approximate viewpoint position of the observer.

In addition, since the depth from k to l can be obtained, the size of this object in the horizontal direction can be obtained. It can therefore be determined on the basis of this size whether the object is the head portion of the observer. For example, an object exhibiting a large parallax is then detected, or the processing is stopped on the basis of this determination result.

Figure 39:
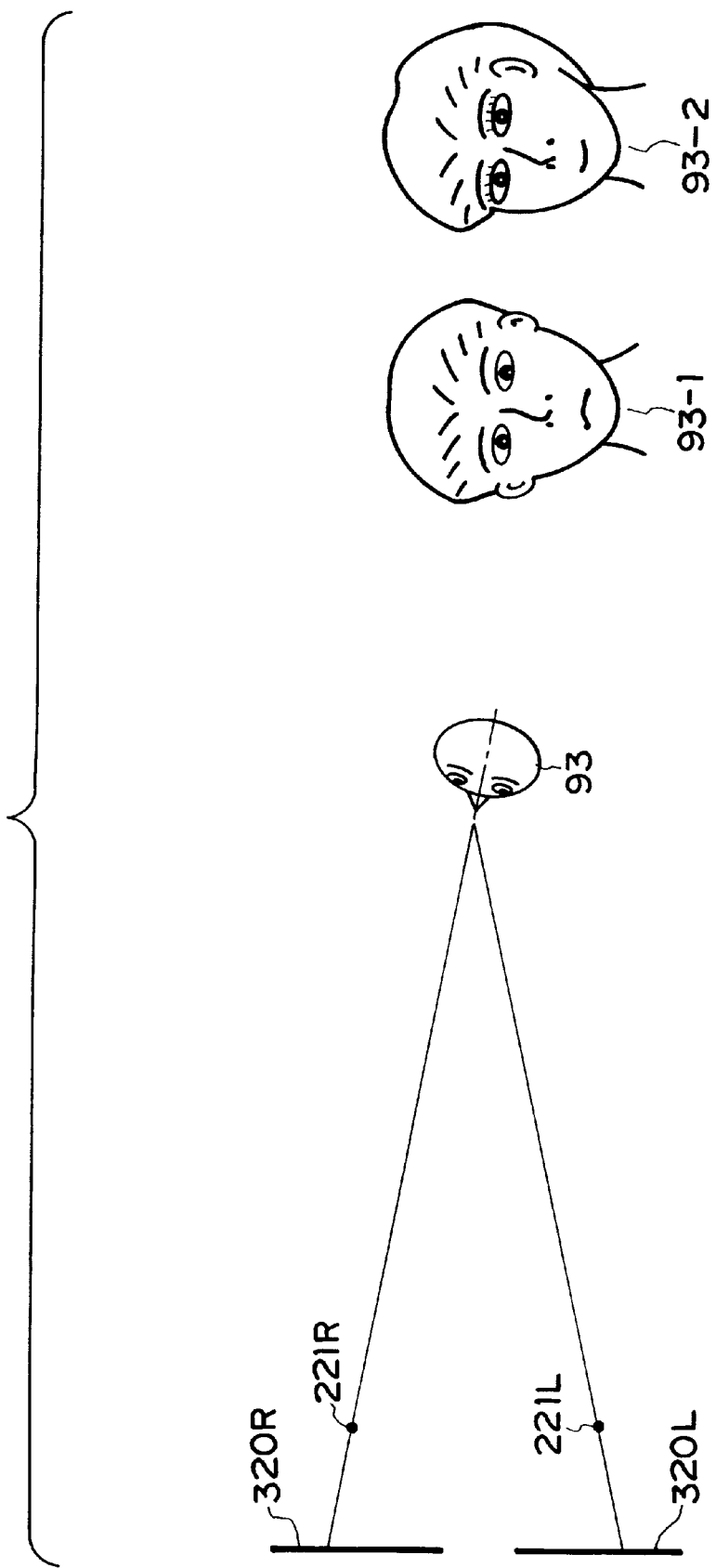
FIG. 39 is a view for explaining how a head portion contour is extracted when the observer slightly turns aside in the seventh embodiment of the present invention.

A technique of reducing viewpoint detection errors by head portion contour extraction will be described next. In the method of substituting the center of the head portion contour of an observer for a viewpoint position, even slight movement of the observer in the horizontal direction may cause a detection error. FIG. 39 shows a state in which the observer 93 slightly turns his/her head aside. FIG. 39 is a view showing the positional relationship between the line sensors 320R and 320L and the observer 93. In this case, the observer 93 has slightly turned his/her head clockwise. Reference numeral 93-1 denotes the face of the observer viewed from the line sensor 320R; and 93-2, the face of the observer viewed from the line sensor 320L. If the face 93-2 is detected by only one line sensor, the center of the contour of the head portion deviates from the viewpoint position (the middle position between the eyes).

In this embodiment, the values k and l are obtained as a contour of the head portion in advance, taking notice of the fact that the center of the face (the "center" in this case indicates a line connecting the middle point between the eyes and the centers of the nose and mouth) exhibits a very high correlation even if the observer slightly rotates.

When a narrow template is generated on the basis of the interval between the values k and l, and a portion exhibiting a high correlation is detected, the detected portion almost coincides with the center of the face. By using this portion as the viewpoint position, viewpoint position errors due to the rotation of the observer can be reduced, allowing more accurate viewpoint detection.

A follow-up operation in the direction of depth will be described next. The seventh embodiment has exemplified the system for detecting the viewpoint position of an observer, and causing the stereoscopic view region in the right-and-left direction to follow up the movement of the observer by controlling the sliding movement of the lenticular lens 1. In this embodiment, since the position of an observer in the direction of depth can be detected as well as the position in the right-and-left direction, this system can also be used as an observer detection means which can follow up the movement of the observer in the direction of depth.

(Eighth Embodiment)

Figure 40:
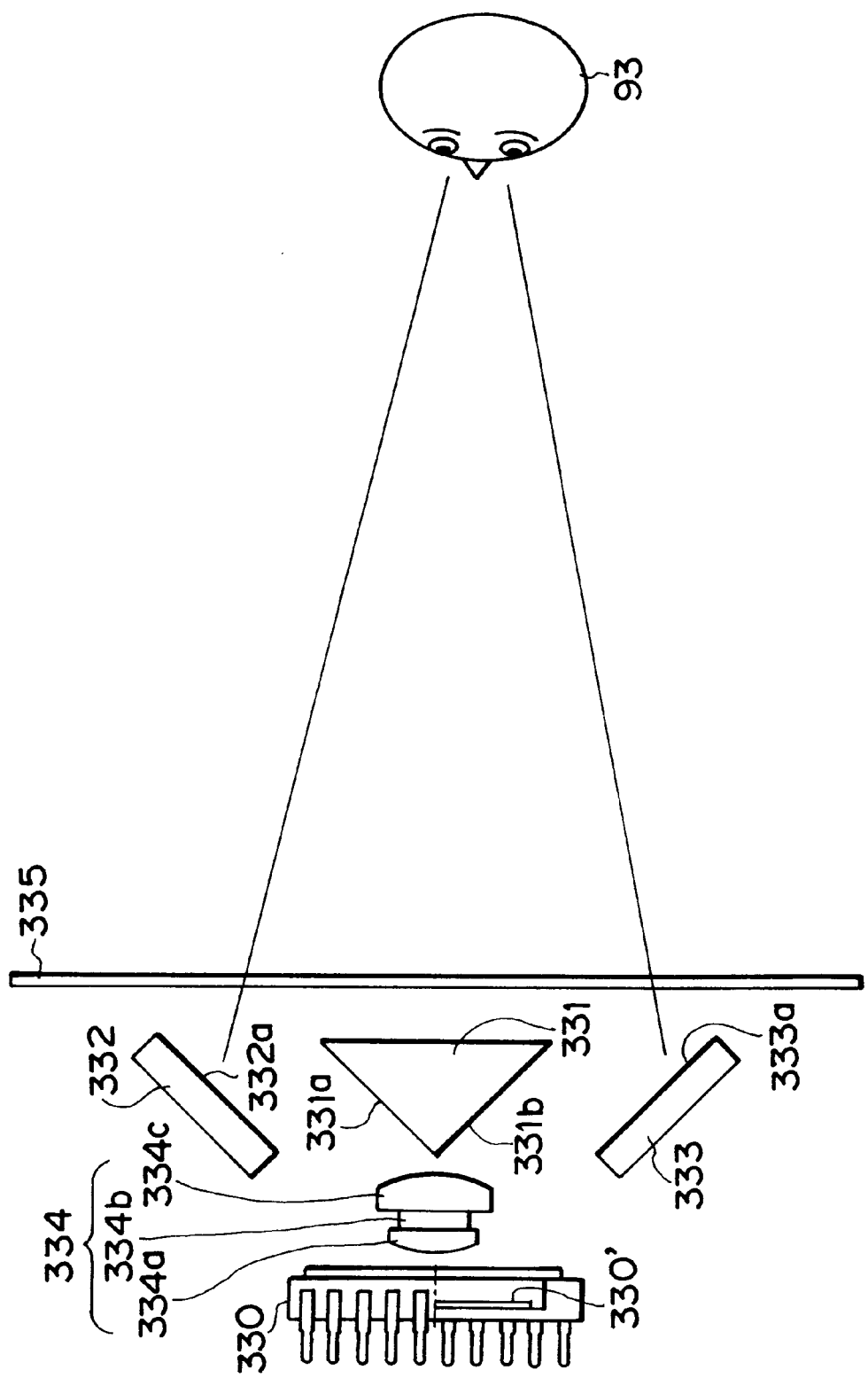
FIG. 40 is a schematic view showing the main part of a viewpoint position detection sensor in the eighth embodiment of the present invention.

FIG. 40 is a schematic view showing the main part of the eighth embodiment of the present invention. In the seventh embodiment, the right and left line sensors, amplification circuits (not shown), and the like need to have the same characteristics, or normalization cross-correlations must be calculated by obtaining the sum total of outputs from the respective line sensors, and converting the output at each position into the ratio of the output to the sum total.

This embodiment is characterized in that such normalization cross-correlation calculations are omitted. FIG. 40 is a view for explaining the optical system in a head portion position sensor 92 according to this embodiment. FIG. 40 partly shows the cross-section of a line sensor 330.

Referring to FIG. 40, reference numeral 330 denotes the line sensor; 330', the imaging unit, i.e., the photoelectric conversion unit, of the line sensor 330; 331, a triangular mirror; 331*a* and 331*b*, the reflecting surfaces of the triangular mirror 331; 332 and 333, reflecting mirrors; 332*a* and 333*a*, reflecting surfaces of the reflecting mirrors 332 and 333; 334, an imaging lens system constituted by lenses 334*a*, 334*b*, and 334*c*; and 335, a cover glass for protecting the optical system.

Figure 41:
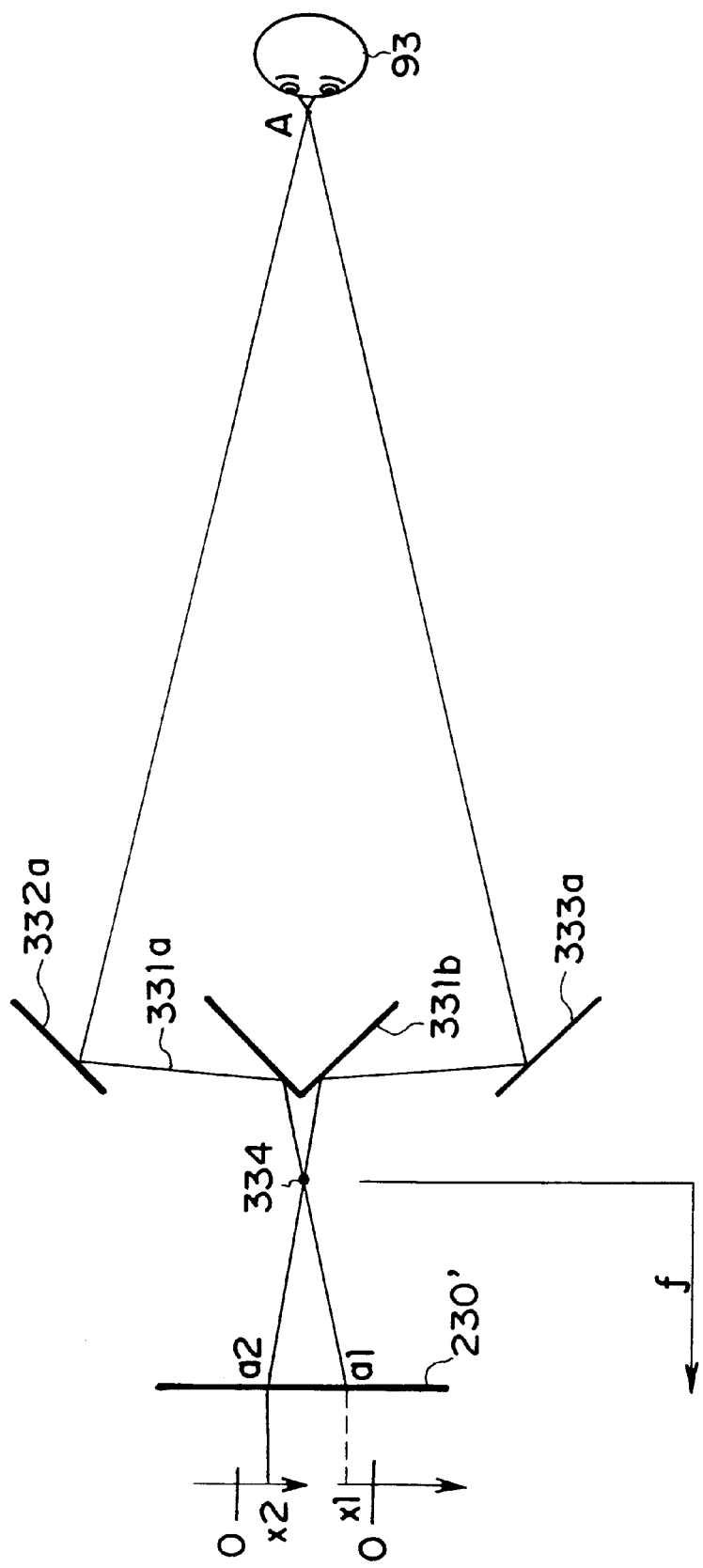
FIG. 41 is a view for explaining an optical principle in the eighth embodiment of the present invention.

The principle of head portion position detection in this embodiment will be described next. FIG. 41 is a view for explaining the optical principle of the eighth embodiment. The arrangement of the eighth embodiment is designed to serve the same function as a stereo-adaptor mounted on the front surface side of a camera to photograph images having different parallaxes.

The difference between this arrangement and that shown in FIG. 34 will be described. In this embodiment, one line sensor 330 is used in the form of two split sensors. Light beams from an observer 93 are respectively reflected by the reflecting surfaces 332*a* and 331*a*, and the reflecting surfaces 333*a* and 331*b* to be formed into images at points a1 and a2 in FIG. 41.

Figure 42:
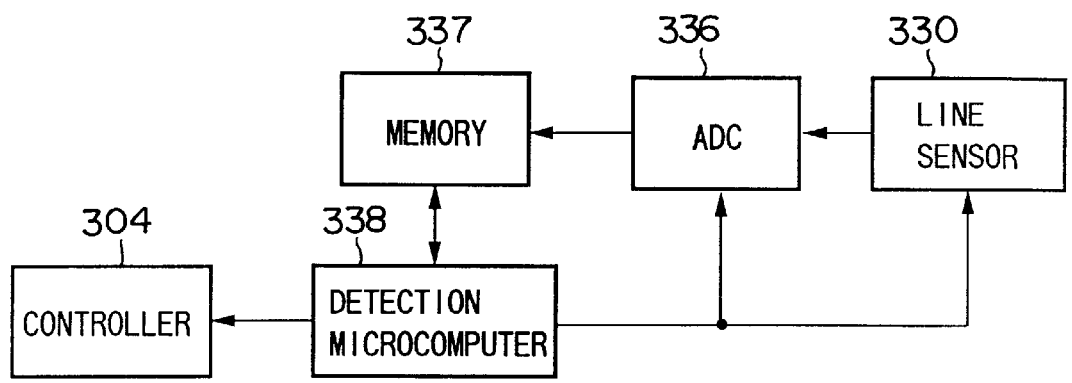
FIG. 42 is a block diagram showing a head position detection circuit in the eighth embodiment of the present invention.

The arrangement of the signal processing hardware of the head portion position sensor 92 will be described next. FIG. 42 is a block diagram for explaining the hardware configuration of a head portion position detection circuit 3 in the eighth embodiment. Referring to FIG. 42, reference numeral 330 denotes the line sensor; 336, an A/D converter; 337, a memory; and 338, a detection microcomputer. This embodiment differs from the seventh embodiment in that the line sensor, the A/D converter, and the memory are integrated into one unit.

This arrangement reduces variations in circuits on the right and left sides as compared with the seventh embodiment.

Figure 43:
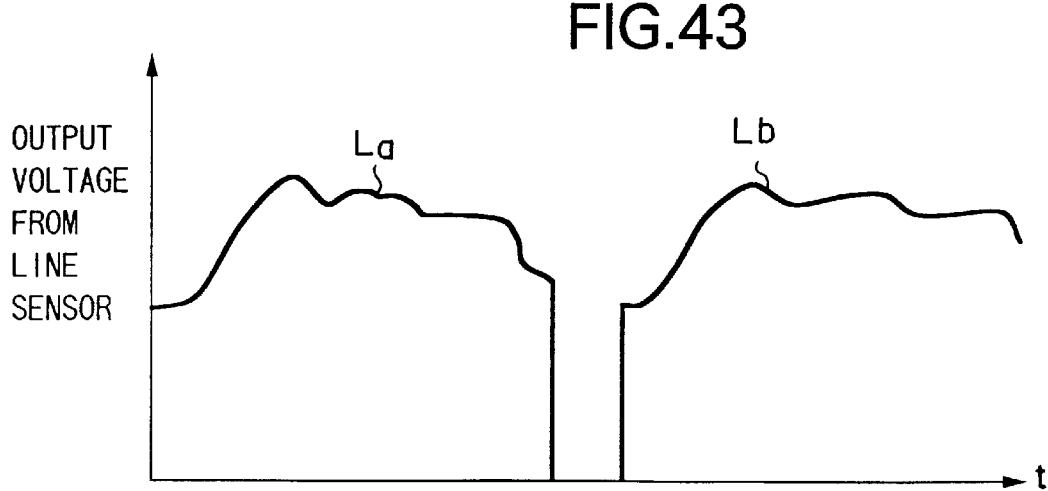
FIG. 43 is a graph for explaining outputs from line sensors in the eighth embodiment of the present invention.

Outputs from the line sensor in the eighth embodiment will be described next. FIG. 43 is a view for explaining outputs from the line sensor 330 in the eighth embodiment. Referring to FIG. 43, the ordinate represents the analog voltage of the line sensor; and the abscissa, the time axis corresponding to one scanning operation of the line sensor.

Referring to FIG. 43, reference symbol Lb denotes a signal produced by the line sensor through the reflecting surfaces 332a and 331a of the mirror; and La, a signal produced by the line sensor through the reflecting surfaces 331a and 331b of the mirror.

In this manner, data corresponding to one scanning operation is time-divisionally produced by one line sensor, signals in the two directions can be acquired. These signals are stored at predetermined addresses in the memory. Subsequently, the same processing as that in the seventh embodiment is performed to detect the viewpoint position of the observer and perform follow-up control on a stereoscopic vision area.

(Ninth Embodiment)

Figure 44:
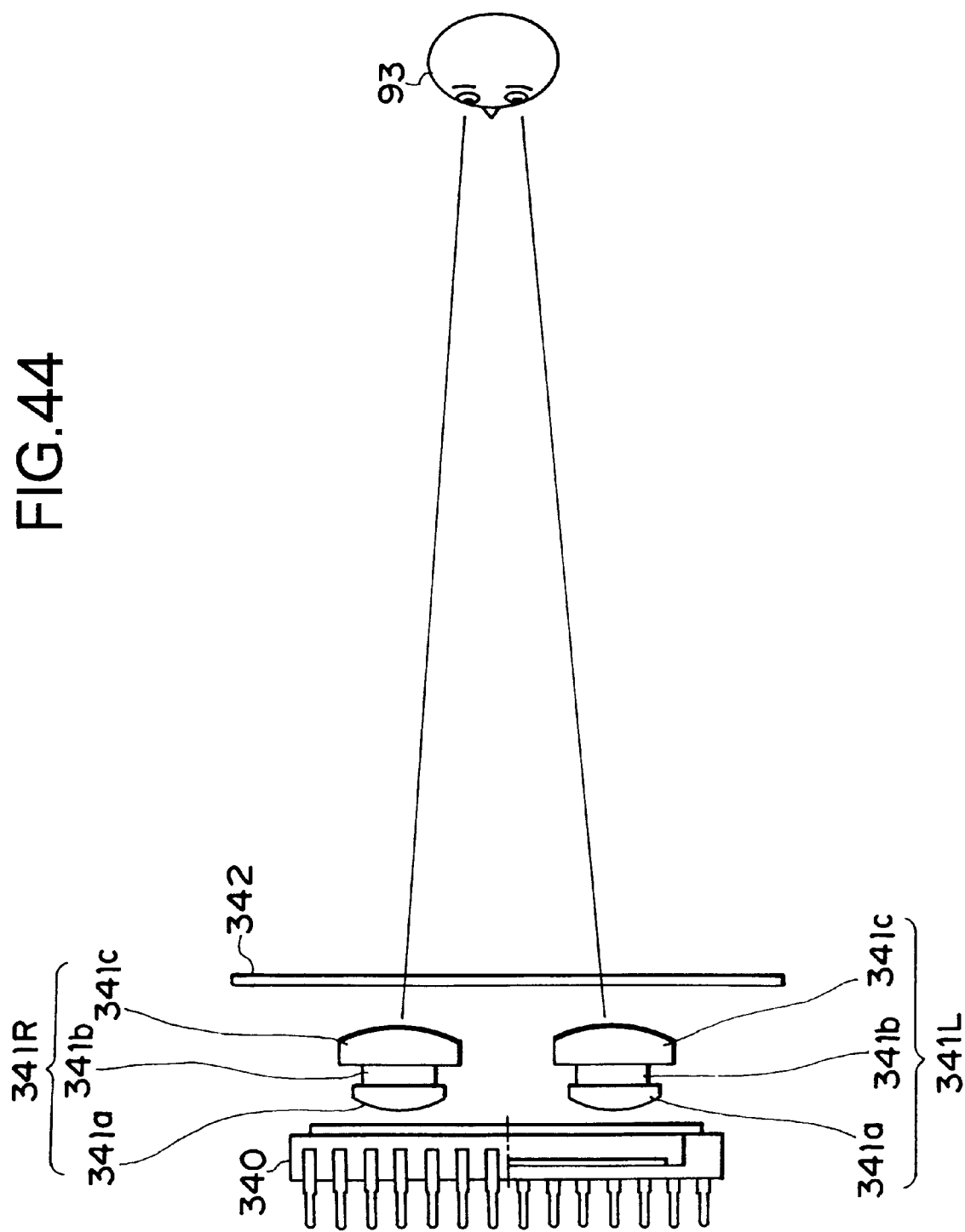
FIG. 44 is a schematic view showing the main part of a viewpoint position detection sensor in the ninth embodiment of the present invention.

FIG. 44 is a schematic view showing the main part of the ninth embodiment of the present invention. The object of this embodiment is the same as that of the eighth embodiment. That is, one line sensor is used to eliminate the difference between outputs from the right and left line sensors. The difference between the eighth and ninth embodiments will be described below.

With the arrangement of the optical system in the ninth embodiment, slight vergency of light from the right and left sides occurs as in the case of a stereo-adaptor used to easily taking stereoscopic photographs.

In this embodiment, the influences of such vergency are reduced. Referring to FIG. 44, reference numeral 340 denotes a line sensor; 341R and 341L, imaging lens systems, each constituted by lenses 341a, 341b, and 341c; and 342, a cover glass for protecting the optical system.

The lens systems 341R and 341L are mounted on one line sensor to be parallel to each other. Signal processing is performed in almost the same manner as in the eighth embodiment to detect the viewpoint position of an observer and perform follow-up control on a stereoscopic vision area.

(10th Embodiment)

Figure 45:
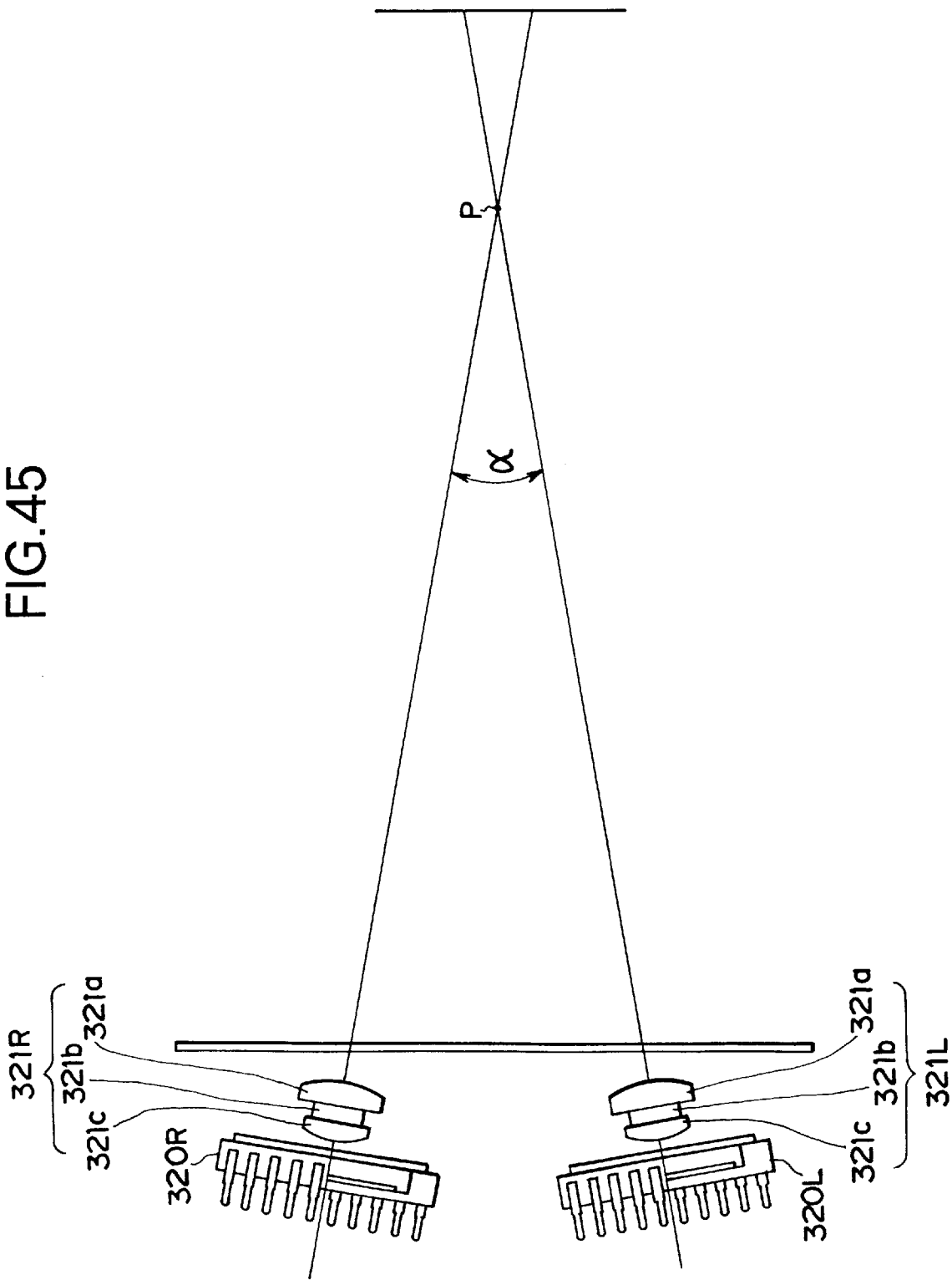
FIG. 45 is a schematic view showing the main part of a viewpoint position detection sensor in the 10th embodiment of the present invention.
Figure 46:
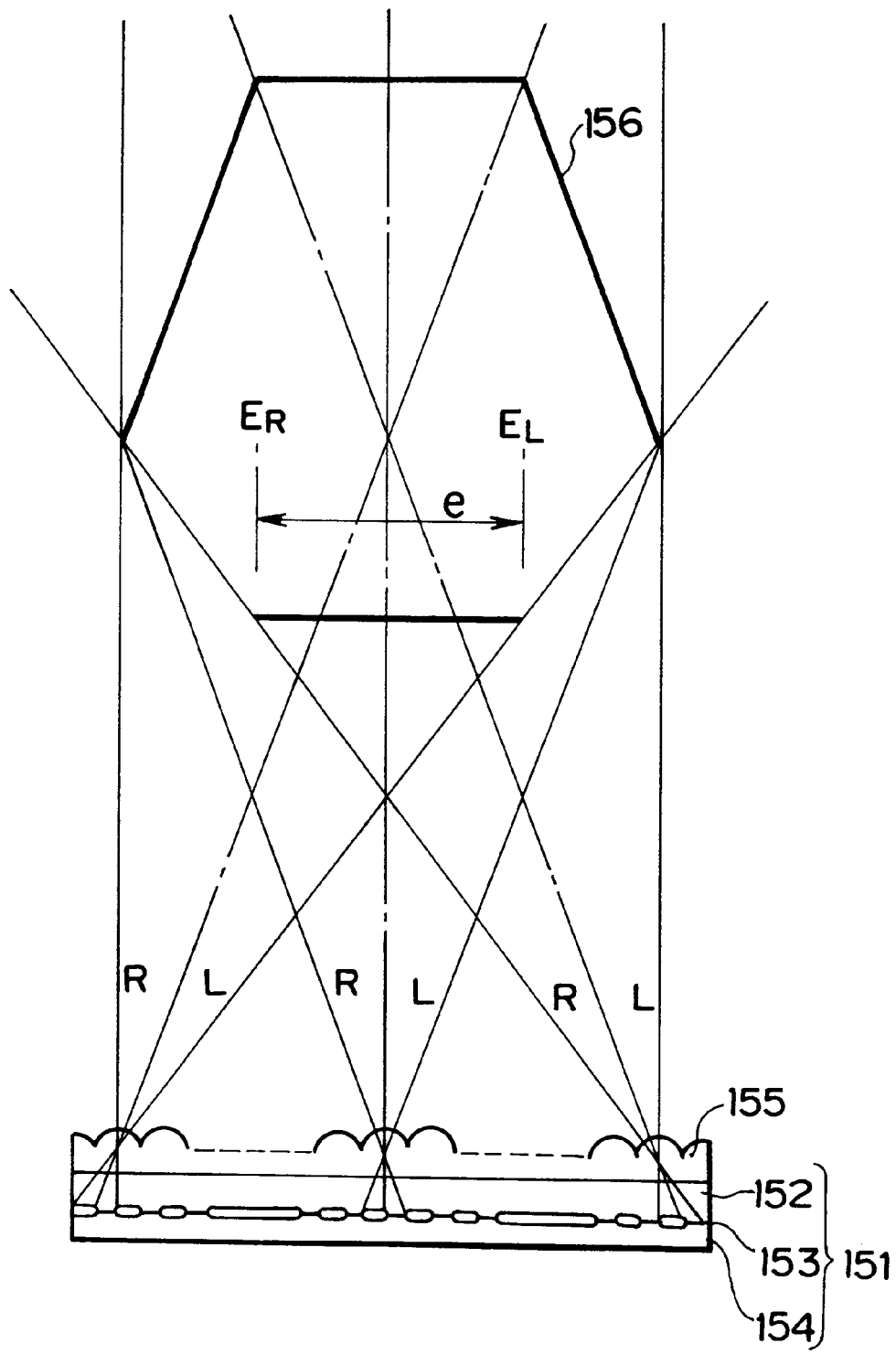
FIG. 46 is a view for explaining a conventional lenticular scheme.
Figure 47:
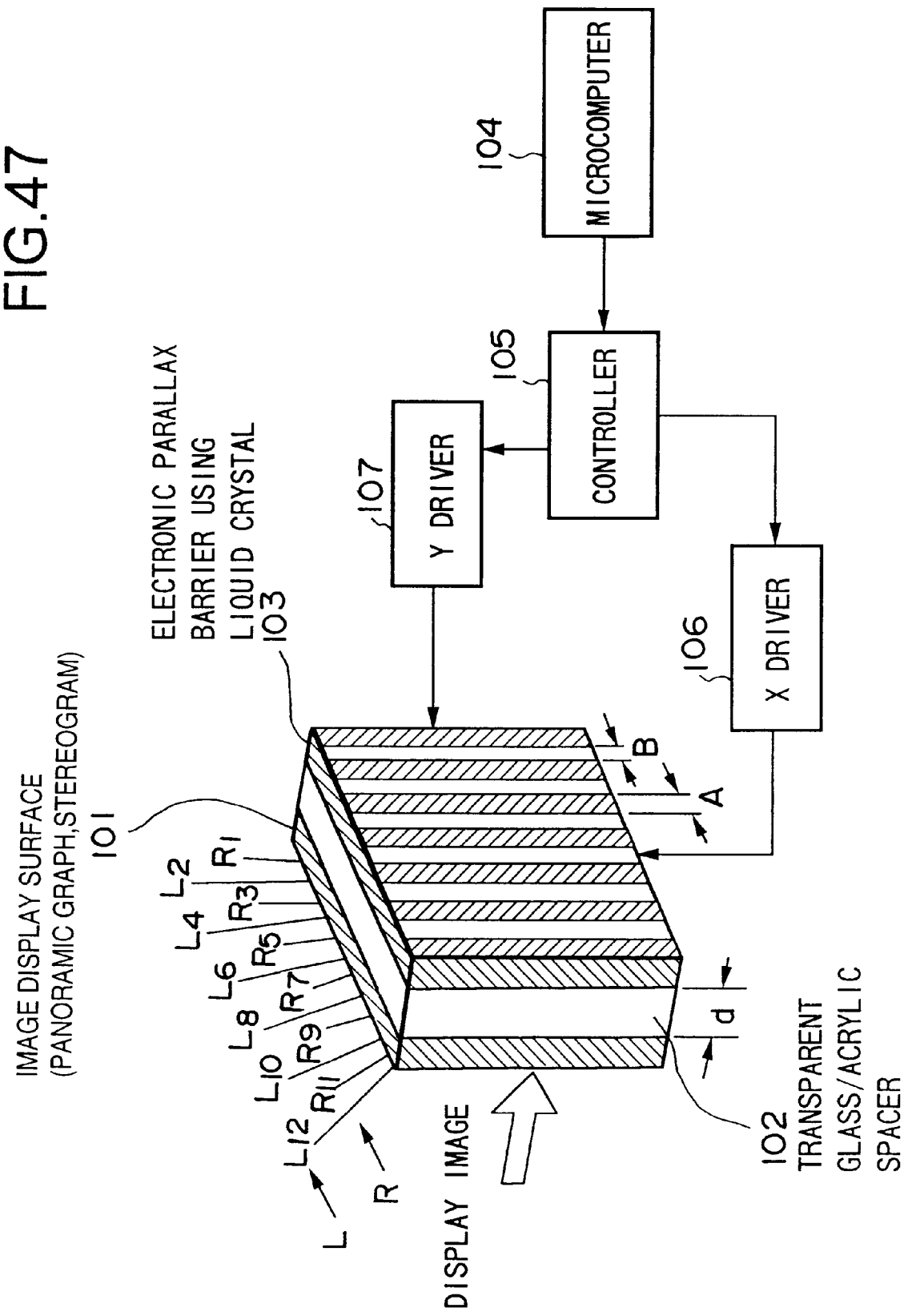
FIG. 47 is a view showing the basic arrangement of the apparatus disclosed Japanese Patent Laid-Open No. 3-119889.
Figure 48:
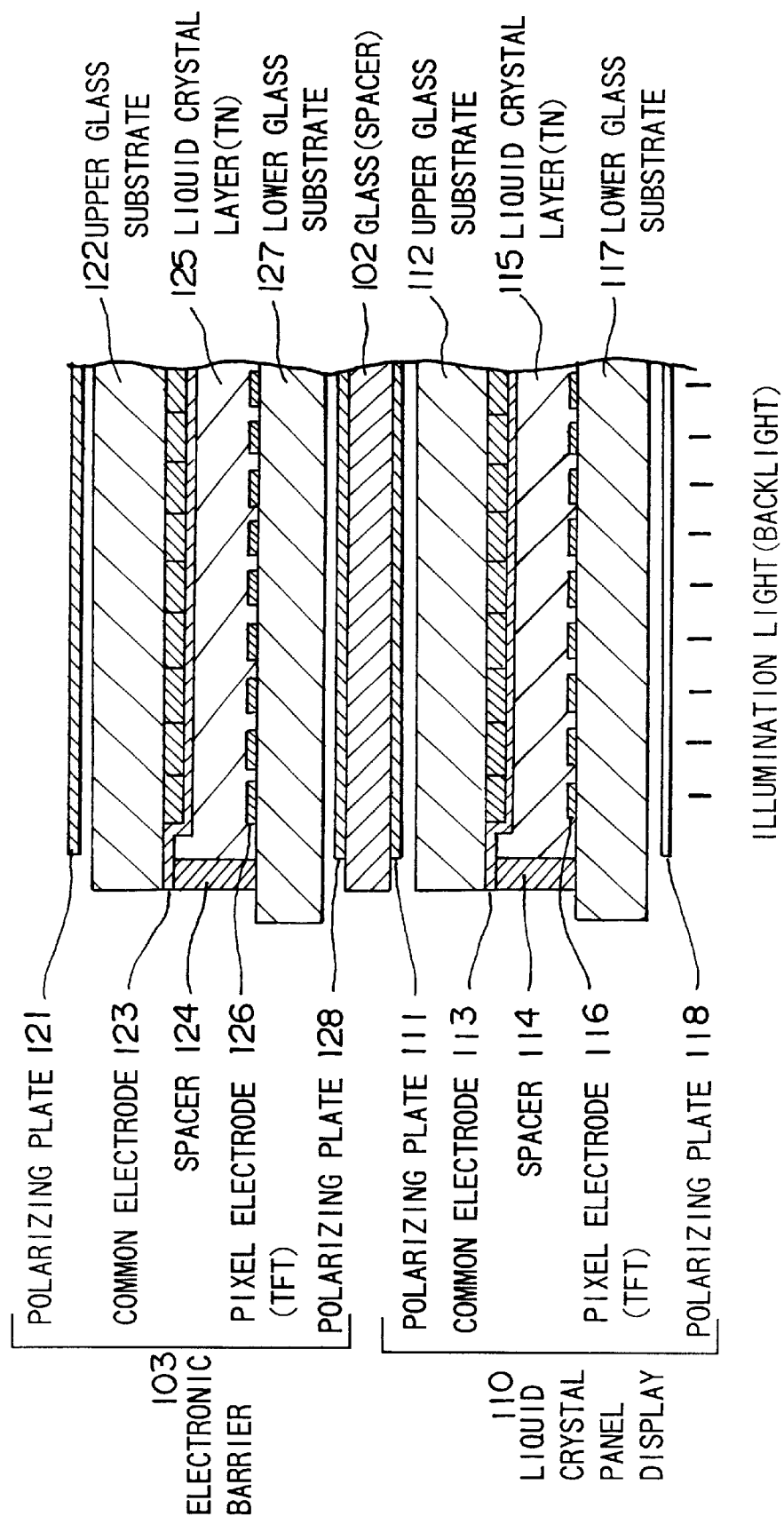
FIG. 48 is a sectional view showing the arrangement of the display unit of the stereoscopic image display apparatus disclosed in Japanese Patent Laid-Open No. 3-119889.
Figure 50:
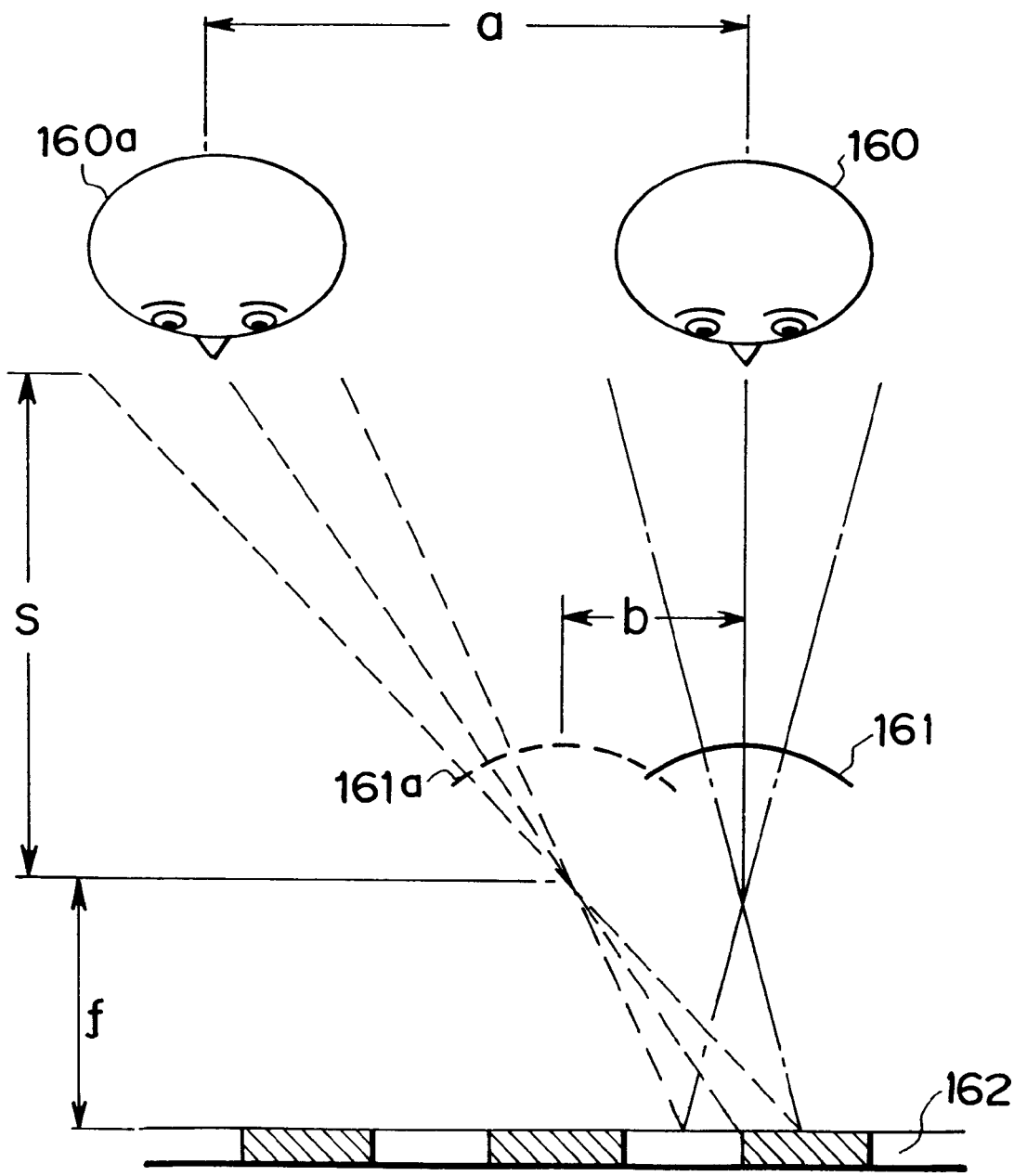
FIG. 50 is a view for explaining the principle of a technique of following up the movement of an observer in the right-and-left direction in the conventional stereoscopic image display apparatus.

FIG. 45 is a schematic view showing the main part of the 10th embodiment of the present invention. This embodiment is characterized in that the angle at which two optical system intersect each other, i.e., the vergency angle, is positively used. In addition, the position of this intersection is set to an optimal observation position.

The constituent elements shown in FIG. 45 are almost the same as those of the seventh embodiment. Referring to FIG. 45, reference symbol a denotes a vergency angle; and P, a point at which the optical axes of the respective optical systems intersect each other.

This point P is set near the position of the observer. In the seventh embodiment, a portion exhibiting a large parallax is detected to be regarded as the head portion position of the observer. In contrast to this, in this embodiment, a portion exhibiting a small parallax is detected to be regarded as the head portion of the observer. Other processing, however, is the same as that in the seventh embodiment. The advantage of the 10th embodiment is that vergency of light is used to increase the area where light from the right side overlaps light from the left side, and a wide detection region can be ensured.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic image display apparatus which allows an observer to observe a stereoscopic image by guiding light beams based on a plurality of parallax images displayed on an image display unit to the observer through an optical system, comprising:
   a viewpoint position detection sensor for detecting the viewpoint position of the observer; and
   follow-up control means for performing follow-up control on a stereoscopic view observation region for image information displayed on said image display unit, on the basis of viewpoint position information obtained by said viewpoint position detection sensor,
   said viewpoint position detection sensor including
      light-emitting means for emitting a light beam to the observer,
      narrow-area detection means for detecting a viewpoint position in a narrow area, and
      wide-area detection means for detecting a viewpoint position in a wide area.

2. The apparatus according to claim 1, wherein said follow-up control means controls said viewpoint position detection sensor to follow the viewpoint position of the observer.

3. The apparatus according to claim 1, wherein said light-emitting means further comprises means for limiting a light-emitting area with respect to the observation side.

4. The apparatus according to claim 1, wherein said light-emitting means emits a light beam modulated with a predetermined light-emitting frequency, and said narrow-area detection means or said wide-area detection means further comprises synchronization means for detecting signals on the basis of the frequency modulation.

5. The apparatus according to claim 4, wherein a parallax image is displayed on said image display unit at a predetermined display frequency, the display frequency being set so as not to be an integer multiple of the light-emitting frequency.

6. The apparatus according to claim 1, wherein said light-emitting means controls an intensity of a light beam to be emitted such that a signal obtained by said narrow-area detection means or said wide-area detection means on the basis of a reflected light beam from the observer becomes not less than a predetermined value.

7. The apparatus according to claim 1, wherein each of said narrow-area detection means and said wide-area detection means comprises a pair of light-receiving elements, and adjusts a distance between said pair of light-receiving elements to detect a viewpoint position in a narrow or wide area.

8. The apparatus according to claim 1, wherein said viewpoint position detection sensor detects a viewpoint position in the narrow or wide area by using at least one of a focal length of a light-emitting lens for irradiating a light beam to the observer, a focal length of a light-receiving means for receiving a light beam from the observer, slit means for limiting a light-receiving area for the light beam from the observer side, and directivity characteristics of a light source for emitting a light beam to the observer.

9. The apparatus according to claim 7, wherein a stereoscopic view of image information displayed on said image display unit is realized by using a lenticular lens or a parallax barrier, and said lenticular lens or parallax barrier is driven/controlled by using a sum total of different signals based on outputs from said pair of light-receiving elements of said narrow-area detection means and difference signals based on outputs from said pair of light-receiving elements of said wide-area detection means.

10. A stereoscopic image display apparatus which allows an observer to observe a stereoscopic image by guiding light image based on a plurality of parallax images displayed on an image display unit to the observer through an optical system, comprising:
- a viewpoint position detection sensor for detecting the viewpoint position of the observer; and
- follow-up control means for performing follow-up control on a stereoscopic view observation region for image information displayed on said image display unit, on the basis of viewpoint position information obtained by said viewpoint position detection sensor,
- said viewpoint position detection sensor including
  - light-emitting means for emitting a light beam to the observer,
  - light-receiving means for receiving a light beam from the observer; and
  - position adjustment means for adjusting at least one of a light-emitting area of said light-emitting means and a light-receiving area of said light-receiving means to predetermined positions.

11. The apparatus according to claim 10, wherein each of the light-emitting area and the light-receiving area includes a display member for adjusting a position of said viewpoint position detection sensor to a reference position which is a predetermined position of the observer, and an observation window for observing said display member.

12. The apparatus according to claim 11, wherein said light-emitting means comprises a light-emitting element, said light-emitting means also serving as said display member.

13. A stereoscopic image display apparatus which allows an observer to observe a stereoscopic image by guiding light beams based on a plurality of parallax images displayed on an image display unit to the observer through an optical system, comprising:
- a viewpoint position detection sensor for detecting the viewpoint position of the observer; and
- follow-up control means for performing follow-up control on a stereoscopic view observation region for image information displayed on said image display unit, on the basis of viewpoint position information obtained by said viewpoint position detection sensor,
- said viewpoint position detection sensor including
  - light-emitting means for emitting a light beam to the observer,
  - narrow-area detection means for detecting a viewpoint position in a narrow area, and
  - wide-area detection means for detecting a viewpoint position in a wide area,
- wherein the viewpoint position is finally determined in accordance with a signal from said narrow-area detection means.

14. The apparatus according to claim 13, wherein an output from said wide-area detection means becomes not more than a predetermined threshold when the observer is present within a predetermined parallax angle.

15. The apparatus according to claim 13, wherein said light-emitting means comprises one or two point light sources.

16. The apparatus according to claim 13, wherein said narrow-area detection means comprises a two-dimensional image sensing element for converting a face image of the observer into an electrical signal.

17. The apparatus according to claim 15 or 16, wherein said light-emitting means emits visible light or infrared light modulated with a predetermined light-emitting frequency, and said wide-area detection means and said narrow-area detection means further comprise synchronization means for detecting a signal on the basis of the light-emitting frequency.

18. The apparatus according to claim 16, wherein said two-dimensional image sensing element outputs information of a maximum luminance position or eyeball position in a predetermined region of the observer.

19. The apparatus according to claim 13, wherein said viewpoint position detection sensor follows the movement of the viewpoint position of the observer.

20. A stereoscopic image display apparatus which allows an observer to observe a stereoscope image by guiding light beams based on a plurality of parallax images displayed on an image display unit to observer through an optical system, comprising:
- viewpoint position detecting means for detecting a viewpoint position of the observer; and
- a controller for performing follow-up control on a stereoscopic view observation region for image information displayed on said image display unit, on the basis of viewpoint position information obtained by said viewpoint position detecting means,
- wherein said viewpoint position detecting means having a function of detecting the viewpoint in a narrow area and a function of detecting the viewpoint position in a wide area.

* * * * *

UNITED STATES PATENT AND TRADEMARK OFFICE
CERTIFICATE OF CORRECTION

PATENT NO.   : 6,496,218 B2                                              Page 1 of 1
DATED        : December 17, 2002
INVENTOR(S)  : Takigawa et al.

It is certified that error appears in the above-identified patent and that said Letters Patent is hereby corrected as shown below:

<u>Title page,</u>
Item [54], Title, insert therefor -- POSITION -- before "AND" and after "VIEWPOINT"

<u>Column 2,</u>
Line 40, delete "by." and insert therefor -- by --

<u>Column 3,</u>
Line 60, delete "a" and insert therefor -- <u>a</u> --

<u>Column 4,</u>
Lines 5 and 10, delete "a" and insert therefor -- <u>a</u> --

<u>Column 14,</u>
Line 3, delete "condense" and insert therefor -- condenser --

<u>Column 21,</u>
Line 50, delete "th e" and insert therefor -- the --
Line 52, delete "o f" and insert therefor -- of --

<u>Column 31,</u>
Line 45, delete "a" and insert therefor -- α --

Signed and Sealed this

Twenty-ninth Day of April, 2003

JAMES E. ROGAN
*Director of the United States Patent and Trademark Office*